(12) United States Patent
Laroia et al.

(10) Patent No.: US 10,091,447 B2
(45) Date of Patent: Oct. 2, 2018

(54) METHODS AND APPARATUS FOR SYNCHRONIZING READOUT OF MULTIPLE IMAGE SENSORS

(71) Applicant: THE LIGHTCO INC., Palo Alto, CA (US)

(72) Inventors: Rajiv Laroia, Far Hills, NJ (US); Nitesh Shroff, Palo Alto, CA (US)

(73) Assignee: Light Labs Inc., Palo Alto, CA (US)

( * ) Notice: Subject to any disclaimer, the term of this patent is extended or adjusted under 35 U.S.C. 154(b) by 9 days.

(21) Appl. No.: 15/130,966

(22) Filed: Apr. 16, 2016

(65) Prior Publication Data
US 2016/0309110 A1    Oct. 20, 2016

Related U.S. Application Data

(60) Provisional application No. 62/149,490, filed on Apr. 17, 2015.

(51) Int. Cl.
*H04N 5/376* (2011.01)
*H04N 5/225* (2006.01)
(Continued)

(52) U.S. Cl.
CPC ......... *H04N 5/3765* (2013.01); *H04N 5/2258* (2013.01); *H04N 5/23232* (2013.01); *H04N 5/3456* (2013.01); *H04N 5/378* (2013.01)

(58) Field of Classification Search
CPC ............. H04N 5/23232; H04N 5/3456; H04N 5/3765; H04N 5/378
See application file for complete search history.

(56) References Cited

U.S. PATENT DOCUMENTS 4,544,241 A    10/1985  LaBudde et al.
4,890,133 A    12/1989  Ogawa et al.
(Continued)

FOREIGN PATENT DOCUMENTS

EP    2642757 A2    9/2013
JP    10091765       4/1998
(Continued)

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet:, URL:http://www.pcmag.com/article2/ 0,2817,2400773,00.asp>, pp. 1-9.
(Continued)

*Primary Examiner* — Amy Hsu
(74) *Attorney, Agent, or Firm* — Straub & Straub; Michael P. Straub; Stephen T. Straub

(57) ABSTRACT

Methods and apparatus for reading out pixel values from sensors in a synchronized manner are described. Readout of rows of pixel values from different sensors are controlled so that pixel values of different sensors corresponding to the same portion of a scene are read out in a way that the same portions of a scene are captured at the same or nearly the same time by different sensors. In one embodiment a first sensor which captures a large scene area alternates between reading out rows of pixel values from a top portion and a bottom portion of the first sensor while sensors corresponding to smaller areas of the scene read out rows of pixel values in a consecutive manner. Sensors may read out rows of pixel values at the same rate despite corresponding to optical chains with different focal lengths. The image captured by the first sensor facilitates image combining.

17 Claims, 25 Drawing Sheets

(51) Int. Cl.
*H04N 5/232* (2006.01)
*H04N 5/345* (2011.01)
*H04N 5/378* (2011.01)

(56) References Cited

U.S. PATENT DOCUMENTS

| | | | |
|---|---|---|---|
| 5,078,479 | A | 1/1992 | Vuilleumier |
| 5,153,569 | A | 10/1992 | Kawamuraa et al. |
| 5,353,068 | A | 10/1994 | Moriwake |
| 5,583,602 | A | 12/1996 | Yamamoto |
| 5,781,331 | A | 7/1998 | Carr et al. |
| 5,889,553 | A | 3/1999 | Kino et al. |
| 5,975,710 | A | 11/1999 | Luster |
| 5,982,951 | A | 11/1999 | Katayama et al. |
| 6,011,661 | A | 1/2000 | Weng |
| 6,028,600 | A | 2/2000 | Rosin et al. |
| 6,081,670 | A | 6/2000 | Madsen et al. |
| 6,141,034 | A | 10/2000 | McCutchen |
| 7,009,652 | B1 | 3/2006 | Tanida et al. |
| 7,280,735 | B2 | 10/2007 | Thibault |
| 7,315,423 | B2 | 1/2008 | Sato |
| 7,551,358 | B2 | 6/2009 | Lee et al. |
| 7,561,201 | B2 | 7/2009 | Hong |
| 7,801,428 | B2 | 9/2010 | Nagaishi et al. |
| 7,810,511 | B2 | 10/2010 | Fagrenius et al. |
| 8,144,230 | B2 | 3/2012 | Watanabe et al. |
| 8,194,169 | B2 | 6/2012 | Tamaki et al. |
| 8,199,222 | B2 | 6/2012 | Drimbarean et al. |
| 8,237,841 | B2 | 8/2012 | Tanida et al. |
| 8,320,051 | B2 | 11/2012 | Matsumura et al. |
| 8,417,058 | B2 | 4/2013 | Tardif |
| 8,482,637 | B2 | 7/2013 | Ohara et al. |
| 8,520,022 | B1 | 8/2013 | Cohen et al. |
| 8,553,106 | B2 | 10/2013 | Scarff |
| 8,619,082 | B1 | 12/2013 | Ciurea et al. |
| 8,639,296 | B2 | 1/2014 | Ahn et al. |
| 8,665,341 | B2 | 3/2014 | Georgiev et al. |
| 8,704,944 | B1 | 4/2014 | Wierzoch et al. |
| 8,762,895 | B2 | 6/2014 | Mehta et al. |
| 8,780,258 | B2 | 7/2014 | Lee |
| 8,896,655 | B2 | 11/2014 | Mauchly et al. |
| 9,041,826 | B2 | 5/2015 | Jung et al. |
| 9,104,705 | B2 | 8/2015 | Fujinaga |
| 9,135,732 | B2 | 9/2015 | Winn et al. |
| 9,197,816 | B2 | 11/2015 | Laroia |
| 9,270,876 | B2 | 2/2016 | Laroia |
| 9,282,228 | B2 | 3/2016 | Laroia |
| 9,325,906 | B2 | 4/2016 | Laroia |
| 9,374,514 | B2 | 6/2016 | Laroia |
| 9,423,588 | B2 | 8/2016 | Laroia |
| 9,426,365 | B2 | 8/2016 | Laroia et al. |
| 9,451,171 | B2 | 9/2016 | Laroia |
| 9,462,170 | B2 | 10/2016 | Laroia et al. |
| 9,467,627 | B2 | 10/2016 | Laroia |
| 9,544,501 | B2 | 1/2017 | Laroia |
| 9,544,503 | B2 | 1/2017 | Shroff |
| 9,547,160 | B2 | 1/2017 | Laroia |
| 9,549,127 | B2 | 1/2017 | Laroia |
| 9,551,854 | B2 | 1/2017 | Laroia |
| 9,554,031 | B2 | 1/2017 | Laroia et al. |
| 9,557,519 | B2 | 1/2017 | Laroia |
| 9,557,520 | B2 | 1/2017 | Laroia |
| 9,563,033 | B2 | 2/2017 | Laroia |
| 9,568,713 | B2 | 2/2017 | Laroia |
| 9,578,252 | B2 | 2/2017 | Laroia |
| 9,654,680 | B2 * | 5/2017 | Kimoto .............. H04N 5/23212 |
| 9,671,595 | B2 | 6/2017 | Laroia |
| 9,686,471 | B2 | 6/2017 | Laroia et al. |
| 9,690,079 | B2 | 6/2017 | Laroia |
| 9,736,365 | B2 | 8/2017 | Laroia |
| 9,749,511 | B2 | 8/2017 | Laroia |
| 9,749,549 | B2 | 8/2017 | Shroff |
| D802,646 | S | 11/2017 | Laroia et al. |
| 9,824,427 | B2 | 11/2017 | Pulli et al. |
| 2002/0149691 | A1 | 10/2002 | Pereira et al. |
| 2003/0018427 | A1 | 1/2003 | Yakota et al. |
| 2003/0020814 | A1 | 1/2003 | Ono |
| 2003/0185551 | A1 | 10/2003 | Chen |
| 2004/0027695 | A1 | 2/2004 | Lin |
| 2004/0100479 | A1 | 5/2004 | Nakano et al. |
| 2004/0227839 | A1 | 11/2004 | Stavely et al. |
| 2005/0088546 | A1 | 4/2005 | Wang |
| 2005/0200012 | A1 | 9/2005 | Kinsman |
| 2006/0023952 | A1 * | 2/2006 | Rai .............. H04N 5/2628 382/232 |
| 2006/0067672 | A1 | 3/2006 | Washisu et al. |
| 2006/0187311 | A1 | 8/2006 | Labaziewicz et al. |
| 2006/0187338 | A1 | 8/2006 | May et al. |
| 2006/0221218 | A1 | 10/2006 | Alder et al. |
| 2006/0238886 | A1 | 10/2006 | Kushida et al. |
| 2006/0281453 | A1 | 12/2006 | Jaiswal et al. |
| 2007/0050139 | A1 | 3/2007 | Sidman |
| 2007/0065012 | A1 | 3/2007 | Yamakado et al. |
| 2007/0127915 | A1 | 6/2007 | Lu et al. |
| 2007/0176109 | A1 * | 8/2007 | Bell .............. G01T 1/2018 250/370.09 |
| 2007/0177047 | A1 | 8/2007 | Goto |
| 2007/0182528 | A1 | 8/2007 | Breed et al. |
| 2008/0030592 | A1 | 2/2008 | Border et al. |
| 2008/0074755 | A1 | 3/2008 | Smith |
| 2008/0084484 | A1 | 4/2008 | Ochi et al. |
| 2008/0111881 | A1 | 5/2008 | Gibbs et al. |
| 2008/0180562 | A1 | 7/2008 | Kobayashi |
| 2008/0211941 | A1 | 9/2008 | Deever et al. |
| 2008/0219654 | A1 | 9/2008 | Border et al. |
| 2008/0240698 | A1 | 10/2008 | Bartilson et al. |
| 2008/0247745 | A1 | 10/2008 | Nilsson |
| 2008/0251697 | A1 | 10/2008 | Park et al. |
| 2008/0278610 | A1 | 11/2008 | Boettiger |
| 2009/0086032 | A1 | 4/2009 | Li |
| 2009/0096904 | A1 * | 4/2009 | Moholt ............... H04N 5/3355 348/308 |
| 2009/0136223 | A1 | 5/2009 | Motomura et al. |
| 2009/0154821 | A1 | 6/2009 | Sorek et al. |
| 2009/0219428 | A1 * | 9/2009 | Nakano .............. H04N 5/347 348/308 |
| 2009/0225203 | A1 | 9/2009 | Tanida et al. |
| 2009/0278950 | A1 | 11/2009 | Deng et al. |
| 2009/0290042 | A1 | 11/2009 | Shiohara |
| 2010/0013906 | A1 | 1/2010 | Border et al. |
| 2010/0034531 | A1 | 2/2010 | Go |
| 2010/0045774 | A1 | 2/2010 | Len et al. |
| 2010/0053414 | A1 | 3/2010 | Tamaki et al. |
| 2010/0079635 | A1 | 4/2010 | Yano et al. |
| 2010/0091089 | A1 | 4/2010 | Cromwell et al. |
| 2010/0097443 | A1 | 4/2010 | Lablans |
| 2010/0225755 | A1 | 9/2010 | Tamaki et al. |
| 2010/0238327 | A1 | 9/2010 | Griffith et al. |
| 2010/0265346 | A1 | 10/2010 | Iizuka |
| 2010/0296802 | A1 | 11/2010 | Davies |
| 2011/0051243 | A1 | 3/2011 | Su |
| 2011/0063325 | A1 | 3/2011 | Saunders |
| 2011/0069189 | A1 | 3/2011 | Venkataraman et al. |
| 2011/0080655 | A1 | 4/2011 | Mori |
| 2011/0123115 | A1 | 5/2011 | Lee et al. |
| 2011/0128393 | A1 | 6/2011 | Tavi et al. |
| 2011/0157430 | A1 | 6/2011 | Hosoya et al. |
| 2011/0157451 | A1 | 6/2011 | Chang |
| 2011/0187878 | A1 | 8/2011 | Mor et al. |
| 2011/0193984 | A1 | 8/2011 | Kitaya et al. |
| 2011/0221920 | A1 | 9/2011 | Gwak |
| 2011/0222167 | A1 | 9/2011 | Iwasawa |
| 2011/0242342 | A1 | 10/2011 | Goma et al. |
| 2011/0279725 | A1 * | 11/2011 | Cazaux ............... H04N 5/3743 348/308 |
| 2011/0280565 | A1 | 11/2011 | Chapman et al. |
| 2011/0285895 | A1 | 11/2011 | Weng et al. |
| 2012/0002096 | A1 | 1/2012 | Choi et al. |
| 2012/0033069 | A1 | 2/2012 | Becker et al. |
| 2012/0062691 | A1 | 3/2012 | Fowler et al. |
| 2012/0155848 | A1 | 6/2012 | Labowicz et al. |
| 2012/0162464 | A1 | 6/2012 | Kim |
| 2012/0188391 | A1 | 7/2012 | Smith |
| 2012/0027462 | A1 | 8/2012 | Justice |

(56) References Cited

U.S. PATENT DOCUMENTS

| | | |
|---|---|---|
| 2012/0242881 A1 | 9/2012 | Suzuki |
| 2012/0249815 A1 | 10/2012 | Bohn et al. |
| 2012/0257013 A1 | 10/2012 | Witt et al. |
| 2012/0257077 A1 | 10/2012 | Suzuki |
| 2012/0268642 A1 | 10/2012 | Kawai |
| 2013/0020470 A1* | 1/2013 | Luo .................. A61B 1/041 250/208.1 |
| 2013/0027353 A1 | 1/2013 | Hyun |
| 2013/0050564 A1 | 2/2013 | Adams, Jr. et al. |
| 2013/0057743 A1 | 3/2013 | Minagawa et al. |
| 2013/0064531 A1 | 3/2013 | Pillman et al. |
| 2013/0076928 A1 | 3/2013 | Olsen et al. |
| 2013/0086765 A1 | 4/2013 | Chen |
| 2013/0088614 A1 | 4/2013 | Lee |
| 2013/0093842 A1 | 4/2013 | Yahata |
| 2013/0093947 A1 | 4/2013 | Lee et al. |
| 2013/0100272 A1 | 4/2013 | Price et al. |
| 2013/0153772 A1 | 6/2013 | Rossi et al. |
| 2013/0155194 A1 | 6/2013 | Sacre et al. |
| 2013/0194475 A1 | 8/2013 | Okamoto |
| 2013/0222676 A1 | 8/2013 | Ono |
| 2013/0223759 A1 | 8/2013 | Nishiyama |
| 2013/0250125 A1 | 9/2013 | Garrow et al. |
| 2013/0258044 A1 | 10/2013 | Betts-Lacroix |
| 2014/0049677 A1 | 2/2014 | Kawaguchi |
| 2014/0063018 A1 | 3/2014 | Takeshita |
| 2014/0111650 A1 | 4/2014 | Georgiev et al. |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 | 8/2014 | Eguchi et al. |
| 2014/0240579 A1 | 8/2014 | Park et al. |
| 2014/0267243 A1 | 9/2014 | Venkataraman et al. |
| 2014/0267844 A1 | 9/2014 | Iwata et al. |
| 2014/0293079 A1 | 10/2014 | Milanfar et al. |
| 2014/0354714 A1 | 12/2014 | Hirschler et al. |
| 2015/0029595 A1 | 1/2015 | Swihart et al. |
| 2015/0035824 A1 | 2/2015 | Takahashi et al. |
| 2015/0043808 A1 | 2/2015 | Takahashi et al. |
| 2015/0049233 A1 | 2/2015 | Choi |
| 2015/0154449 A1 | 6/2015 | Ito et al. |
| 2015/0156399 A1 | 6/2015 | Chen et al. |
| 2015/0234149 A1 | 8/2015 | Kreitzer et al. |
| 2015/0241713 A1 | 8/2015 | Laroia et al. |
| 2015/0244927 A1 | 8/2015 | Laroia et al. |
| 2015/0244949 A1 | 8/2015 | Laroia et al. |
| 2015/0253647 A1 | 9/2015 | Mercado |
| 2015/0256776 A1* | 9/2015 | Okada .................. H04N 5/361 348/243 |
| 2015/0279012 A1 | 10/2015 | Brown et al. |
| 2015/0296149 A1 | 10/2015 | Laroia |
| 2016/0004144 A1 | 1/2016 | Laroia et al. |
| 2016/0014314 A1 | 1/2016 | Laroia et al. |
| 2016/0091861 A1 | 3/2016 | Liu et al. |
| 2016/0112637 A1 | 4/2016 | Laroia et al. |
| 2016/0112650 A1 | 4/2016 | Laroia et al. |
| 2016/0142610 A1 | 5/2016 | Rivard et al. |
| 2016/0182777 A1 | 6/2016 | Laroia et al. |
| 2016/0306168 A1 | 10/2016 | Singh et al. |
| 2016/0309095 A1 | 10/2016 | Laroia et al. |
| 2016/0309110 A1 | 10/2016 | Laroia et al. |
| 2016/0309133 A1 | 10/2016 | Laroia et al. |
| 2016/0316117 A1 | 10/2016 | Singh et al. |
| 2016/0360109 A1 | 12/2016 | Laroia et al. |
| 2016/0381301 A1 | 12/2016 | Shroff |
| 2017/0031138 A1 | 2/2017 | Laroia |
| 2017/0041528 A1 | 2/2017 | Lai et al. |
| 2017/0054919 A1 | 2/2017 | Laroia |
| 2017/0059857 A1 | 3/2017 | Laroia et al. |
| 2017/0070683 A1 | 3/2017 | Laroia |
| 2017/0099439 A1 | 4/2017 | Pulli et al. |
| 2017/0123189 A1 | 5/2017 | Laroia |
| 2017/0126976 A1 | 5/2017 | Laroia |
| 2017/0180615 A1 | 6/2017 | Lautenbach |
| 2017/0180637 A1 | 6/2017 | Lautenbach et al. |
| 2017/0201699 A1 | 7/2017 | Laroia |
| 2017/0208230 A1 | 7/2017 | Laroia |
| 2017/0208257 A1 | 7/2017 | Laroia |
| 2017/0223286 A1 | 8/2017 | Laroia et al. |
| 2017/0280135 A1 | 9/2017 | Shroff et al. |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010256397 | 11/2010 |
| KR | 100153873 | 7/1998 |
| KR | 1020080022260 | 3/2008 |
| KR | 1020110022279 | 3/2011 |
| KR | 1020130038076 | 4/2013 |
| WO | 2009145401 A1 | 12/2009 |
| WO | 2012089895 A1 | 7/2012 |

OTHER PUBLICATIONS

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

\* cited by examiner

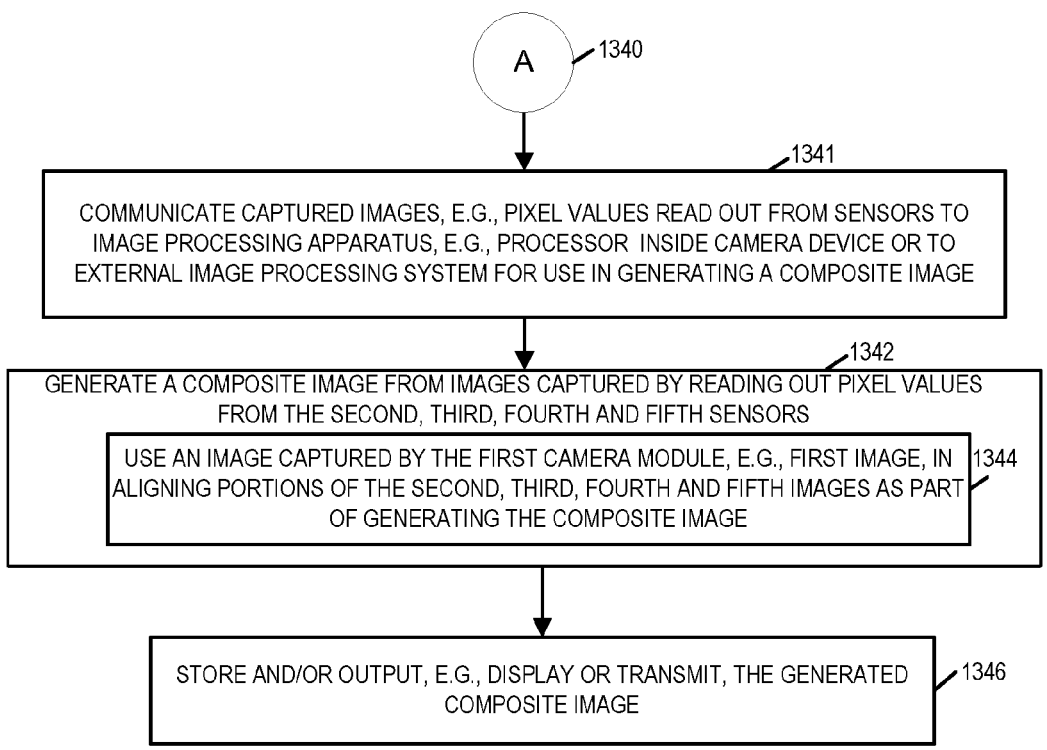

METHODS AND APPARATUS FOR SYNCHRONIZING READOUT OF MULTIPLE IMAGE SENSORS

RELATED APPLICATIONS

The present application claims the benefit of U.S. Provisional Application Ser. No. 62/149,490 filed Apr. 17, 2015, which is hereby expressly incorporated by reference in its entirety.

FIELD

The present application relates to image capture and/or image generation methods and apparatus and, more particularly, to methods and apparatus related to controlling elements of a camera, e.g., image sensors, to read out of pixel values from multiple image sensors in a synchronized manner.

BACKGROUND

Digital cameras often use what are referred to as rolling shutters. In the case of a rolling shutter different lines of a sensor are read out at different times. Exposure control is often controlled in rolling shutter embodiments by zeroing or emptying the pixel buffers of a row at a point in time that precedes the readout time by the desired exposure time. In this way the pixel value is a function of the amount of light captured during the desired exposure period before readout.

Since in rolling shutter implementations, the exposure period of different lines will occur at different time periods based on the order the lines are read out, the pixel values of different lines correspond to different time periods. In the case of motion, given that lines of a sensor are exposed at different times the same object may appear at different locations in the captured image depending on when a line exposed and read out. Often sensors are read out sequentially from top to bottom when using a rolling shutter. In the case of an image captured by a single sensor which reads lines out sequentially, the moving object may appear in the image as a blur or streak.

Some camera devices include multiple sensors. In the case where a camera device includes multiple sensors, some of them with overlapping fields of view, different sensors may capture the same scene area at different times. In the case of motion, if the same scene area is captured at different times by different sensors, depending on the rate of motion, the same object may appear at different locations in the images captured by different sensors. This problem may be particularly noticeable in the case where sensors correspond to camera modules of different focal lengths given that the use of different focal lengths often result in different size areas of a scene being captured by different sensors. In the case of sensors of the same size and number of pixel rows corresponding to different focal length camera modules, if the rows of pixel values are read out from the sensors from top to bottom, different portions of a scene area are likely to be captured by different sensors at different times. This can make combining of images captured by different camera modules, e.g., corresponding to camera modules having different focal lengths, difficult to combine particularly in the case of motion. This is because different sensors may capture the same scene area at different times and thus may capture different scene content. For example, in the case of motion due to capture of the same scene area at different times by different sensors, a moving ball may appear in an image captured by one sensor at a different location than in an image captured by another sensor.

In view of the above discussion, it should be appreciated that there is a need for methods and/or apparatus for controlling sensor readout of different sensors of an apparatus in a way that results in different sensors capturing the same scene area at or near the same time. It would be desirable if such methods and/or apparatus could be used with rolling shutters. In this way differences between images captured by different sensors that are controlled using rolling shutters, due to the capture of different scene areas at different times, can be kept small or avoided.

While not necessary for all embodiments, it would be desirable if in at least some embodiments the readout rate of one or more sensors is not slowed down as compared to the read out rate of other sensors corresponding to camera modules with a different focal length for purposes of synchronizing with other sensors in the same device.

SUMMARY

Methods and apparatus for reading out pixel values from sensors in a synchronized manner are described. Readout of rows of pixel values from different sensors are controlled so that pixel values of different sensors corresponding to the same portion of a field of view are read out in a synchronized manner. The methods and apparatus are well suited for use with a rolling shutter control mechanism where different rows of pixel values are read out of a sensor at different times.

In accordance with one feature, in an embodiment where multiple sensors capture different portions of a scene area which is also captured by another sensor, different sensors are controlled to read out rows of pixel values in different orders. In one particular exemplary a sensor corresponding to an optical chain, e.g., camera module, having a first focal length captures a large scene area. Sensors of other optical chains with larger focal lengths than said same camera module capture small portions of the same scene area. The sensors of the different optical chains, in some but not necessarily all embodiments, include the same number of rows of pixel elements and thus can capture the same numbers of rows of pixel values.

In one exemplary embodiment, a first sensor of a first optical chain, e.g., first camera module, having a first focal length captures a large scene area. Second, third, fourth and fifth optical chains, e.g., camera modules, including second, third, fourth and fifth sensors, respectively, may and in some embodiments do have a longer focal length than the first optical chain and capture different portions of said large scene area given their smaller field of view than the field of view of the first camera module.

In one embodiment the first optical chain has a 35 mm film equivalent focal length and the second, third, fourth and fifth optical chains have a focal length which is twice the first focal length, e.g., a 70 mm film equivalent focal length. These focal lengths are exemplary and not critical to the invention.

In order to control the first through fifth camera modules to read out pixel values corresponding to the same scene in parallel, e.g., at the same time, in one embodiment the order in which rows of pixel values are read out from the first, second and third sensors is different. The order in which the rows of pixel values read out from the fifth and sixth sensors may be the same order as used to read out rows of pixel values from the second and third sensors.

While readout of rows of pixel values from multiple sensors may occur during each time period, all the sensors may not capture the same portion of the scene area. However, the sequence of pixel row readouts allows capture of scene portions in a synchronized manner which results in different sensors capturing the same scene area at the same time or within one or few row readout time periods. Thus there no or little difference between images of a given portion of the scene captured by different sensors due to motion since the sensors capture the same scene area at the same time or nearly the same time.

Significantly, this result can be achieved, at least in some embodiments, without requiring a reduction in the pixel row readout rate of the sensor corresponding to the shorter focal length camera module relative to the rate at which pixel rows are read out of the sensors of camera modules with longer focal lengths and which thus capture small portions of the scene than the camera module with the shorter focal length.

In one particular embodiment a sensor corresponding to the shorter focal length camera module is read out in a pattern which does not proceed directly from one edge of a sensor to the other edge of the sensor while other sensors corresponding to longer focal length camera modules are read out differently, e.g., from one edge to the other edge of sensor.

In one but not necessarily all embodiments, read out of pixel values from a first sensor begins at or near the middle of the first sensor and then alternates between reading out of one or more rows of pixel values corresponding to the top sensor and one or more rows of pixel values corresponding to the bottom sensor according to a predetermined pattern used to synchronize the readout of rows of pixel values from the first sensor with the readout of pixel values from the other sensors. In the particular exemplary embodiment, readout of pixel values from the sensors, e.g., second and fourth sensors, which capture images corresponding to a top portion of the field of view of the first sensor, begins at the bottom row of the sensor and proceeds upward. The readout of the second and fourth sensors corresponding to a top portion of a scene of interest occurs while pixel values are read out from the rows of the upper half, e.g. top half, of the first sensor which also captures the top portion of the scene area being captured.

In the exemplary embodiment readout of pixel values from the sensors, e.g., third and fifth sensors, which capture images corresponding to a bottom portion of the field of view of the first sensor, begins at the top row of each of the third and fourth sensors and proceeds downward. In this manner, image capture and readout between the first, second, third, fourth and fifth sensors can be synchronized. The row readout order is exemplary and it should be appreciated that the rows of the top and bottom portions of the first sensor can be read out in a different order as long as the readout is coordinated with the read out of rows of the second and further sensors. For example the readout of the first sensor may begin on the outside of the first sensor and move inward towards the middle of the sensor in an alternating fashion with reads alternating between a row corresponding to the top portion of the first sensor and the bottom portion of the first sensor.

While the pair of second and third sensors, in combination, will capture more rows of pixel values per vertical distance than the first sensor, assuming each of the first, second, and third sensors include the same number of rows of pixels, image capture can be synchronized so that the different sensors capture the same portion of the scene area at the same time or nearly the same time without having to reduce the read out rate or number of rows read out of the sensors to achieve image capture synchronization.

Captured images can be processed by a processor included in the camera device which captures the images using the different sensors. Alternatively the images, e.g., pixel values read out from the different sensors can be stored and communicated, e.g., transmitted to an apparatus including a processor which does the image combining to generate a composite image.

Thus, it should be appreciated that the captured images can, and in some embodiments are, combined to generate a composite image either on the device which does the image capture or by an external image processing device. By synchronizing image capture of different portions of a scene area between multiple sensors capturing the same scene area portions so that the different sensors capture the same scene area at the same or nearly the same time, temporal errors in the composite image can be reduced as compared to implementations where the same scene area is captured at different times by different sensors which do not operate in a synchronized manner.

While explained in the context of embodiments where sensor of different camera modules include the same number of rows of pixel values, the methods are not so limited and the techniques can be used to synchronize readout of sensors with different numbers of rows of pixel elements, e.g., pixel sensors. In addition the methods and apparatus are not limited to the particular number of sensors shown in the example and can be used with a wide number of sensors where one or more of the sensors correspond to overlapping image capture areas, e.g., due to the use of different focal lengths and/or for other reasons.

Numerous additional variations and features are discussed in the detailed description which follows.

BRIEF DESCRIPTION OF THE FIGURES

FIG. 13B illustrates a second part of a flowchart showing the steps of an exemplary method of controlling an exemplary camera device to read out rows of pixel values from image sensors in accordance with an exemplary embodiment.

FIG. 13 comprising the combination of FIGS. 13A and 13B illustrates the steps of the exemplary method of controlling an exemplary camera device in accordance with an exemplary embodiment.

DETAILED DESCRIPTION

Figure 1:
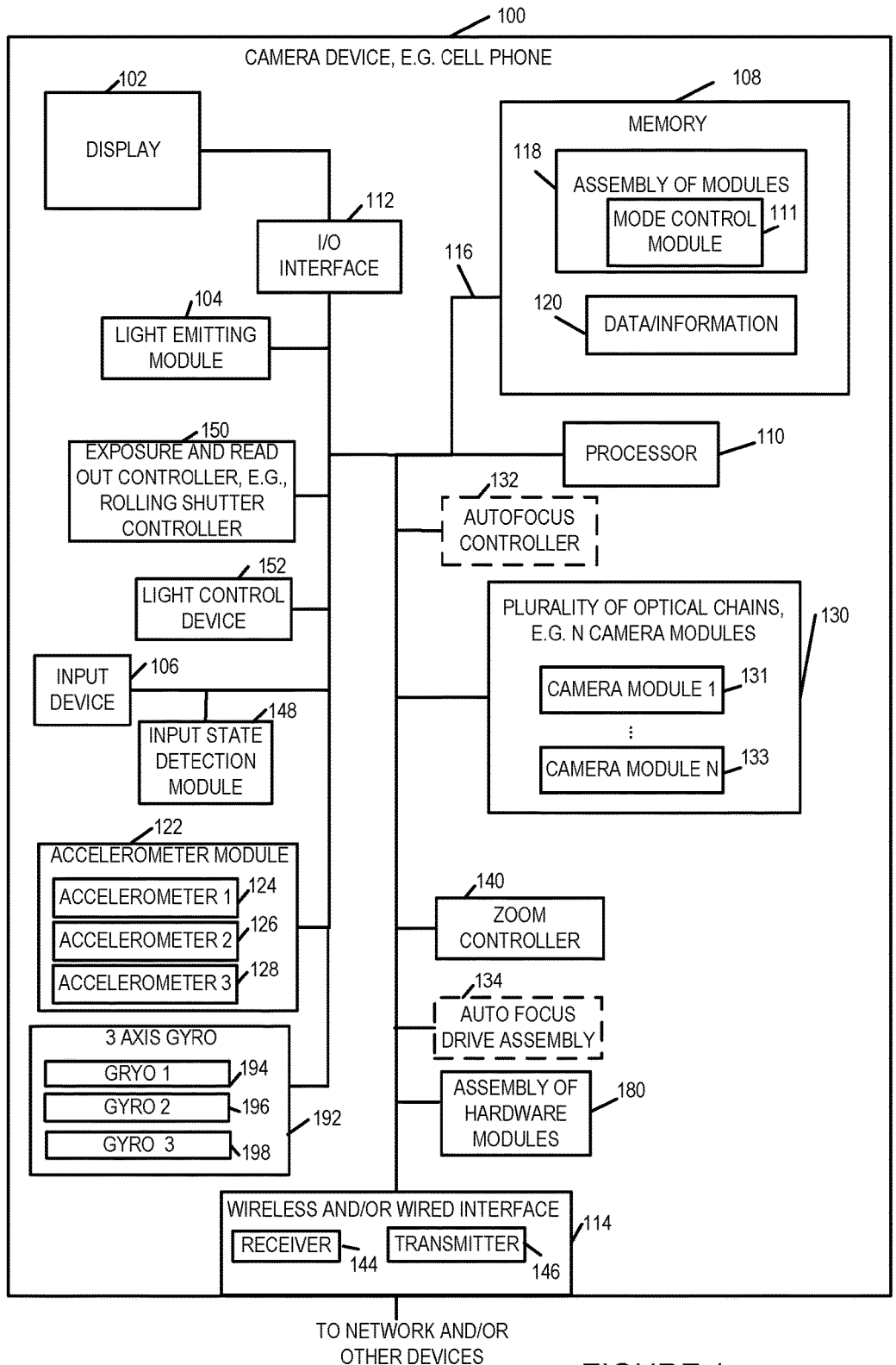
FIG. 1 is a block diagram of an exemplary apparatus, e.g., a camera device, implemented in accordance with one embodiment of the present invention.

FIG. 1 illustrates an exemplary camera device 100 such as a digital camera, notepad with camera functionality, or cell phone with camera functionality, implemented in accordance with one exemplary embodiment of the present invention. The camera device 100, in some embodiments, is a portable device. In other embodiments, the camera device 100 is a fixed device such as a wall mounted camera. FIG. 1 illustrates the camera device 100 in block diagram form showing the connections between various elements of the apparatus 100. The exemplary camera device 100 includes a display device 102, a light emitter module 104, an input device 106, an input state detection module 148, an exposure and readout controller 150, e.g., a rolling shutter controller 150, a light control device 152, memory 108, a processor 110, a hardware assembly of modules 180, a wireless and/or wired interface 114, e.g., a cellular interface, a Wi-Fi interface, and/or a USB interface, an I/O interface 112, an accelerometer module 122, 3 axis gyro 192, and a bus 116 which are mounted in a housing represented by the rectangular box touched by the line leading to reference number 100. The light emitter module 104 includes light emitting elements which may be LEDs (Light Emitting Diodes) or other types of light emitting elements which can be individually controlled so that all the light emitting elements need not be on at the same time. The input device 106 may be, and in some embodiments is, e.g., keypad, touch screen, or similar device that may be used for inputting information, data and/or instructions. The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis.

Similarly, the 3-axis gyro 192, which includes 194, 196 and 198 can measure rotation along each of 3 different axis. The output of the accelerometer module 122 and the gyro module 192 can, and in some embodiments is, monitored with changes in accelerometer and gyro output being interpreted and checked over time by processor 110 and/or zoom control module, e.g., zoom controller 140 to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in a un-depressed state the camera zoom function is disabled. The input state detection module 148 is configured to detect the state of the input device, e.g., the zoom control button, to detect whether the button is in a depressed state or undepressed state. In some embodiments there is a status register in the camera device 100 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116.

Figure 7A:
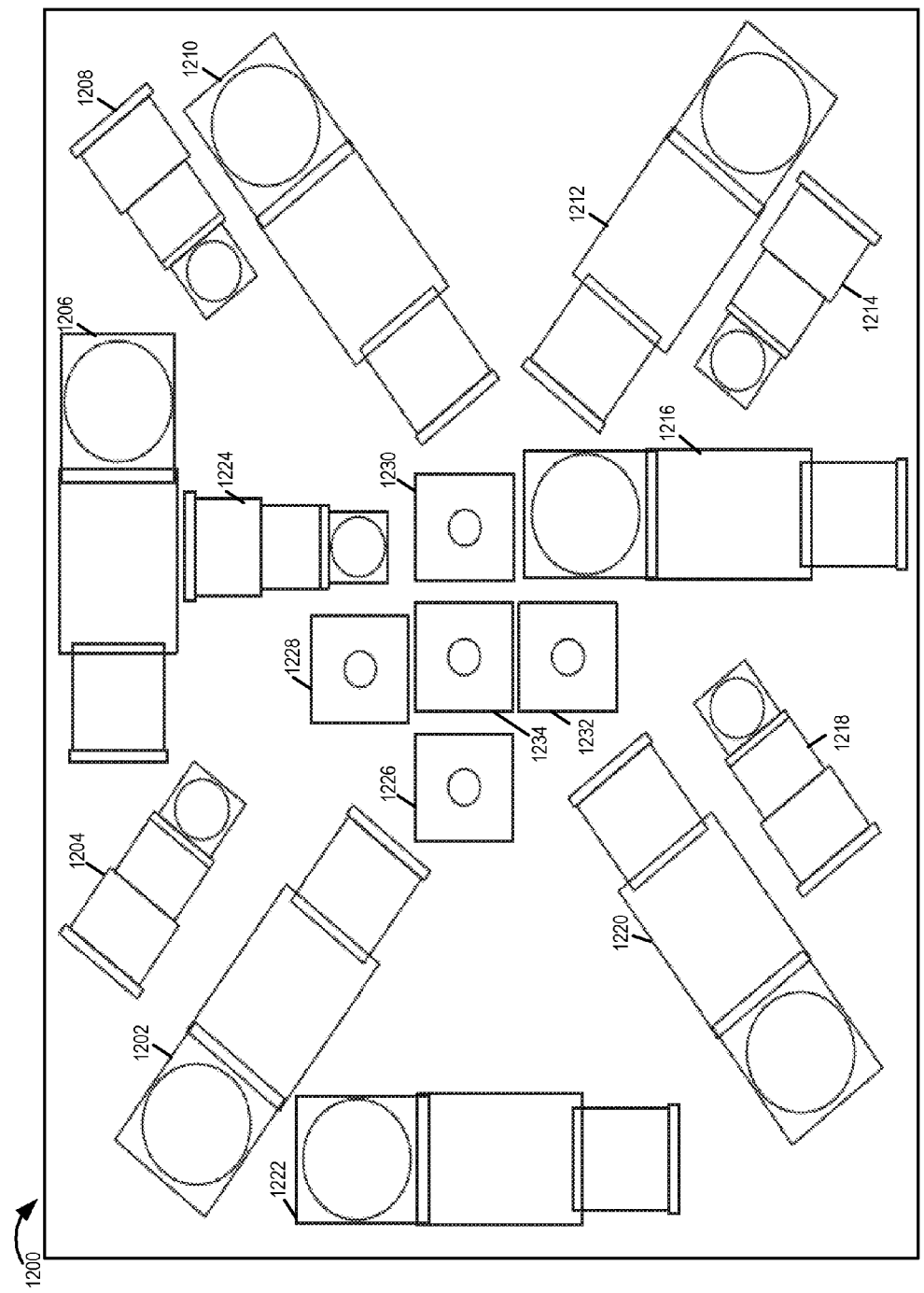
FIG. 7A illustrates an arrangement of optical chains, e.g., camera modules, used in one embodiment to implement a camera device of the type shown in FIG. 6A.

In addition to being coupled to the I/O interface 112, the bus 116 is coupled to the memory 108, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of the various camera module sets and/or arrangements described in the present application. For example, in some embodiments the camera device 100 is implemented using a set of camera modules as shown in FIG. 7A while in other embodiments the camera device 100 may be implemented using other module arrangements. Images captured by individual optical chains in the plurality of optical chains 130 can, and in various embodiments are, stored in memory 108, e.g., as part of the data/information 120 and processed by the processor 110, e.g., to generate one or more composite images.

The X camera modules 131 through 133 may, and in various embodiments do, include camera modules having different focal lengths. Multiple camera modules may be provided at a given focal length. For example, multiple camera modules having a 35 mm equivalent focal length to a full frame DSLR camera, multiple camera modules having a 70 mm equivalent focal length to a full frame DSLR camera and multiple camera modules having a 140 mm equivalent focal length to a full frame DSLR camera are included in an individual camera device in some embodiments. The various focal lengths are exemplary and a wide variety of camera modules with different focal lengths may be used. The camera device 100 is to be considered exemplary. To the extent that other references are made to a camera or camera device with regard to some of the other figures, it is to be understood that at least in some embodiments the camera device or camera will include the elements shown in FIG. 1 even if the elements are not shown in a particular figure or embodiment. While in some embodiments all of the elements shown in FIG. 1 are included in the camera device or camera, in other embodiments a subset of the elements shown in FIG. 1 are included and the illustration of the elements in FIG. 1 is not intended to imply that a particular element is essential or necessary in all embodiments.

As will be discussed below images from different camera modules captured at the same time or during a given time period can be combined to generate a composite image, e.g., an image having better resolution, frequency content and/or light range than an individual image captured by a single one of the camera modules 131, 133.

Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some but not all embodiments, sequentially, so that different portions of an area are illuminated at different times so that the full area need not be consistently lighted during image capture. While all lighting elements are not kept on for the full duration of an image capture operation involving the reading out of the full set of pixel elements of a sensor, the portion of area which is having its image captured, e.g., the scan area, at a given time as a result of the use of a rolling shutter will be illuminated thanks to synchronization of the lighting of light emitting elements with rolling shutter operation. Thus, various light emitting elements are controlled to illuminate at different times in some embodiments based on the exposure time and which portion of a sensor will be used to capture a portion of an image at a given time. In some embodiments the light emitting elements in the LED module 104 include a plurality of sets of light emitting elements, each set of light emitting elements corresponding to a different image area which it illuminates and which is captured by a different portion of the image sensor. Lenses may, and in some embodiments are used to direct the light from different light emitting elements to different scene areas which will be captured by the camera through the use of one or more camera modules.

The rolling shutter controller 150 is an electronic shutter that controls reading out of different portions of one or more image sensors. Each image sensor is read one row of pixel values at a time and the various rows are read in an order that is controlled in accordance with the features of the present invention, e.g., as discussed in detail with regard to FIGS. 10-13 and 14-21. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments. While an electronic rolling shutter is used in most of the embodiments, a mechanical rolling shutter may be used in some embodiments.

The light control device 152 is configured to control light emitting elements (e.g., included in the LED module 104) in a synchronized manner with the operation of the rolling shutter controller 150. In some embodiments the light control device 152 is configured to control different sets of light emitting elements in the array to emit light at different times in a manner that is synchronized with the timing of the rolling shutter 150. In some embodiments the light control device 152 is configured to control a first set of light emitting elements corresponding to a first image area to output light during a first time period, the first time period being determined based on the timing of the rolling shutter and being a period of time during which a first portion of the sensor is exposed for image capture. In some embodiments the light control device 152 is further configured to control a second set of light emitting elements corresponding to a second image area to output light during a second time period, the second time period being determined based on the timing of the rolling shutter and being a period of time during which a second portion of the sensor is exposed for image capture. In some embodiments the first time period includes at least a portion of time which does not overlap the second time period.

In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of total image area.

In some embodiments the light control device 152 is further configured to control the second set of light emitting elements to be off during said portion of time included in the first period of time which does not overlap said second period of time. In some embodiments the light control device is configured to determine when the first set and said second set of light emitting elements are to be on based on an exposure setting. In some embodiments the light control device is configured to determine when said first set and said second set of light emitting elements are to be on based on an amount of time between read outs of different portions of said sensor. In some embodiments the different sets of light emitting elements in the plurality of light emitting elements are covered with different lenses. In some such embodiments the light control device 152 is further configured to determine which sets of light emitting elements to use based on an effective focal length setting being used by the camera device.

The accelerometer module 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. Similarly the gyro module 192 includes 3 gyros, 194, 196 and 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. As discussed below, the acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus drive assembly 134 is, in some embodiments, implemented as a lens drive. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target. The zoom control module 140 is configured to perform a zoom operation in response to user input.

The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The assembly of modules 118 includes a mode control module which determines, e.g., based on user input which of a plurality of camera device modes of operation are to be implemented. In different modes of operation, different camera modules 131, 133 may and often are controlled differently based on the selected mode of operation. For example, depending on the mode of operation different camera modules may use different exposure times. Alternatively, the scene area to which the camera module is directed and thus what portion of a scene is captured by an individual camera module may be changed as will be discussed below with regard to FIGS. 5 and 34 depending on how the images captured by different camera modules are to be used, e.g., combined to form a composite image and what portions of a larger scene individual camera modules are to capture during the user selected or automatically selected mode of operation. In some embodiments, the operations performed by the processor when executing the instructions from one or more assembly of modules is instead performed by a hardware module which performs the same functionality and is included in the hardware assembly of modules.

The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1, various features relating to the plurality of optical chains 130 will now be discussed with reference to FIGS. 2 and 3 which show the camera device 100 from front and side perspectives, respectively. Dashed line 101 of FIG. 2 indicates a cross section line. Box 117 represents a key and indicates that OC=optical chain, e.g., camera module, and each L1 represents an outermost lens in an optical chain. Box 119 represents a key and indicates that S=sensor, F=filter, L=lens, L1 represents an outermost lens in an optical chain, and L2 represents an inner lens in an optical chain. While FIG. 3 shows one possible implementation of optical chains, as will be discussed below, other embodiments are possible and the optical chains may include one or more light redirection elements in addition to the elements shown in FIG. 3. The lenses of different optical chains may have different shapes, e.g., with round apertures being used for some lenses and non-round apertures being used for other lenses. However, in some embodiments lenses with round apertures are used for each of the optical chains of a camera device.

Figure 2:
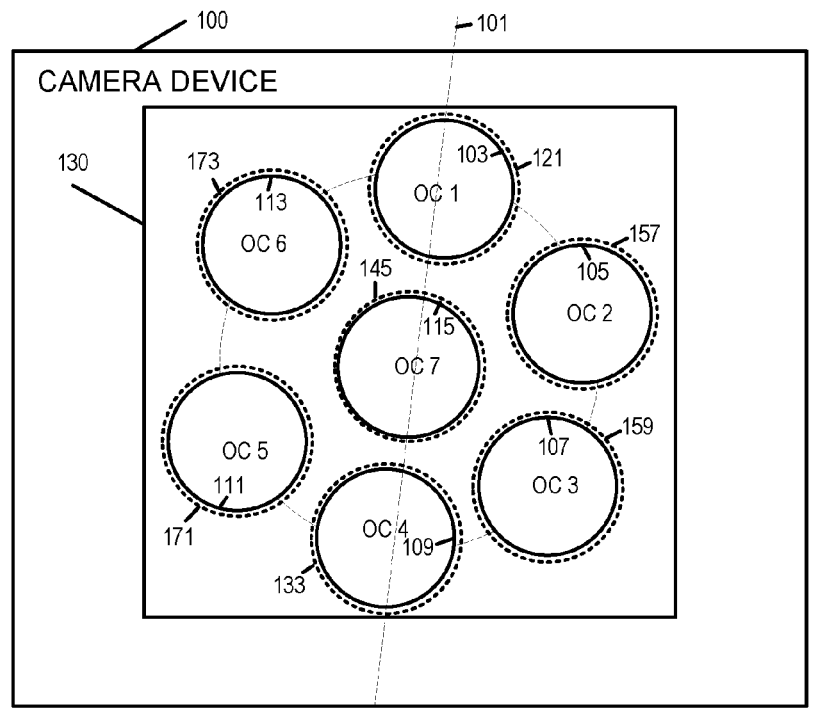
FIG. 2 illustrates a frontal view of an apparatus implemented in accordance with an exemplary embodiment which incorporates multiple optical chains, e.g., camera modules, in accordance with the present invention with lenses which are viewable from the front of the camera.
Figure 3:
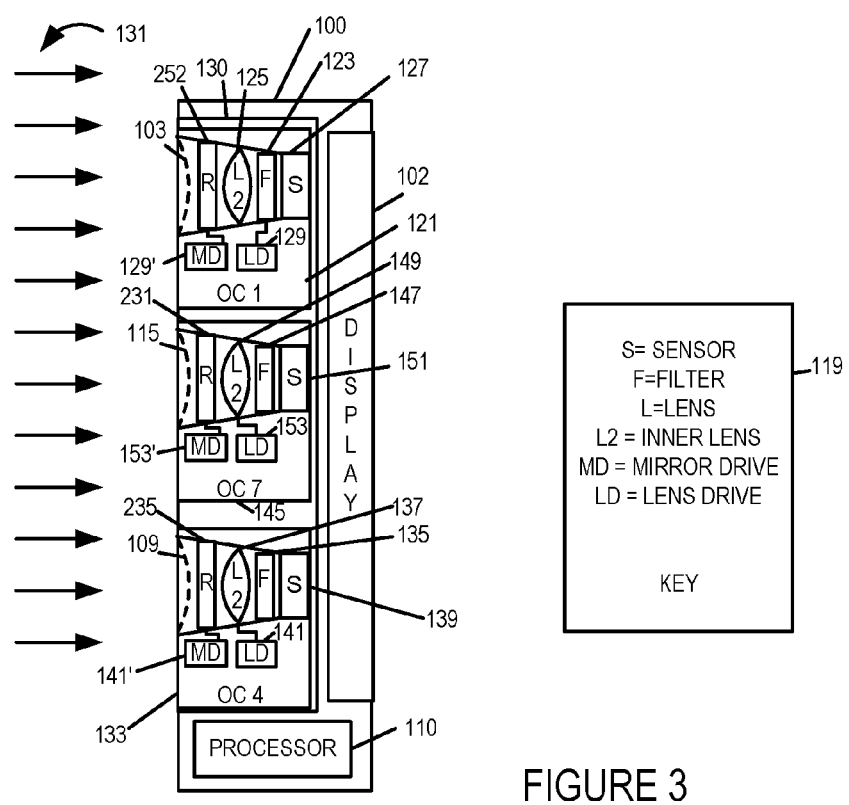
FIG. 3, which is a side view of the exemplary apparatus of FIG. 2, illustrates further details of the exemplary apparatus.

FIG. 2 shows the front of the exemplary camera device 100. Rays of light 131, which is light toward the front of the camera assembly, shown in FIG. 1 may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chains 130 is mounted. Note that while outer opening shown in FIG. 2 are shown as having circular apertures which are the same size, as will be discussed below different size openings may be used for different optical chains, e.g., depending on the focal length with optical chains having larger focal lengths normally including outer openings with larger apertures than optical chains with small focal lengths.

FIG. 3, which shows a side perspective of camera device 100, illustrates three of the seven optical chains (OC 1 121, OC 7 145, OC 4 133) of the set of optical chains 130, display 102 and processor 110. OC 1 121 includes an outer opening 103, a light redirection element 252, e.g., a mirror, an inner lens L2 125, a filter 123 and a sensor 127. In some embodiments the OC 1 121 further includes lens drive (LD) 129 for controlling the position of lens L2 125 for zooming and/or auto focus operation purposes and a mirror drive (MD) 129' for controlling the positioning of the light reflection element 252 as desired to deflect light. The outer opening 103 serves as an aperture of the camera module OC 121, e.g., for entry of light into OC 121. The exposure and read out controller 150 is not shown in the figure but is used for controlling the read out of rows of pixel values form the sensors' 127, 151 and 139 in a synchronized manner, e.g., taking into consideration the scene area being captured by the individual sensors. The LD 129 includes a motor or other drive mechanism which can move the lens, barrel or cylinder housing one or more lenses, or sensor, to which it is connected thereby allowing for an alteration to the light path by moving one or more elements relative to the other elements of the optical chain to which the LD is coupled. While the LD 129 is shown coupled, e.g., connected, to the lens L2 125 and thus can move the position of the lens L2, e.g., as part of a zooming or autofocus operation, in other embodiments the LD 129 is coupled to a cylindrical or barrel shape component which is part of the optical chain or to the sensor 127. Thus, the lens drive 129 can alter the relative position of a lens to the sensor 127, e.g., to change the distance between the sensor 127 and the lens 125 as part of a zooming and/or focus operation. The MD includes a motor or other drive mechanism which can control the relative angle of reflection element 252 allowing for alteration of angle of redirection of incident light.

OC 7 145 includes an outer opening 115, a light redirection element 231, an inner lens L2 149, a filter 147, and a sensor 151. OC 7 145 further includes LD 153 for controlling the position of lens L2 149 and a and a mirror drive (MD) 153' for controlling the positioning of the light reflection element 231. The LD 153 includes a motor or other drive mechanism which can move the lens, barrel, cylinder, sensor or other optical chain element to which it is connected.

OC 4 133 includes an outer opening 109, a light redirection element 235, an inner lens L2 137, a filter 135 and a sensor 139. OC 4 133 includes LD 141 for controlling the position of lens L2 137 and MD 141' for controlling the positioning of the light reflection element 235. The LD 153, 141 and MD 153', 141' include a motor or other drive mechanism and operates in the same or similar manner as the other drives of the other optical chains discussed above. In some embodiments each of the filters 123, 147 and 135 is an infrared (IR) filter. While only three of the OCs are shown in FIG. 3 it should be appreciated that the other OCs of the camera device 100 may, and in some embodiments do, have the same or similar structure and/or may include other elements such as light redirection devices. Thus, differences between the multiple optical chains of the camera device 100 are possible and, in some embodiments, are present to allow for a variety of focal lengths to be supported in a single camera device through the use of multiple optical chains which can be operated in parallel.

FIG. 3 and the optical chains (OCs), also sometimes referred to as camera modules, illustrated therein are illustrative of the general structure of OCs used in various embodiments. However, numerous modifications and particular configurations are possible. While reference to elements of FIG. 3 may be made, it is to be understood that the OCs (camera modules) in a particular embodiment will be configured as described with regard to the particular embodiment and that various different camera modules are often used in single camera device. FIG. 5 shows optical chains, e.g., camera modules, which include light redirection devices. Such modules can be used alone or in combination with other modules such as the ones shown in FIGS. 3 and 4A or other figures of the present application.

While a filter may be of a particular color or used in some optical chains, filters need not be used in all optical chains and may not be used in some embodiments. In embodiments where the filter is expressly omitted and/or described as being omitted or an element which allows all light to pass, while reference may be made to the OCs of FIG. 3 it should be appreciated that the filter will be omitted in an embodiment where it is indicated to be omitted or of such a nature that it allows a broad spectrum of light to pass if the embodiment is indicated to have a broadband filter. In some embodiments one or more light redirection elements, e.g., mirrors, such as elements 252, 231, 235 shown in FIG. 3, are included in OCs for light to be redirected, e.g., to increase the length of the optical path or make for a more convenient internal component configuration. It should be appreciated that each of the OCs 121, 145, 133, shown in FIG. 3 will have their own optical axis. In the example, each optical axis passes through the outer openings 103, 115, or 109 at the front of the optical chain and passes through the OC to the corresponding sensor 127, 151, 139.

While the processor 110 is not shown being coupled to the LD, and sensors 127, 151, 139 it is to be appreciated that such connections exist and are omitted from FIG. 3 to facilitate the illustration of the configuration of the exemplary OCs.

As should be appreciated the number and arrangement of lens, filters and/or mirrors can vary depending on the particular embodiment and the arrangement shown in FIG. 3 is intended to be exemplary and to facilitate an understanding of various features rather than to be limiting in nature.

The front of the plurality of optical chains 130 is visible in FIG. 2 with the outermost opening of each optical chain appearing as a circle represented using a solid line (OC 1 opening 103, OC 2 opening 105, OC 3 opening 107, OC 4 opening 109, OC 5 opening 111, OC 6 opening 113, OC 7 opening 115). In the FIG. 2 example, the plurality of optical chains 130 include seven optical chains, OC 1 121, OC 2 157, OC 3 159, OC 4 133, OC 5 171, OC 6 173, OC 7 145, which include openings 103, 105, 107, 109, 111, 113, 115), respectively, represented by the solid circles shown in FIG. 2. While the outer opening may be a circular opening in some embodiments, in some other embodiments the entry point for the light into the optical chains has a plastic element covering the opening. The outer openings of the optical chains are arranged to form a pattern which is generally circular in the FIG. 2 example when viewed as a unit from the front. While a circular arrangement is used in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

The overall total light capture area corresponding to the multiple lenses of the plurality of optical chains OC 1 to OC 7, also sometimes referred to as optical camera modules, can, in combination, approximate that of a lens having a much larger opening but without requiring a single lens having the thickness which would normally be necessitated by the curvature of a single lens occupying the area which the lenses occupy.

Figure 7B:
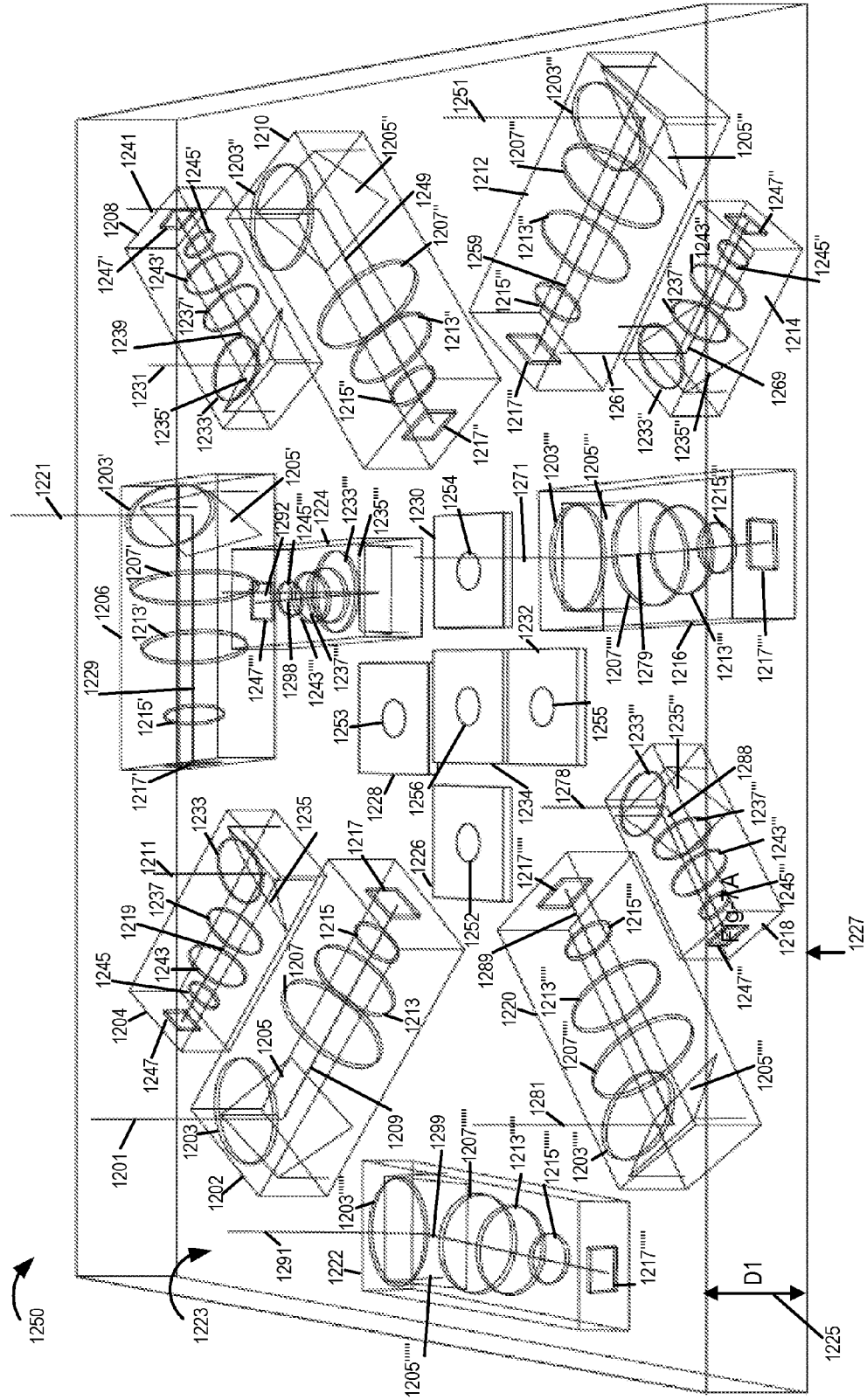
FIG. 7B illustrates a perspective view of a camera device of the type shown in FIG. 6, with the arrangement of various optical chains and elements of the optical chains in the camera device shown in greater detail.

While seven optical chains are shown in FIG. 2, it should be appreciated that other numbers of optical chains are possible. For example, as shown in FIGS. 7A and 7B seventeen camera modules are used in a single camera device in some embodiments. Camera devices including even larger numbers of optical chains are also possible.

The use of multiple optical chains has several advantages over the use of a single optical chain. Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

Given the small size of the optical sensors (e.g., individual pixel elements) the dynamic range, in terms of light sensitivity, is normally limited with the sensors becoming easily saturated under bright conditions. By using multiple optical chains corresponding to different exposure times the dark portions of a scene area can be sensed by the sensor corresponding to the longer exposure time while the light portions of a scene area can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 3 is a cross section perspective of the camera device 100 shown in FIGS. 1 and 2. Dashed line 101 in FIG. 2 shows the location within the camera device to which the cross section of FIG. 3 corresponds. From the side cross section, the components of the first, seventh and fourth optical chains are visible.

As illustrated in FIG. 3 despite including multiple optical chains the camera device 100 can be implemented as a relatively thin device, e.g., a device less than 2, 3 or 4 centimeters in thickness in at least some embodiments. Thicker devices are also possible, for example devices with telephoto lenses, and are within the scope of the invention, but the thinner versions are particularly well suited for cell phones and/or tablet implementations. As will be discussed below, various techniques such as the use of light redirection elements and/or non-circular lenses can be used in conjunction with small sensors, such as those commonly used in handheld cameras, to support relatively large focal lengths, e.g., camera modules of 150 mm equivalent focal length to a full frame DSLR camera, 300 mm equivalent focal length to a full frame DSLR camera or above in a relatively thin camera device format.

As illustrated in the FIG. 3 diagram, the display device 102 may be placed behind the plurality of optical chains 130 with the processor 110, memory and other components being positioned, at least in some embodiments, above or below the display and/or optical chains 130. As shown in FIG. 3, each of the optical chains OC 1 121, OC 7 145, OC 4 133 may, and in some embodiments do, include an outer opening, a light redirection element such as a mirror or prism, a filter F, and a lens L2 which proceed a sensor S which captures and measures the intensity of light which passes through the outer opening serving as the aperture, the lens L2 and the filter F to reach the sensor S. The filter may be a color filter or one of a variety of other types of light filters or may be omitted depending on the particular optical chain embodiment or configuration. In some embodiments the filter is an IR filter.

Note that while supporting a relatively large light capture area and offering a large amount of flexibility in terms of color filtering and exposure time, the camera device 100 shown in FIG. 3 is relatively thin with a thickness that is much less, e.g., ⅕th, 1/10th, 1/20th or even less than the overall side to side length or even top to bottom length of the camera device visible in FIG. 2.

Figure 4A:
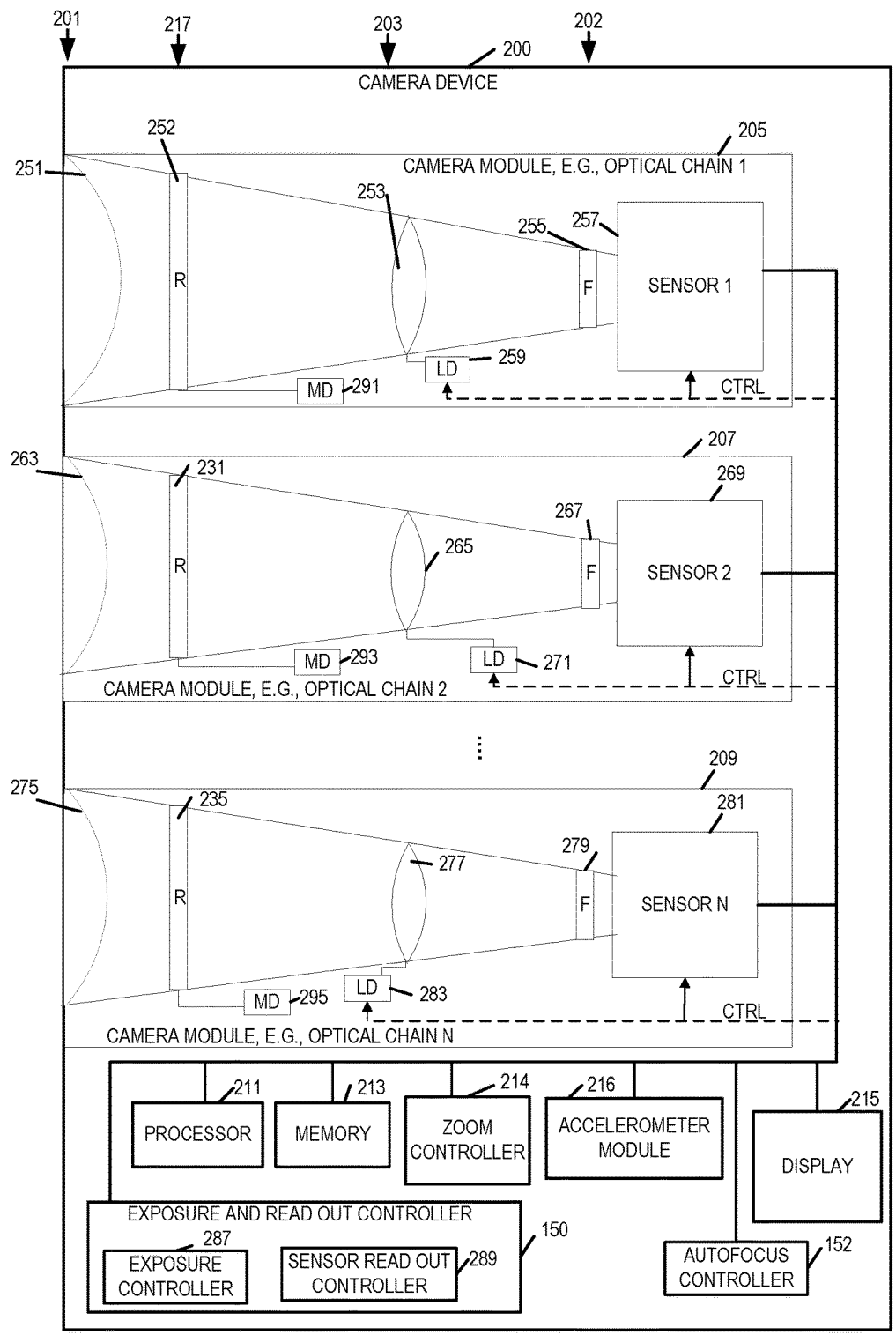
FIG. 4A illustrates a camera device implemented in accordance with another embodiment.

FIG. 4A illustrates a camera device 200 implemented in accordance with the invention. The FIG. 4 camera device 200 includes many or all of the same elements shown in the device 100 of FIGS. 1-3. Exemplary camera device 200 includes a plurality of optical chains (OC 1 205, OC 2 207, . . . , OC X 209, a processor 211, memory 213 and a display 215, coupled together. OC 1 205 includes outer opening 251, a light redirection element R 252, a hinge (or mirror) drive MD 291, an inner lens L2 253, a filter 255, sensor 1 257, and LD 259. The MD 291 can be used to move a position of a hinge to which the light redirection device (R) 252, e.g., mirror, is mounted and thus move the mirror to change the scene area to which the module 205 is directed without moving the optical chain 205. Moving (e.g., rotating about a hinge) the mirror 252 to change the scene area to which the module 205 is directed is especially useful in an embodiment where the outer opening 251 is a plane piece of glass or a plastic piece with no optical power as is the case in some embodiments.

Figure 4B:
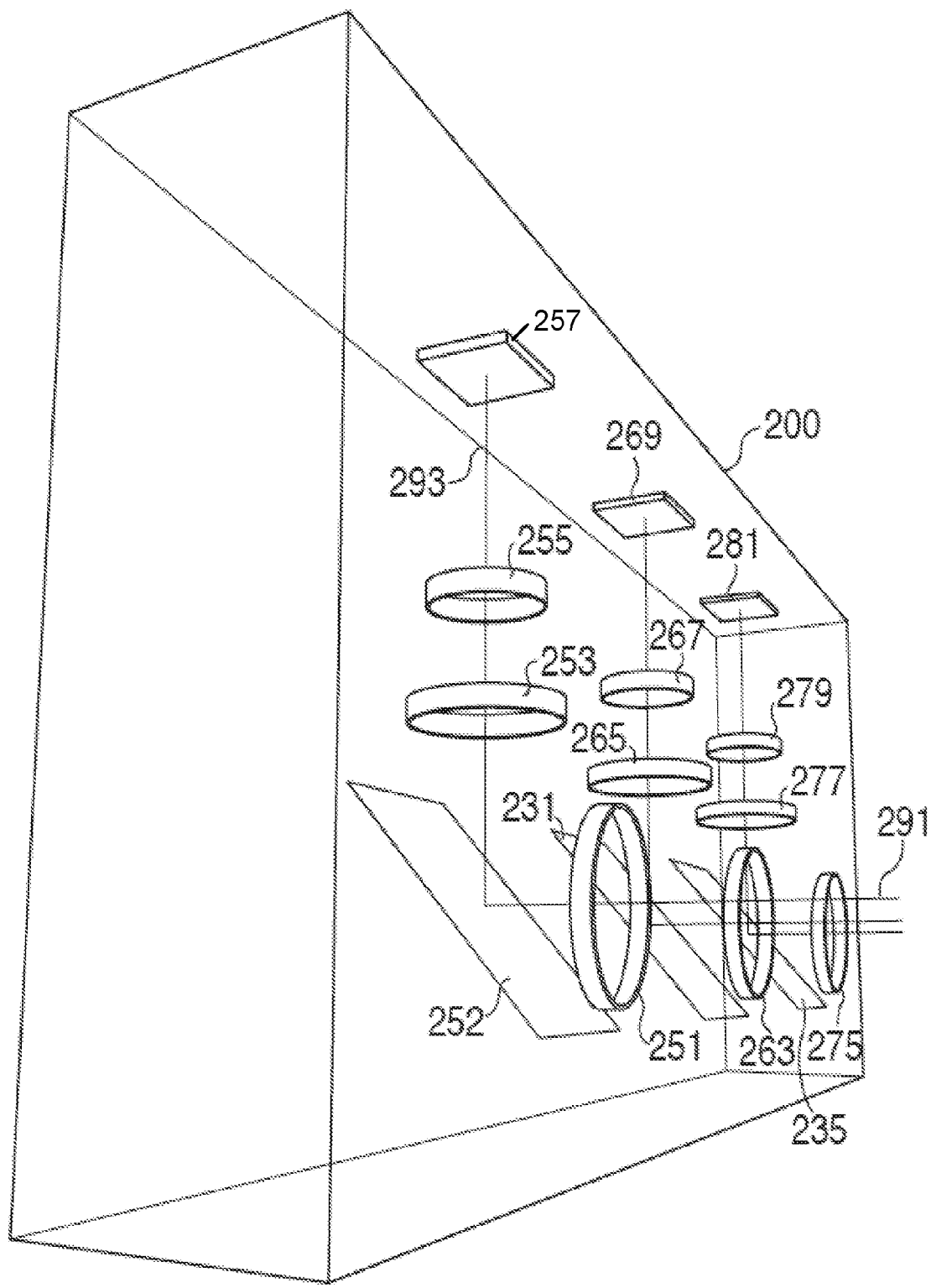
FIG. 4B illustrates the optical chains of the camera device shown in FIG. 4A, as implemented in one particular exemplary embodiment, in greater detail.
Figure 5:
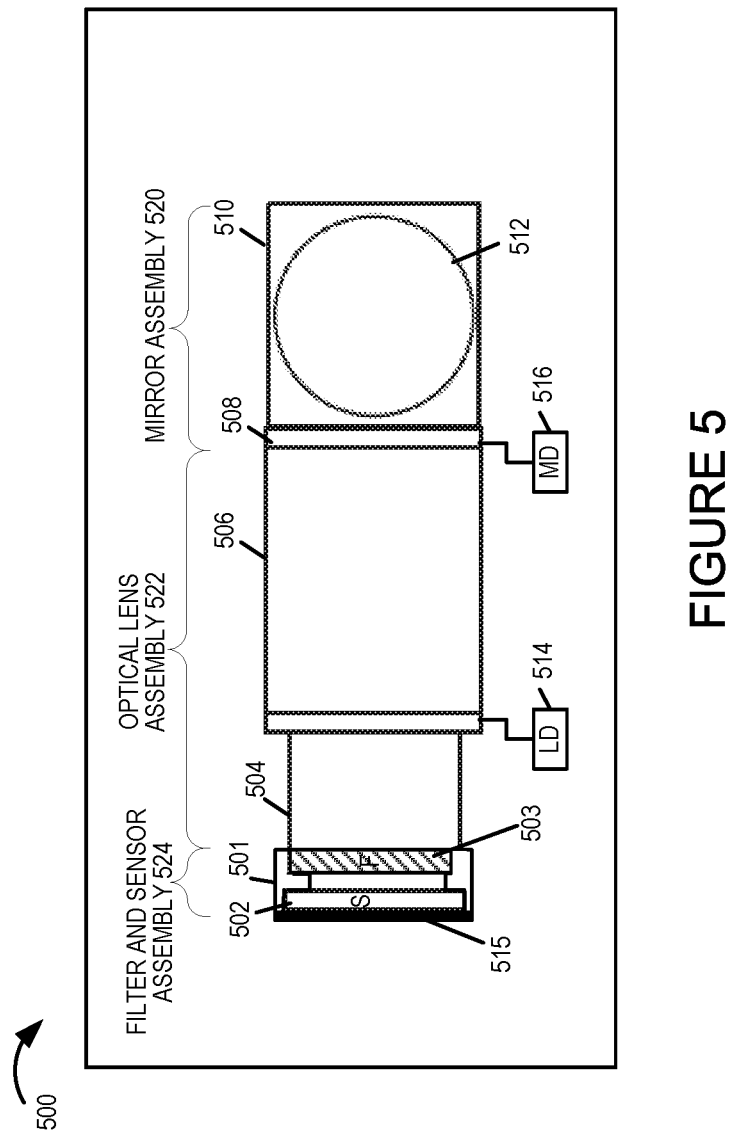
FIG. 5 illustrates an exemplary optical chain, e.g., camera module, which may be used as one of the optical chains included in the camera device of FIG. 1, FIG. 6, FIG. 7 or various other embodiments.

The optical chains shown in FIG. 4A can be arranged in various positions within the camera 200. The elements in FIG. 4B which are the same as those shown in FIG. 4A are identified using the same references numbers and will not be described again. FIG. 4B shows the configuration of the optical chains in an arrangement where light enters via the front or face of the camera 200 and is redirected to sensors 257, 269, 281, of the first through third camera modules respectively, mounted on the inside top portion of the camera housing which forms the outer portion of camera 200.

As can be seen in the FIG. 4B embodiment, light entering in the horizontal dimension is redirected upward in the vertical. For example, light entering through outer opening 251 of the first optical chain 205 is redirected upward by mirror 252 so that it passes though the inner lens 253 and the filter 255 as it travels towards sensor 257. An optical chain such as the first optical chain 205, that has a light redirection element, such as the element 252, can be divided, for purposes of discussion, into two parts, Part A and Part B. Part A consists of all those elements in the optical chain that are in the light path before the light redirection element 252 and Part B consists of all the optical elements (including the image sensor) that are in the light path after the light redirection element. The optical axis of the optical chain 205 as seen from outside the camera is the optical axis 291 of Part A. Light traveling into the optical chain 205 along the optical axis 291 will be redirected upward along the optical axis 293 of Part B of the first optical chain.

In one particular exemplary embodiment of the optical chain 205, Part A contains no optical elements with any optical power, e.g., Part A contains plane glass or filters but no lenses. In this case the optical axis of the optical chain as seen from outside the camera is simply along a light path that gets redirected along the optical axis 293 of Part B by the light redirection element. In some embodiments one or more lenses 253 are included in Part B of the optical chain which have an optical power. Thus, it should be appreciated that in at least some embodiments the outer opening 251 may be implemented as a flat glass plate or relatively flat plastic or glass element which does not protrude from the surface of the camera 200. This reduces the risk of scratches and also reduces the possibly that an outer portion which is covering or forming the opening will get caught when inserting or removing it from a pocket or case as might be the case if the opening is covered by a curved lens protruding from the camera.

It should be appreciated that the optical axis of the second and third camera modules are similar to that of the first optical module 205 and that the components of the optical chains may also be grouped into two parts, Part A which corresponds to components proceeding the mirror of the optical chain and Part B which corresponds to components subsequent the mirror of the optical chain. From the perspective of the optical path of an optical chain, the optical path like the components may be grouped as Part A and Part B with the mirror providing the transition point between Part A of an optical path and Part B of the optical path.

In some but not all embodiments, processor 211 of camera device 200 of FIG. 4A is the same as or similar to processor 110 of device 100 of FIG. 1, memory 213 of device 200 of FIG. 4A is the same as or similar to the memory 108 of device 100 of FIG. 1, the zoom control module 214 of device 200 is the same as or similar to the zoom control module 140 of device 100, the accelerometer module 216 of device 200 is the same as or similar to the accelerometer module 122 of device 100 and display 215 of device 200 of FIG. 4A is the same as or similar to the display 102 of device 100 of FIG. 1.

OC 2 207 includes outer opening 263, light redirection device 231, mirror drive 293, inner lens 265, filter 267, sensor 2 269, and LD 271. OC N 209 includes outer opening 275, light redirection device 235, mirror drive 295, inner lens 277, filter 279, sensor N 281, and LD 283. The exposure and read out controller 150 controls sensors to read out, e.g., rows of pixel values, in a synchronized manner while also controlling the exposure time. In some embodiments the exposure and read out controller 150 is a rolling shutter controller including an exposure controller 287 and a sensor read out controller 289. An autofocus controller 152 is included to control the lens drives 259, 271 and 283 in some embodiments.

In the FIG. 4A embodiment the optical chains (optical chain 1 205, optical chain 2 207, . . . , optical chain N 209) are shown as independent assemblies with the lens drive of each module being a separate LD element (LD 259, LD 271, LD 283), respectively. Each of the LDs shown adjusts the position of the corresponding lens to which it is connected as part of a zooming and/or focus operation. In some embodiments the LD controls the position of a lens and/or sensor in which case the LD is connected to both a lens support mechanism or lens and the sensor.

In FIG. 4A, the structural relationship between the mirror and various lenses and filters which precede the sensor in each optical chain can be seen more clearly than in some of the other figures. While four elements, e.g. an opening, lens (see columns 201 and 203), a light redirection device R (see col. 217), and the filter (corresponding to column 202) are shown in FIG. 4A before each sensor, it should be appreciated that a much larger combinations (e.g., numbers) of lenses, light redirection elements and/or filters may precede the sensor of one or more optical chains with anywhere from 2-10 elements being common and an even larger number of elements being used in some embodiments, e.g., high end embodiments and/or embodiments supporting a large number of filter and/or lens options. Furthermore it should be appreciated that all illustrated elements need not be included in all optical chains. For example, in some embodiments optical chains having relatively short focal lengths may be implemented without the use of a light redirection element being used, e.g., to redirect the light by 90 degrees, since the optical chain with a short focal length can be implemented in a straight but still relatively compact manner given the short focal length.

In some but not all embodiments, optical chains are mounted in the camera device with some, e.g., the shorter focal length optical chains extending in a straight manner from the front of the camera device towards the back. However, in the same camera, longer focal length camera modules may and sometimes do include light redirection devices which allow at least a portion of the optical path of a camera module to extend sideways allowing the length of the optical axis to be longer than the camera is deep. The use of light redirection elements, e.g., mirrors, is particularly advantageous for long focal length camera modules given that the overall length of such modules tends to be longer than that of camera modules having shorter focal lengths. A camera may have a wide variety of different camera modules some with light redirection elements, e.g., mirrors, and others without mirrors. Filters and/or lenses corresponding to different optical chains may, and in some embodiments are, arranged in planes, e.g. the apertures of the outermost lenses may be configured in a plane that extends parallel to the face of the camera, e.g., a plane in which the front of the camera both extends vertically and horizontally when the camera is in a vertical direction with the top of the camera both being up.

FIG. 5 shows an optical chain, e.g., camera module, 500 which is used in various exemplary embodiments. A plurality of optical chains of the type illustrated in FIG. 5 are used in a camera device such as camera 600 discussed in detail below. The camera module 500 is an optical chain that includes an assembly of different elements integrated together to form the camera module. As illustrated, camera module 500 includes a mirror assembly 520, an optical lens assembly 522 and a filter and sensor assembly 524. The mirror assembly 520 of the camera module 500 includes an outer opening 512 which may be covered by a flat glass/plastic plate, a light redirection device, e.g., mirror, 510 positioned behind the opening 512, and a mirror hinge 508. The mirror hinge 508 is coupled to the mirror drive (MD) 516. The optical elements assembly 522 of the camera module 500 includes a first cylindrical module portion 506 and a second cylindrical module portion 504, with the optical elements assembly 522 being coupled to a lens drive 514. The filter and sensor assembly 524 of the camera module 500 includes a filter mounted on a filter mount 501 and a sensor 502 placed on a mounting board 515. Light enters the optical chain 500 via the opening 512 and is redirected by the mirror 510 so that it reaches the sensor 502 at the back of the optical chain. The first and second cylindrical portions 504, 506 can house one or more lenses and in some cases filters as well as other optical components through which light may pass before reaching the sensor 502. While the mirror 510 is normally used to redirect light 90 degrees so that light entering through the opening 512 (which may be positioned on the face of the camera) along it's optical axis will be redirected along the optical axis of Part B of the optical chain 500 so that is travels towards the side of the camera allowing for the optical chain 500 to effectively use the side to side distance of the camera device in which the optical chain 500 is mounted, the mirror drive 516 may move the position of the hinge 508 and thus the mirror 510 to alter the angle of redirection so that it varies from 90 degrees. Thus, the direction in which the optical chain 500 effectively points may be altered by moving all or a portion of the hinge 508 and mirror 510. In some embodiments, the axis of the hinge is perpendicular to the Part B of the optical axis and parallel to the place of the front face of the camera 600. In some embodiments, the opening 512 is covered with a plane glass with no optical power.

The MD 516 may be implemented using a motor or other mechanical mechanisms which can be used to drive or change the position of the mirror 510 and/or hinge 508 which connects the mirror to the other components of the camera module such as cylindrical portion 506.

The cylindrical or barrel portions 504, 506 of the optical elements assembly 522 may be moved by lens drive 514 so that they slide relative to each other, e.g., barrel portion 504 may be moved so that it moves further into or out of the barrel portion 506 thereby altering the distance from the opening 512 to the sensor 502 as part of a focus or zoom operation.

It should be appreciated that the optical chain 500 allows for relatively long optical chains to be positioned in a camera device which has a depth which is less than the overall length of the optical chain 500. The camera module 500 is particular well suited for implementing camera devices which include multiple optical chains but which are still intended to be relatively thin to facilitate storage in a pocket or other storage device.

Figure 6A:
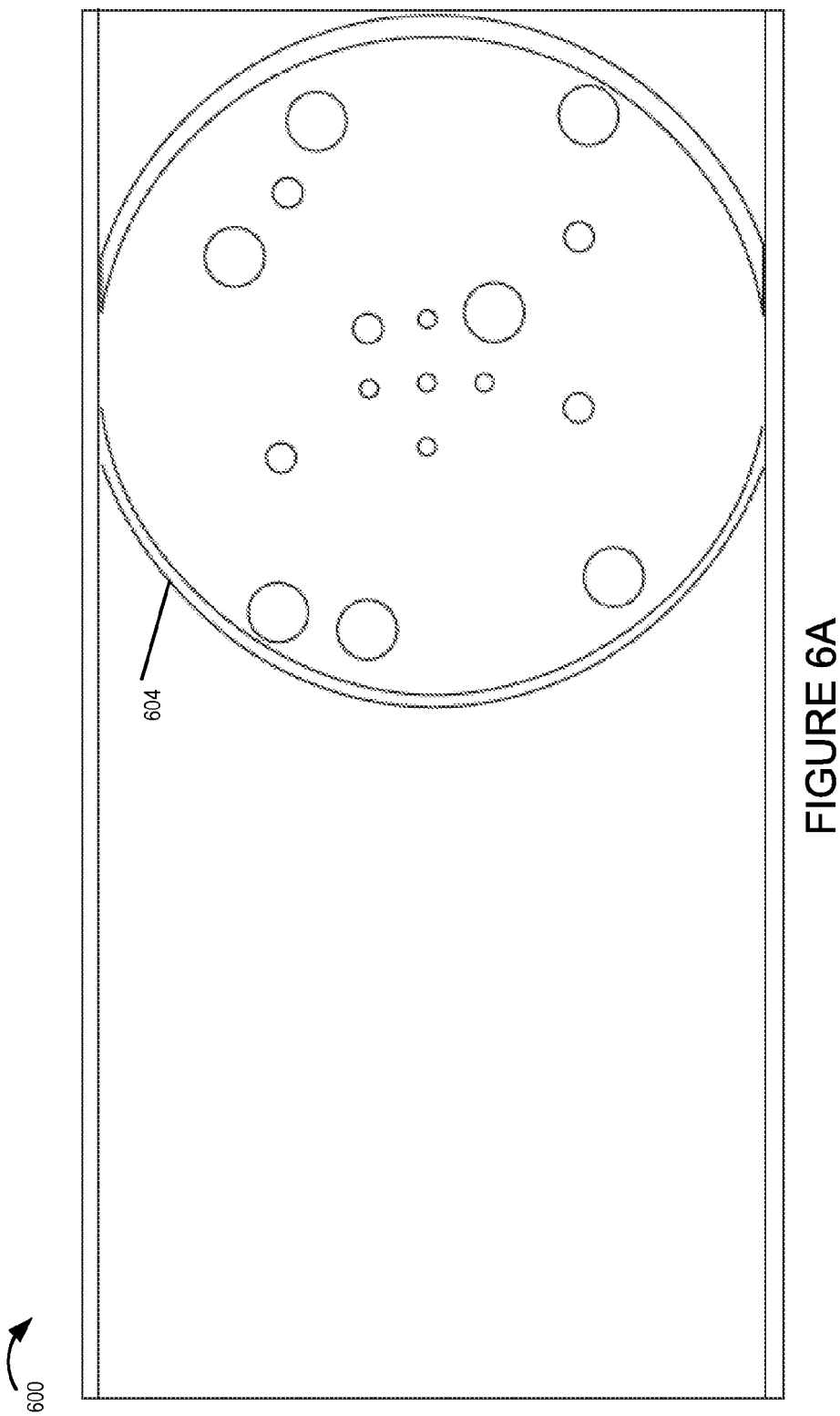
FIG. 6A is an illustration of an exemplary camera including multiple optical chains in accordance with one feature of the invention showing the arrangement of individual camera modules.

FIG. 6A is a frontal view of the camera device 600 and the optical chain arrangement of the camera device with the 15 outer openings being clearly visible as circles in the area 604. Note that the diameter of the smallest lenses is "d" which correspond to the camera modules having the smallest focal length, the medium focal length modules have a diameter 2d, and the camera modules having the largest focal length have a diameter 4d. This results in the camera modules having the same 'f stop' or 'f number' given the focal length relationship f1 being ¼ the largest focal length (f3) and one half the focal length of the medium focal length f2 of the camera modules having a medium focal length. The 'f number' is the ratio of the focal length to the aperture diameter and determines the diffraction limit of the camera modules. The smaller the f number, the less likely it is that the camera module will be diffraction limited. Smaller f numbers usually corresponded to larger optical complexity in the camera module. Small lenses with 5 or 6 molded plastic elements these days can be manufactured in a cost effective manner for f numbers around 2.4. Accordingly, in some embodiments plastic lenses made of multiple plastic elements are used.

Figure 6B:
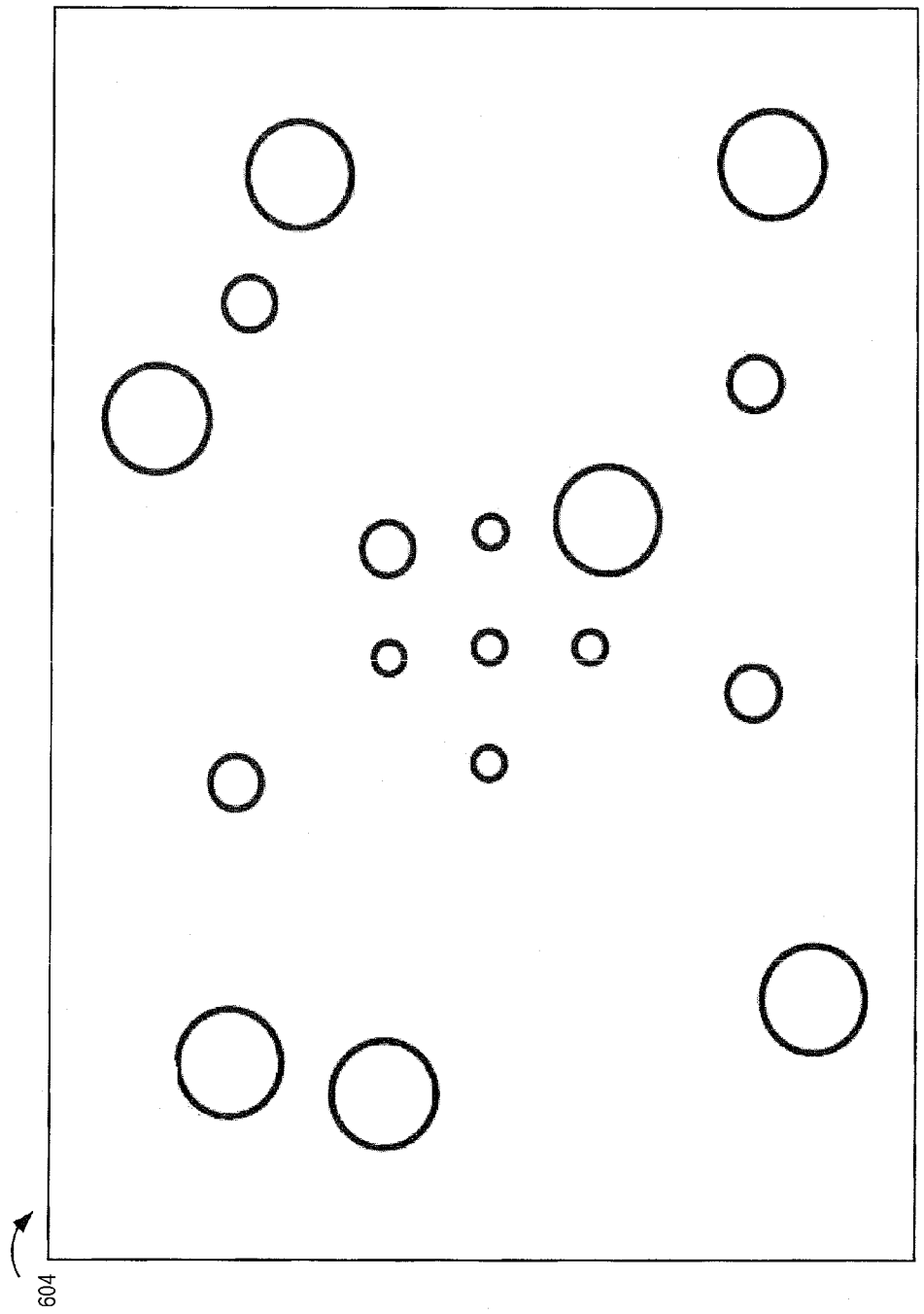
FIG. 6B illustrates the arrangement of individual optical chains in the camera device shown in FIG. 6A allowing for better appreciation of the arrangement of optical chain from a front view of the camera device.

FIG. 6B shows an enlarged version of the optical chain arrangement of the camera 600 as viewed from the front. In FIG. 6B the outer openings of the three different sizes can be clearly seen with the largest diameter openings corresponding to camera modules having the largest focal length and thus zoom, e.g., magnification.

FIG. 7A is a diagram 1200 showing how the 17 optical chains, e.g., camera modules, of the camera 600 can be arranged within the body of the camera 600. The seven optical chains 1202, 1206, 1210, 1212, 1216 1220, 1222 with the largest lenses and largest supported focal lengths are implemented using optical chains of the type shown in FIG. 5. Similarly, the five camera modules 1204, 1208, 1214, 1218, 1224 with the medium diameter lenses and medium supported focal lengths are also implemented using optical chains of the type shown in FIG. 5. The five optical chains 1226, 1228, 1230, 1232 and 1234 having the smallest diameter outer openings, e.g., light entrance openings, and smallest focal lengths are implemented using optical chains which do not use mirrors and extend straight toward the back of the camera. Optical chains of the type used in the FIG. 3 embodiment may be used for the optical chains 1226, 1228, 1230, 1232 and 1234. However, it should be appreciated that optical chains of the type illustrated in FIG. 5 may be and in some embodiments are, used as the optical chains 1226, 1228, 1230, 1232 and 1234.

From the FIG. 7A example which may be considered as a frontal view with the front of the camera housing removed to allow viewing of the camera modules, it can be seen how a larger number of camera modules can be incorporated into a single camera device 600 allowing for the simultaneous and/or synchronized capture of multiple images of the same or different portions of a scene area using a single camera. The camera device can then combine multiple images to generate a composite image having image attributes and/or qualities such as a number of pixels which exceeds that possible using a single one of the camera modules of the camera 600.

FIG. 7B illustrates a perspective view 1250 of the camera device 600 showing the arrangement of various optical chains in the camera device and the elements of the optical chains in the camera device in greater detail. Thus FIG. 7B presents a more detailed illustration of the plurality of optical chains (OCs) 1202, 1204, 1206, 1208, 1210, 1212, 1214, 1216, 1218, 1220, 1222, 1224, 1226, 1228, 1230, 1232 and 1234 having various corresponding focal lengths as discussed with regard to FIG. 7A in detail.

As illustrated in FIG. 7B, the camera 600 has a depth D1 which represents the thickness of the camera 600 from the front surface of the camera (indicated by arrow 1223) to the back/rear surface of the camera (indicated by arrow 1227). While not shown in FIGS. 6A-6B, 7A-7B illustrations, in some embodiments the camera device 600 includes the same or similar elements as the camera device 100/200 of FIGS. 1 and/or 4A. Accordingly it should be appreciated that camera 600 is capable of performing the various functions and/or operations discussed with regard to camera 100/200 using the various elements, e.g., such as the processor 110, memory 108, exposure and read out controller 150 etc., shown and discussed with regard to camera 100/200.

In some embodiments the elements included in the optical chains 1202, 1206, 1210, 1212, 1216, 1220, 1222, 1204, 1208, 1214, 1218, 1224 are similar to those discussed above with regard to FIGS. 4B and 5 while the elements included in the optical chains 1226, 1228, 1230, 1232 and 1234 are similar to those discussed above with regard to FIG. 3. In the embodiment of FIG. 7B each OC uses a round outer opening.

The OC 1202 includes an outer opening 1203, a light redirection device 1205, e.g., mirror, positioned behind the opening 1203, a first inner lens 1207, a second inner lens 1213, a filter 1215 and a sensor 1217. As discussed earlier in some embodiments the outer opening is covered by a flat glass plate or a flat plastic element. In some embodiments the OCs 1202, 1206, 1210, 1212, 1216, 1220, 1222 have the same focal length (largest focal length compared to other OCs in FIG. 7B) and use similar elements such as the mirror, filter, sensor etc. Accordingly, the elements corresponding to OCs 1206, 1210, 1212, 1216, 1220, 1222 have been identified using the same reference numerals used for identifying similar elements in the OC 1202 but with the reference numbers in these OCs followed by a prime ('), double prime ("), triple prime ('") etc. For example, OC 1206 includes an outer opening 1203', a light redirection device 1205', e.g., mirror, positioned behind the opening 1203', a first inner lens 1207', a second inner lens 1213', a filter 1215', and a sensor 1217'. The OC 1210 includes an outer opening 1203", a light redirection device 1205", a first inner lens 1207", a second inner lens 1213", a filter 1215", and a sensor 1217". The OC 1212 includes an outer opening 1203'", a light redirection device 1205'", a first inner lens 1207'", a second inner lens 1213'", a filter 1215'", and a sensor 1217'". The OC 1216 includes an outer opening 1203"", a light redirection device 1205"", a first inner lens 1207"", a second inner lens 1213"", a filter 1215"", and a sensor 1217"". The OC 1220 includes an outer opening 1203""', a light redirection device 1205""', a first inner lens 1207""', a second inner lens 1213""', a filter 1215""', and a sensor 1217""'. The OC 1222 includes an outer opening 1203"""", a light redirection device 1205"""", a first inner lens 1207"""", a second inner lens 1213"""", a filter 1215"""", and a sensor 1217"""".

Similarly the elements corresponding to OCs 1204, 1208, 1214, 1218, 1224 which have the same focal lengths (intermediate) have been identified using the same reference numerals. The OC 1204 includes an outer opening 1233, a light redirection device 1235, e.g., mirror, positioned behind the opening 1233, a first inner lens 1237, a second inner lens 1243, a filter 1245, and a sensor 1247. Optical chain 1208 includes an outer opening 1233', a light redirection device 1235', e.g., mirror, positioned behind the opening 1233', a first inner lens 1237', a second inner lens 1243', a filter 1245', and a sensor 1247'. OC 1214 includes an outer opening 1233", a light redirection device 1235", a first inner lens 1237", a second inner lens 1243", a filter 1245", and a sensor 1247". OC 1218 includes an outer opening 1233"', a light redirection device 1235m, a first inner lens 1237"', a second inner lens 1243"', a filter 1245"', and a sensor 1247m and the OC 1224 includes an outer opening 1233"", a light redirection device 1235"", a first inner lens 1237"", a second inner lens 1243"", a filter 1245"", and a sensor 1247"".

As discussed with regard to FIG. 4B, an optical chain such as the optical chain 1202 (or OCs 1206, 1210, 1212, 1216, 1220, 1222, 1204, 1208, 1214, 1218, 1224), that has a light redirection element, such as the element 1205, can be divided, for purposes of discussion, into two parts. The optical axis of the optical chain 1202 as seen from outside of the front of the camera is the optical axis of a first part 1201 (entering the OC from the front 1223 of the camera 600 via the outer opening 1203). Light traveling into the optical chain 1202 along the optical axis is redirected by the redirection element 1205 and traverses a second part 1209 of the first optical chain and reaches the sensor 1217. Similarly, the optical axis of the optical chain 1204 includes a first part 1211 and a second part 1219 after light redirection by the redirection element 1235, the optical axis of the optical chain 1206 includes a first part 1221 and a second part 1229, the optical axis of the optical chain 1208 includes a first part 1231 and a second part 1239, the optical axis of the optical chain 1210 includes a first part 1241 and a second part 1249, the optical axis of the optical chain 1212 includes a first part 1251 and a second part 1259, the optical axis of the optical chain 1214 includes a first part 1261 and a second part 1269, the optical axis of the optical chain 1216 includes a first part 1271 and a second part 1279, the optical axis of the optical chain 1218 includes a first part 1278 and a second part 1288, the optical axis of the optical chain 1220 includes a first part 1281 and a second part 1289, the optical axis of the optical chain 1222 includes a first part 1291 and a second part 1299, and the optical axis of the optical chain 1224 includes a first part 1292 and a second part 1298.

The other optical chains OCs 1226, 1228, 1230, 1232 and 1234 (smallest focal length OCs) while each having an outermost opening 1252, 1253, 1254, 1255, and 1256 respectively through which light enters, the OCs 1226, 1228, 1230, 1232 and 1234 do not have light redirection elements in the FIG. 7B example. While not shown in FIG. 7B the OCs 1226, 1228, 1230, 1232 and 1234 each has an optical axis which is perpendicular to the front face 1223 of the camera 600.

The function of the various elements of an OC such as the outer openings, inner lenses, mirror, filters and sensors, has been discussed earlier, for example in the discussion of FIGS. 4B and 5. Since the function of the elements of the OCs shown in FIG. 7B is the same or similar to that discussed with regard to FIGS. 4A-4B and 5, the discussion will not be repeated.

Light enters each of the OCs 1202, 1206, 1210, 1212, 1216, 1220, 1222, 1204, 1208, 1214, 1218, 1224 via their respective outer opening and is redirected by their respective redirection elements so that it reaches the respective sensors at the back of each of the optical chains. In many cases the outer opening through which the light enters the OC is referred to as the entrance pupil via which the light enters. For example, light entering through outer opening 1203 of the optical chain 1202 (e.g., from the front 1223 of the camera 600 as indicated by the first optical axis 1201) is redirected by mirror 1205 so that it passes through the first inner lens 1207, the second inner lens 1215 and the filter 1213 as it travels towards sensor 1217. More or less number of elements, e.g., lenses, filters etc., may be included in each of the OCs in some embodiments. Different optical chains may use different lenses while still using a sensor of the same shape and/or resolution as the other optical chains in the camera device 600.

It should be appreciated that the light redirection elements, e.g., such as a hinged mirror or other light redirection device such as a prism, positioned behind the entrance pupil or opening of an OC can be moved and/or rotated which results in changing of the optical axis of the OC seen from outside the outer openings of the corresponding OC. That is the optical axis of an optical chain as seen from outside the camera (discussed above as the optical axis of a first part such as optical axes 1201, 1211, 1231 etc.) can be changed by controlling the light redirection elements of the corresponding OC. Thus it should be appreciated that while in FIG. 7B example the optical axes 1201, 1211, 1221, 1231, . . . 1298, 1299 appear to be parallel, in some embodiments by controlling the light redirection element such as the mirror placed behind the outer opening in the corresponding optical chains, the optical axes can be changed such that the optical axes of one or more OCs are not parallel to each other. The ability to change the optical axis of the optical chain by controlling the movement of a mirror, provides the same effect as if the camera is being pointed in a given direction, e.g., to take pictures in that direction, and thus provides the ability to capture images from different perspectives without actually moving the camera device.

In some embodiments the camera 600 includes a processor (e.g., processor 110, 211) configured to generate a composite image by combining at least a first and a second image. In some embodiments the processor is configured to generate the composite image from first, second, third, fourth, fifth and sixth images. In some embodiments the processor is configured to generate the composite image from the first, second, third, fourth, fifth, sixth and seventh images. In some embodiments the processor is further configured to control storage of the generated composite image in the device memory, e.g., memory 108, and/or output of the composite image on a display, e.g., display 102, and/or transmission of the captured images or the composite image to another device via an interface such as interface 114.

Figure 8:
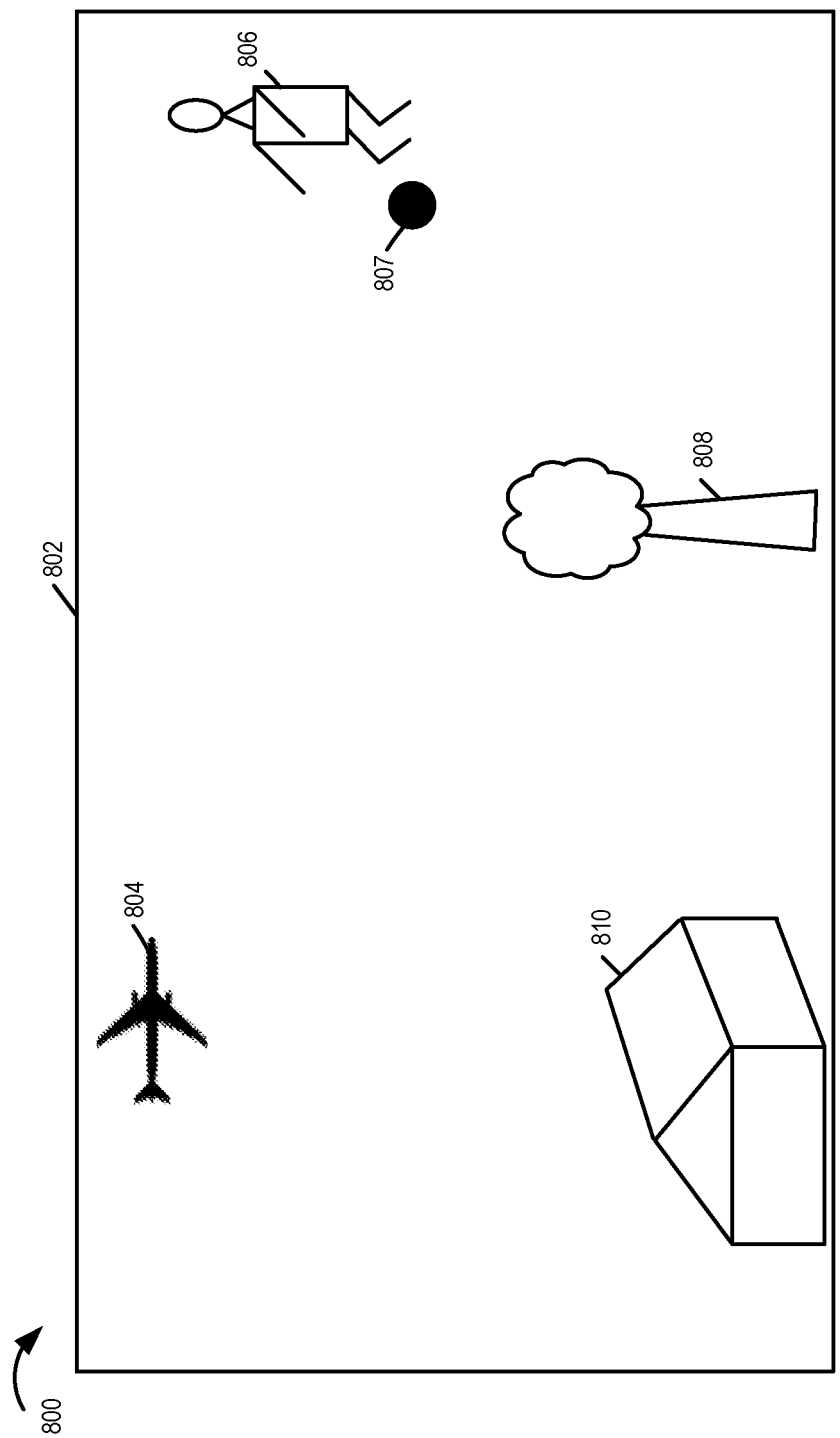
FIG. 8 shows an exemplary scene including a scene area which may have its image captured by camera modules of a camera implemented in accordance with one or more embodiments of the invention.

FIG. 8 is a drawing 800 illustrating an exemplary scene area 802 which may have all or portions of its image captured by camera modules of a camera implemented in accordance with one or more embodiments of the invention. Scene area 802 includes multiple objects at least some of which are stationary while others are in motion. In the example, the scene area 802 includes an airplane 804, a person 806, a ball 807, a tree 808 and a house 808. Each of the objects in the scene 802 may have a different corresponding depth in the scene 802.

Figure 9:
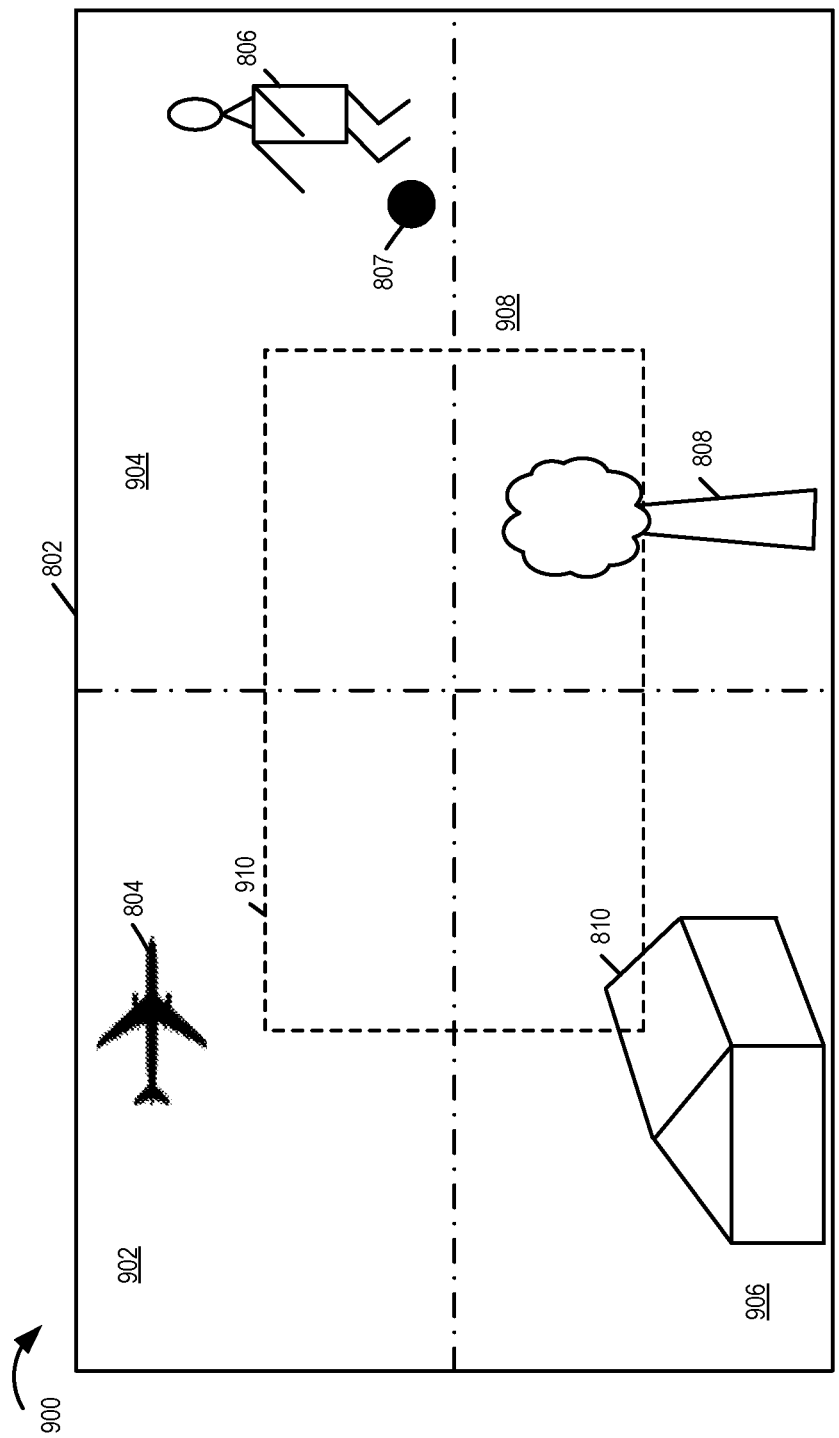
FIG. 9 shows how different camera modules of a camera including multiple camera modules may capture different portions of the scene area of interest shown in FIG. 8.

FIG. 9 is a drawing 900 illustrating conceptually how different optical chains, e.g., camera modules, of a camera, such as the camera device 600 of FIG. 6 which includes multiple optical chains (as shown in FIGS. 7A and 7B), some of which have different focal lengths can capture different size portions of a scene area 802. The different capture sizes corresponding to the various different camera modules correspond to field of view (FOV) of the respective camera modules in some embodiments.

For purposes of discussion, the capture and combining of images corresponding to different scene areas will be explained using the camera device 600 by referring to FIG. 7A which shows the arrangement of optical chains in camera 600. Consider for purposes of discussion that the camera device 600 includes the 17 modules arranged as shown in FIG. 7A. As previously discussed in the FIG. 7A example, three different focal lengths, f1, f2 and f3 are used where f1<f2<f3; f1 is ½ f2; and f2 is ½ f3.

For purposes of discussion the first through seventh camera modules 1202, 1206, 1210, 1212, 1216 1220, 1222, respectively, are the modules with the largest lenses (and thus largest apertures in various embodiments) and largest supported focal lengths (f3). For simplicity in the discussion below, it is further assumed that the distances between the various camera modules is much smaller than the distance between the camera and all the objects in the scene. This is however not a limitation of the described invention but meant only to make the explanation easier to follow.

The five medium sized camera modules which are the eighth through 12th camera modules correspond to reference numbers 1204, 1208, 1214, 1218, 1224, respectively and have medium diameter lenses and medium supported focal lengths (f2). The five camera modules which are the 13th through 17th camera modules correspond to reference numbers 1226, 1228, 1230, 1230 and 1234 and have the smallest diameter lenses and smallest focal length (f1).

It should be appreciated that the camera modules with the largest focal length f3 will have a relatively smaller field of view in comparison to camera modules with smaller focal lengths and capture smaller portion of a scene area of interest given that they provide the greatest magnification. Assuming that camera modules of the different focal lengths use sensors with the same total pixel count, the modules with the larger focal length (f3) will provide an image with a higher pixel to scene area ratio since more pixels will be used to capture an image of a smaller scene area than will be the case with the medium (f2) and small focal length (f1) camera modules.

It should be appreciated that given the difference in magnification between the modules with different focal lengths (f1, f2, f3) the scene area captured by the small focal length (f1) camera modules will correspond to portion of the scene area of interest which is approximately 16 times the size of the portion the scene area of interest which is captured by the camera modules with the largest (f3) focal length. The portion of the scene area of interest captured by camera modules with the intermediate focal length (f2) will be 4 times the size of the portion of the scene area of interest captured by the camera modules with the largest focal length (f3) and ¼ the size of the portion of the scene area of interest captured by the camera modules with the smallest focal length (f1).

The relationship between the scene areas captured by camera modules corresponding to the f1 and f2 focal lengths can be appreciated in the context of the FIG. 9 example which shows 7 distinct scene areas. In some embodiments f1=35 mm and f2=70 mm.

In the FIG. 9 example scene area of interest is identified by reference 802 as used in FIG. 8. The scene area 802 corresponds to the full scene area of interest also shown in FIG. 8. For purposes of explanation consider that the scene area 802 is captured by optical chains having the focal length f1, i.e., by smaller focal length optical chains. Assume for discussion purposes that (f1) camera module 1228 is used to capture the scene area 802 represented by the largest rectangle in FIG. 9. Note that the actual image captured by 1228 may be of a slightly larger scene area to ensure that the scene area of interest is captured.

Further consider that f2 camera module 1208 is used to capture a second scene area 902 which is represented by the rectangle in the top left corner in FIG. 9, that (f2) camera module 1204 is used to capture a third scene area 904 represented by the rectangle in the top right corner in FIG. 9, that (f2) camera module 1214 is used to capture a fourth scene area 906 represented by the rectangle in the bottom left corner in FIG. 9, that (f2) camera module 1218 is used to capture a fifth scene area 908 represented by the rectangle in the bottom right corner in FIG. 9 and that (f2) camera module 1224 is used to capture sixth scene area 910 represented by the rectangle with dashed lines in the center portion. Again as with the capture of the other scene areas, the actual images captured by the modules 1204, 1208, 1218, 1214 and 1224 may be of slightly larger scene areas to ensure that the respective scene areas are fully contained in the captured images.

Note that the relative position of the outer openings of the camera modules shown in drawing 1200 are known and fixed in some embodiments. However, in some embodiments the modules 1204, 1208, 1218, 1214 and 1224 are the same or similar in there elements and function to the module 500 in FIG. 5 which includes a mirror 510 that can be driven, e.g., moved or rotated by the hinge (mirror) drive 516 to change the angle of the mirror 510. While the mirror drive 516 can rotate the mirror around the hinge axis and thus change its angle, the hinge 508 prevents motion in other directions and thus the optical axis (outside the camera) rotates in a plane perpendicular to the axis of the hinge. When the mirror 510 is at a 45 degree angle, the light entering the opening 512 along it's optical axis is deflected 90 degrees into the optical axis of Part B of the module 500. While we describe here a mirror 510 that is hinged and can rotate along an axis, in some other embodiments the place of the mirror is moved to a different plane such that this motion is not constrained to be rotation along any fixed axis. In this case the optical axis of the camera module can be made to point in any desired direction (towards any point in the scene of interest).

While some modules use mirror that are movable and hinged, in other embodiments one or more of the camera modules are implemented with fixed position mirrors allowing the moveable hinge 508 and mirror drive 516 to be omitted. For example, in one embodiment the camera modules used to capture the full scene area of interest have fixed mirrors while the camera modules used to capture small portions of the scene area of interest each include a movably hinged mirror. While combinations of camera modules with some having fixed mirrors and others having movable mirrors can be used, in at least one embodiment each of the multiple camera modules included in an exemplary camera device have movable mirrors.

The mirror/hinge drive 516 is controlled by the processor 110 depending on the particular mode of camera operation. Thus, when a user selects a first mode of operation one or more camera modules may have their mirrors at a first angle while during another mode of operation, e.g., a module in which images are to captured and combined as shown in FIG. 34, one or more camera modules will have their mirror driven to a different position under control of the processor 110. The particular mode of camera device operation may be determined based on user input by the processor 110 operating under control of the mode control module 111 or directly by the mode control module 111 when the mode control module is implemented in hardware.

If mirrors in each of 1204, 1208, 1218, 1214 and 1224 are at 45 degrees, each module looks directly out of the front face of the camera and their optical axes are all parallel. In this case each of the modules will take an image of the same scene area, e.g., the scene area 910 of FIG. 9. To capture an image of the scene area 904 with module 1204, e.g., with the camera facing towards the scene of interest, the hinged mirror 1235 (510) of module 1204 is adjusted so that the optical axis of camera module 1204 points towards the center of the scene area 904. Note that the module 1204 is positioned in the camera 1200 in such a manner that as the mirror is rotated/moved relative around the hinge, the location in the scene area of interest 802 that the optical axis points to moves along the diagonals of the rectangle 802. Similarly, the mirror for camera module 1214 is adjusted to capture the scene area 906. Note that in FIGS. 7A and 7B, camera modules 1204, 1214 are arranged proximate, e.g., along or adjacent, one diagonal while camera modules 1208, 1218 are located proximate, e.g., along or adjacent, the other diagonal. Rotating the mirror in 1214, e.g., changing the angle and thus incline of the mirror, makes the module's optical axis move along the corresponding diagonal. Mirrors of modules 1208 and 1218 are similarly angled, e.g., rotated, to capture images of the other scene areas respectively. The module 1224 used to capture the sixth image area 910 points at the center of the scene area of interest 802 so it's mirror is maintained at 45 degrees.

It should be appreciated from the above discussion that it is particularly beneficial to have at least some camera modules arranged along diagonals. These modules have the Part B of their optical axis parallel to one of the two diagonals. Thus, the arrangement of modules 1210, 1220, 2202, 1212 with the largest apertures along diagonals and also the arrangement of medium aperture modules 1204, 1214, 1208, 1208 along the same diagonals but offset from the other modules for space reasons, is an intentional design choice because it facilitates image capture and combining in some embodiments and modes of operation.

Based on the overlapping scene areas a depth map is generated, e.g., by the processor included in the camera in some embodiments. In some embodiments the depth of an object in the scene can be determined by examining the relative positions of an object in the images captured by different modules. In at least some embodiments the depth map is used, e.g., in combination with information about the relative position of the outer opening of the different optical chains and/or optical axis of the optical chains in combining images captured by the different optical chains to form a composite image. The use of the depth information in the generation of the composite image allows for the correction of parallax, perspective and/or other image distortions that may occur or which are present in the images. While depth map may be generated using images captured by camera modules in some embodiments, in other embodiments a depth map may be generated using other techniques, e.g., using depth information generated using a depth sensing equipment and/or using LIDAR technique. Thus it should be appreciated that a depth map corresponding to a scene area may be obtained in a variety of ways.

In the FIG. 9 example, 6 distinct scene areas are shown for purposes of explaining the invention. Each of the 6 scene areas may be, and in some embodiments is, captured by a different optical chain of the camera device 600 shown in drawing 1200 prior to being combined. The camera modules, as will be discussed below, can capture images at the same time, e.g., in parallel. However, in some embodiments as will be discussed below where rolling shutters are used in a controlled manner, the camera modules are controlled to capture portions of the scene area of interest in a synchronized manner so that all the different camera modules which capture a given portion of a scene area of interest will capture the given portion at the same time.

It should be appreciated that by combining images corresponding to the different scene area portions shown in FIG. 9 to generate a composite image, it is possible to generate a composite image with four times the pixel count of a single image sensor. For example, if each of the image portions is captured by a camera module using an 8 mega pixel sensor, the composite image corresponding to the scene area of interest shown in FIG. 9 would have an overall pixel count of 32 megapixels since the second, third, fourth and fifth scene area would each be captured by a different 8 megapixel sensor and thus contribute 8 megapixels to the composite image. The actual resolution could be slightly lower if the captured images are slightly larger than the corresponding scene areas.

While the sensors used to capture the first and fourth scene areas are not likely to result in an increase in the overall pixel count of the composite image since they correspond to the same image area as that captured by the combination of sensors used to capture the second, third, fifth and sixth scene areas, they provide for increased light capture than would be possible without the use of the f1 lenses and also provide important information which allows for the generation a depth map and which provide images of the overall scene area which can be used in aligning and stitching together the images corresponding to the second, third, fifth and sixth scene areas as part of the process of generating the composite image.

In some embodiments the large focal length (f3) camera module, e.g., 1216, is used to capture the image of the center portion of the area of interest such that its center coincides with the center of the image area of interest. Since practically most lenses have the least aberrations and deliver best image quality at the center of their field of view, this ensures that the center of the scene area of interest is imaged at high quality by the camera module of large focal length capturing center portion. The imaging of the scene area corresponding to the center portion of the scene of interest 802 also increases the total amount of light energy captured at the center of the scene area of interest. This allows the composite image generated from the captured images to have its best quality (high resolution and minimum noise) at the center of the scene area of interest.

FIG. 9 and the image portions, e.g., the scene areas, shown therein will be used in explaining how rolling shutters corresponding to different camera modules can be controlled in a coordinated manner to facilitate combining of images captured by different camera modules in a way that reduces or minimize motion related (camera or subject related) distortions that may be introduced if each of the camera module sensors were independently (asynchronously) operated to capture the image portions. The read out from the sensors of the camera modules in a coordinated manner helps in minimizing distortions due to uncoordinated asynchronous image capturing by different optical chains and the captured images can be combined easily.

The above discussed image capture operations performed by various sensors included in corresponding optical chains as discussed above may, and in some embodiments is, performed by a camera such as camera 600 including optical chains arranged as illustrated in FIGS. 7A and 7B.

Figure 10:
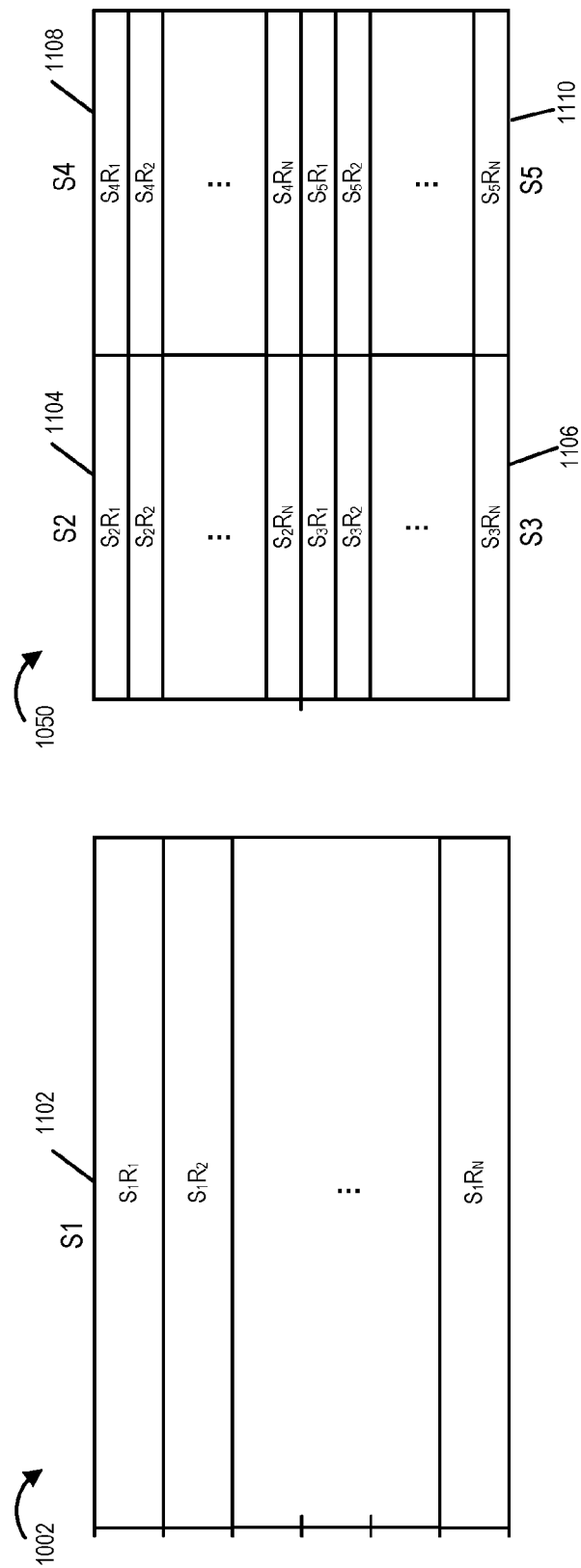
FIG. 10 includes drawings showing various exemplary image sensors to illustrate the concept how sensors of various optical chains, e.g., camera modules, using rolling shutters can be controlled to perform sensor read out in a coordinated manner to capture images of a scene area of interest.

FIG. 10 illustrates an example showing the concept how sensors of various optical chains, e.g., camera modules, using rolling shutters can be controlled to perform sensor read out in a coordinated manner to capture a scene area of interest. The coordinated read out in accordance with the invention facilitates combining of the images captured by camera modules having larger focal length with one or more images (e.g., corresponding to the same portions of the scene area) captured by another camera module having a smaller focal length which captures a larger portion of the same scene area of interest. Drawing 1002 shows an exemplary first sensor S1 1102 corresponding to a camera module, e.g., camera module 1228, having short focal length (f1) used to capture the scene area 802. To illustrate a sensor read out operation using rolling shutter as part of an image capture operation, the sensor is shown to include N rows of pixel elements that can be read out. As shown the first sensor S1 includes N rows of pixel elements including $S_1R_1$ (annotating sensor 1 row 1), $S_1R_2$ (sensor 1 row 2), . . . , $S_1R_N$ (sensor 1 row N). While the rows of pixel elements of the first sensor S1 1102 are numbered 1 to N starting from the top, in accordance with one aspect of some embodiments the read out operation does not necessarily start from top. In fact as will be discussed, in accordance with some embodiments the sensor read out operation for the first sensor S1 1102 may, and in some embodiments does, start from a middle portion and the read out can be controlled such that various different rows of pixel elements can be randomly accessed for read out in a coordinated manner with read out from other sensors (e.g., sensors 1104, 1106, 1108, 1110 shown in drawing 1050 corresponding to camera modules having larger focal length, e.g., f2, which capture smaller portions of the same scene area of interest, e.g. scene 802.

Drawing 1050 shows four sensors S2 1104, S3 1106, S4 1108, S5 1110 corresponding to four camera modules having focal length, e.g., f2, which is larger than focal length f1 corresponding to camera module to which the first sensor S1 1102 corresponds. Note that the rows of pixel elements corresponding to the four sensors shown in drawing 1050 can capture four different portions of a scene, e.g., scene of interest 802, such as scene areas 902, 904, 906 and 908. For example, the second sensor S2 1104 corresponds to the camera module 1208, having focal length (f2) used to capture the scene area 902, the third sensor S3 1106 corresponds to the camera module 1214 having focal length (f2) used to capture the scene area 906, the fourth sensor S4 1108 corresponds to the camera module 1204 having focal length (f2) used to capture the scene area 904 and the fifth sensor S5 1110 corresponds to the camera module 1218 having focal length (f2) used to capture the scene area 908. In accordance with some embodiments the sensors S1, S2, S3, S4 and S5 of various optical chains can be controlled to read out in a coordinated manner thereby allowing synchronized image capture by at least some of the different corresponding camera modules. As shown in drawing 1050, the second sensor S2 includes N rows of pixel elements including $S_2R_1$ (sensor 2 row 1), $S_2R_2$ (sensor 2 row 2), . . . , $S_2R_N$ (sensor 2 row N), the third sensor S3 includes N rows of pixel elements including $S_3R_1$, $S_3R_2$, . . . , $S_3R_N$. Similarly, the fourth sensor S4 includes N rows of pixel elements including $S_4R_1$, $S_4R_2$, . . . , $S_4R_N$ and the fifth sensor S5 includes N rows of pixel elements including $S_5R_1$, $S_5R_2$, . . . , $S_5R_N$.

Figure 11:
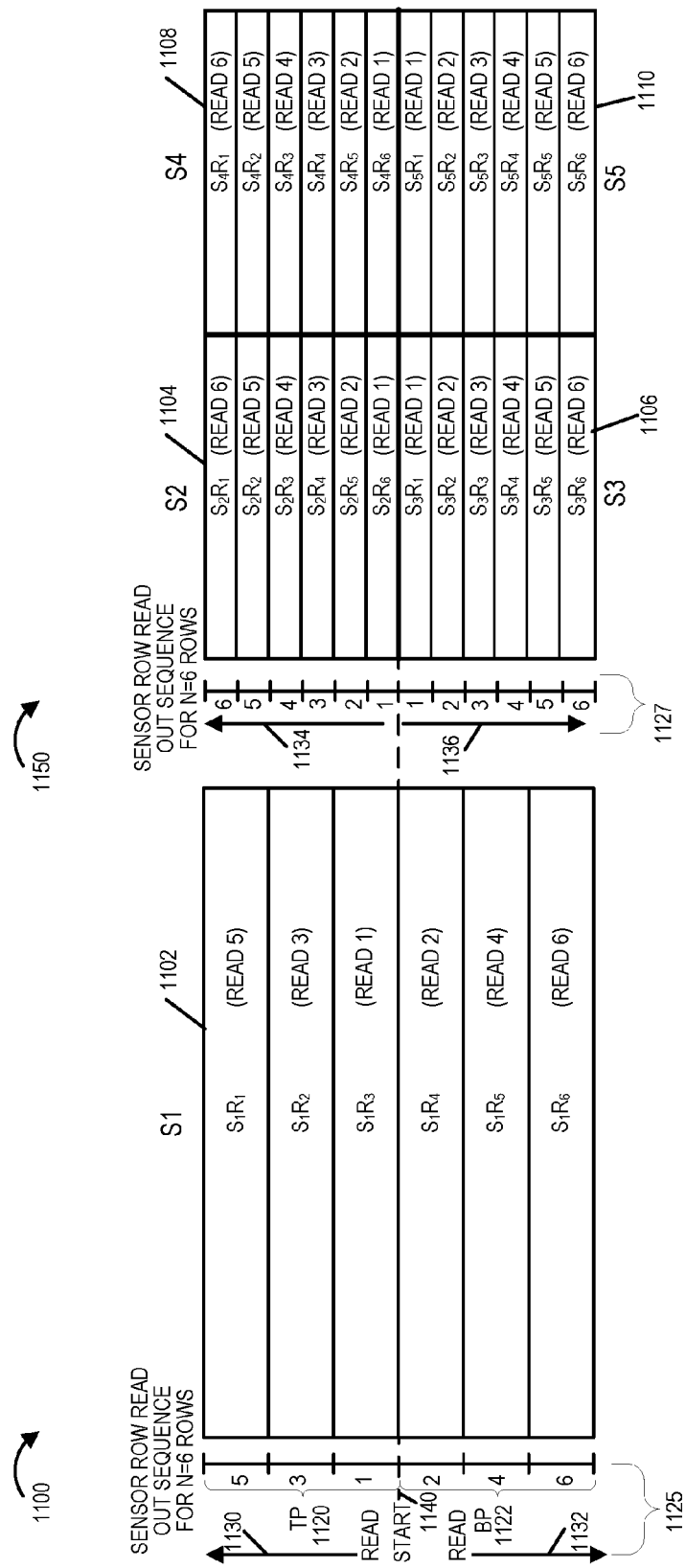
FIG. 11 illustrate how exemplary image sensors corresponding different optical chains are controlled to perform a coordinated read out as part of image capture operation in accordance with one exemplary embodiment in an example where the total number (N) of pixel element rows in each sensor is even, e.g., N=6.

FIG. 11 illustrates an example that shows how exemplary image sensors corresponding different optical chains are controlled to perform a coordinated read out as part of an image capture operation in accordance with one exemplary embodiment, with each sensor in the example including the same number (N) of pixel element rows, N being an even number. For the purposes of discussion of FIG. 11 consider that each sensor includes N=6 rows.

The rows of pixel values corresponding to a sensor are read out one at a time, however the sequence of rows for read out is selected in accordance with the features of the invention as discussed below. The read out from the sensors S2 1104, S3 1106, S4 1108, S5 1110 shown in drawing 1150 is synchronized with readout of rows of pixel elements of sensor S1 shown in drawing 1100 (first sensor S1 1102) and is controlled to proceed in accordance with the invention as discussed below.

In the illustrated example of FIG. 11 each of the sensors S1 1102, S2 1104, S3 1106, S4 1108 and S5 1110 is considered to have six rows of pixel elements (N=6). In the illustrated example the sensor S1 1102 read out operation starts from row 3 and is controlled to alternate between reading out a row of pixel values from different portions of the sensor S1 1102 such that various different rows of pixel elements are read out in a coordinated manner with read out from other sensors S2 1104, S4 1108, and S3 1106, S5 1110 shown in drawing 1150. In the example, drawing 1100 shows controlled read out operation of the first sensor S1 1102 (corresponding to smaller focal length f1 camera module) that has 6 rows of pixel elements with the read out of sensor S1 starting at 1140 from $S_1R_3$ (row 3 of S1). $S_1R_3$ being the first row that is read, e.g., during a first time period, as indicated by the label "READ1". In the drawing 1100 reference 1125 indicates the order/sequence in which the pixel element rows of the sensor S1 are read out along with an indication of the direction in which the read operation proceeds and alternates between different rows corresponding to a top portion (TP) 1120 and a bottom portion (BP) 1122 of sensor S1, with one row of the sensor being read at a time. As should be appreciated from the ordering/sequence indicator 1125 the first row to be read out of sensor S1 is $S_1R_3$ (row 3) with the read out proceeding to $S_1R_4$ (row 4) then to $S_1R_2$ (row 2) then to $S_1R_5$ (row 5) then to $S_1R_1$ (row 1) and then finally to $S_1R_6$ (row 6). In accordance with one aspect of the invention the read out operation of sensor S1 1102 rows is synchronized with read out operations of sensors S2 1104, S3 1106, S4 1108 and S5 1110 in the manner discussed below.

Referring to drawing 1150, the read out operations of sensors S2 1104, S3 1106, S4 1108 and S5 1110 is carried out in parallel with the read out operation of sensor S1 1102 in a coordinated manner such that the camera modules corresponding to these respective sensors capture at least some image portions of the same scene area of interest in parallel, e.g., in a synchronized manner. In various embodiments sensor read out from multiple sensors is coordinated so that same portions of the scene area are captured by different image sensors in parallel. In the drawing 1150 reference 1127 indicates the order/sequence in which the sensor pixel element rows of the sensors S2, S3, S4 and S4 are read out along with an indication of the direction in which the row read out operation proceeds. In accordance with one feature of an embodiment the read out operation of sensors S2 1104, S3 1106, S4 1108 and S5 1110 is coordinated with sensor S1 1102 readout such that when a given row of pixel elements is read from S1 1102, a row of pixels from each of the two of the sensors S2 1104, S3 1106, S4 1108 and S5 1110 is read in parallel that results in capture of at least some scene portion that is the same as captured by sensor S1 1102 due to read out of the given row of S1 1102, with the read out operation of rows of sensor S1 1102 alternating between the top and bottom portions 1120, 1122 as discussed above.

As should be appreciated from the drawings 1100 and 1150, for sensors S2 1104 and S4 1108 the readout of pixel elements rows starts from the bottom pixel element rows of the sensors S2 1104 and S4 1108 proceeding in a direction towards the top edge of sensors S2 1104 and S4 1108 as indicated by the read out direction arrow 1134 while the readout of pixel elements rows of sensors S3 1106 and S5

1110 starts from the top row of pixel elements of the sensors S3 1106 and S5 1110 proceeding in a direction towards the bottom edge of sensors S3 1106 and S5 1110 as indicated by the read out direction arrow 1136.

In the illustrated example, in accordance with the features of some embodiments, rows of pixel elements $S_2R_6$, and $S_4R_6$ of sensors S2 1104 and S4 1108 and rows $S_3R_1$, and $S_5R_1$ of sensors S3 1106 and S5 1110 are read out in parallel with read out of $S_1R_3$ (row 3) of sensor S1 1102, e.g., during READ 1 which occurs during a first period of time. As the coordinated sensor read out operation proceeds in accordance with the features of the present invention, a read out controller alternates between reading out a row from the top and bottom portions of sensor S1 1102. Since during the first read (READ1) row 3 was read from top portion 1120 of S1 1102, the read out controller control read of a row from the bottom portion 1122 of S1 1102 for the next read. Thus next $S_1R_4$ (row 4) of sensor S1 1102 is read from the bottom portion 1122, e.g., during READ 2 which occurs during a second period of time. In parallel with $S_1R_4$ of sensor S1 1102, rows of pixel elements $S_3R_2$, and $S_5R_2$ of sensors S3 1106 and S5 1110 and rows $S_2R_5$, and $S_4R_5$ of sensors S2 1104 and S4 1108 are read out (during READ 2).

Next $S_1R_2$ (row 2) of sensor S1 1102 is read from top portion of S1 in parallel with rows of pixel elements $S_2R_4$, and $S_4R_4$ of sensors S2 1104 and S4 1108 and rows $S_3R_3$, and $S_5R_3$ of sensors S3 1106 and S5 1110 during READ 3, e.g., which occurs during a third period of time. As the sensor scan for various sensors proceeds, next $S_1R_5$ (row 5) of sensor S1 1102 is read from the bottom portion 1122 (e.g., during READ 4 which occurs during a fourth period of time) in parallel with rows of pixel elements $S_3R_4$, and $S_5R_4$ of sensors S3 1106 and S5 1110 and rows $S_2R_3$, and $S_4R_3$ of sensors S2 1104 and S4 1108. Next $S_1R_1$ (row 1) is read from the top portion 1120 of S1 1102 in parallel with rows of pixel elements $S_2R_2$, and $S_4R_2$ of sensors S2 1104 and S4 1108 and rows $S_3R_5$, and $S_5R_5$ of sensors S3 1106 and S5 1110 during READ 5, e.g., which occurs during a fifth period of time. Finally the last remaining row of pixel elements $S_1R_6$ (row 6) is read from the bottom portion 1122 of S1 1102 in parallel with rows of pixel elements $S_3R_6$, and $S_5R_6$ of sensors S3 1106 and S5 1110 and rows $S_2R_1$, and $S_4R_1$ of sensors S2 1104 and S4 1108 during READ 6, e.g., which occurs during a sixth period of time.

In the above example during a given read out time period, three out of the five sensors capture the same portions of the scene area of interest. Thus as should be appreciated images corresponding to some of the same portions of the scene area of interest are thus captured by various different sensors in a synchronized manner. The other sensors capture the same scene area at nearly the same time, e.g., within a read time of the other sensors. In addition sensor readout is performed at the full rate without having to slow down read out from one or more sensors for the purposes of achieving synchronization with other sensor(s). However, use of the maximum sensor readout rate is not required. The overall read out time is reduced as compared to the case where two sensors are consecutively read out, e.g., to capture the top and bottom portions of a scene area sequentially, since the top and bottom portions can be read out in the time to read out a single sensor while maintaining close synchronization with another sensor, e.g., sensor S1 1102 corresponding to shorter focal length camera module.

While FIGS. 10 and 11 illustrate that the sensors S1, S2, S3, S4 and S5 each has a plurality of rows pixel elements, it should be appreciated that the rectangles 1102, 1104, 1106, 1108 and 1110 representing the sensors shown in FIGS. 10-11 do not show or represent the physical size of the sensors. In the FIGS. 10 and 11, it is assumed that each sensor includes the same number of rows of pixel elements but other configurations are possible.

Figure 12:
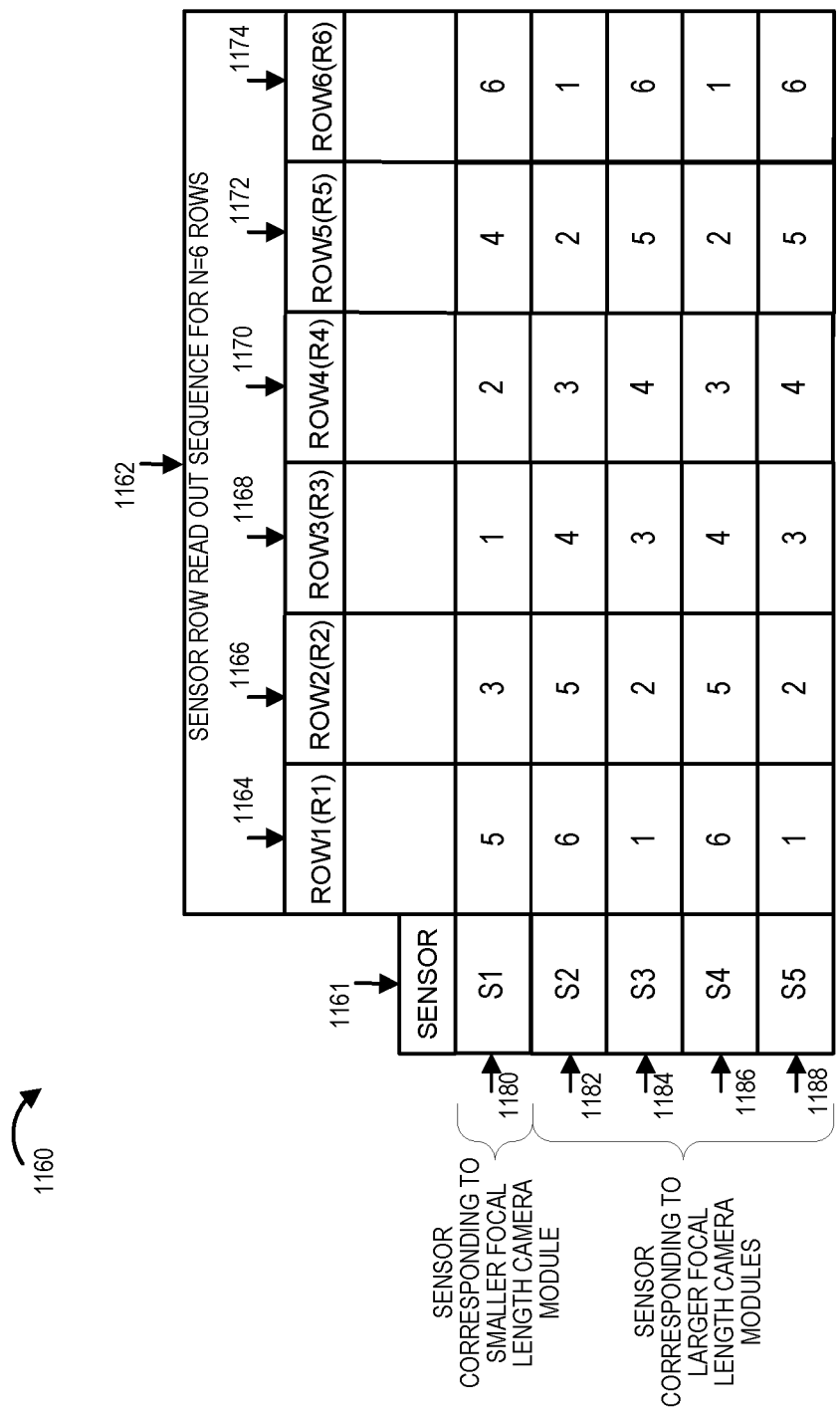
FIG. 12 illustrates an exemplary table including a list of various exemplary sensors and the read out sequence of the rows of pixel elements corresponding to the sensors in an example where the total number of pixel element rows in each sensor is 6.

FIG. 12 illustrates an exemplary table 1160 including a list of various sensors discussed with regard to FIGS. 10-11 and the read out sequence of the rows of pixel elements corresponding to the sensors in an example where the total number of pixel element rows in each sensor is 6, i.e., number of rows N=6. The exemplary table 1160 may be stored, e.g., in camera 100 memory and may be used by the read out controller 150 to control the read out of the exemplary sensors in accordance with some embodiments. Alternatively, the controller may be implemented in hardware and configured to implement the readout sequence listed in table 1160. As discussed with regard to FIG. 11, in accordance with one aspect of some embodiments the image sensors S1, S2, S3, S4 and S5 corresponding different optical chains are controlled to perform a coordinated read out as part of image capture operation, with the read out operation of rows of sensor S1 1102 alternating between the top and bottom portions of the S1 1102 and synchronized with read out from other sensors S2 1104, S4 1108, and S3 1106, S5 1110.

In exemplary table 1160 each entry of column 1161 indicates an image sensor (annotated as S1, S2, S3 etc.) and the larger expanded column 1162 includes information indicating a sensor row read out sequence corresponding to each of the sensors, e.g., sequence number in which a row of a sensor is read out. Within column 1162, each individual column 1164, 1166, 1168, 1170, 1172 and 1174 corresponds to a row of pixel elements of a sensor identified in a corresponding entry of column 1161. Each individual entry in a column, in the group of columns 1164, 1166, 1168, 1170, 1172 and 1174, indicates the sequence number in which the corresponding row, is read out. In the table, R1, R2, R3, R4, R5 and R6 represent row number of a row of pixel elements of each of the sensors, e.g., with R1 being row 1, R2 being row 2, R3 being row 3, R4 being row 4, R5 being row 5 and R6 being row 6.

Each row of table 1160 numbered 1180 through 1188 corresponds to an individual sensor identified in column 1161. For example, consider row 1180 and columns 1164, 1166, 1168, 1170, 1172 and 1174. Row 1180 corresponds to the first sensor S1 1102 (e.g., sensor corresponding to smaller focal length (f1) camera module) as identified in the first entry of column 1161. Moving from left to right in row 1180, each corresponding entry in the columns 1164, 1166, 1168, 1170, 1172 and 1174 indicates the sequence in which the row of pixel elements of sensor S1 1102 is read out. As discussed in the example of FIG. 11 in some embodiments the read out operation of S1 1102 alternates between top and bottom portions of S1 1102 with the rows being read out in the exemplary sequence shown in the table. It can be appreciated from the table 1160 that row 3 of pixel elements of the first sensor S1 (R3) is read first as indicated by the sequence number "1" indicated in the first entry of column 1168 corresponding to sensor S1. It can be further seen that the read out of rows continue with row 4 of pixel elements of sensor S1 (R4) being read next as indicated by the sequence number "2" indicated in the first entry of column 1170, row 2 of pixel elements of sensor S1 (R2) is read next as indicated by the sequence number "3" indicated in the first entry of column 1166, row 5 of pixel elements (R5) is read next as indicated by the sequence number "4" indicated in the first entry of column 1172, row 1 of pixel elements (R1) is read next as indicated by the sequence number "5"

indicated in the first entry of column 1164 and finally row 6 of pixel elements (R6) is read last (total number of rows of pixel elements in the example=6) as indicated by the sequence number "6" indicated in the first entry of column 1174.

The read out of rows of sensors S2 1104, S3 1106, S4 1108 and S5 1110 which is controlled to be in synchronization with read out of rows of sensor S1 1102 will be discussed now. In table 1160, rows 1182, 1184, 1186, 1188 correspond to sensors S2 1104, S3 1106, S4 1108 and S5 1110 respectively. Consider row 1182 and columns 1164, 1166, 1168, 1170, 1172 and 1174. Row 1182 corresponds to the second sensor S2 1104 as identified in the second entry of column 1161. Each entry in the columns 1164, 1166, 1168, 1170, 1172 and 1174 corresponding to sensor S2 1104 indicates the sequence in which the row of pixel elements of sensor S2 is read out. It can be appreciated that row 6 (R6) of pixel elements of the sensor S2 1104 is read first as indicated by the sequence number "1" indicated in the second entry of column 1174 corresponding to sensor S2, row 5 of pixel elements of the sensor S2 (R5) is read second as indicated by the sequence number "2" indicated in the second entry of column 1172, row 4 of pixel elements of the sensor S2 (R4) is read third as indicated by the sequence number "3" indicated in the second entry of column 1170, row 3 of pixel elements of sensor S2 (R3) is read next as indicated by the sequence number "4" indicated in the second entry of column 1168, row 2 of pixel elements of the sensor S2 (R2) is read next as indicated by the sequence number "5" indicated in the second entry of column 1166 and row 1 of pixel elements of the sensor S2 (R4) is read last as indicated by the sequence number "6" indicated in the second entry of column 1164. Table 1160 can be further read in the similar manner as discussed above to understand the sequence of read out of rows of pixel elements of the sensors. Read out of rows of sensor S4 1108 follows exactly the same sequence as sensor S2 1104 discussed above. As can be appreciated row R3 of S1 1102 is read out in parallel with rows R6 and R5 of sensors S2 1104 and S4 1108, e.g., during a first read time, row R2 of S1 1102 is read out in parallel with rows R4 and R3 of sensors S2 1104 and S4 1108, e.g., during a third read time, and row R1 of S1 1102 is read out in parallel with rows R2 and R1 of sensors S2 1104 and S4 1108, e.g., during a fifth read time.

Similarly, for the third sensor S3 1106 considering the corresponding row 1184 and columns 1164, 1166, 1168, 1170, 1172 and 1174, it can be seen that row 1 of pixel elements of sensor S3 (R1) is read first as indicated by the sequence number "1" indicated in the third entry of column 1174, row 2 of pixel elements of sensor S3 (R2) is read next as indicated by the sequence number "2" in column 1166, row 3 of pixel elements of sensor S3 (R3) is read third as indicated by the sequence number "3" in column 1168, row 4 of pixel elements of sensor S3 (R4) is read next as indicated by the sequence number "4" in column 1170, row 5 of pixel elements of sensor S3 (R5) is read next as indicated by the sequence number "5" in column 1172 and row 6 of pixel elements of sensor S3 (R6) is read last as indicated by the sequence number "6" in column 1174. Read out of rows of sensor S5 1110 follows exactly the same sequence as sensor S3 1106 discussed above. As can be appreciated row R4 of S1 1102 is read out in parallel with rows R1 and R2 of sensors S3 1106 and S5 1110, e.g., during a second read time which occurs after the first read time and prior to the third read time, row R5 of S1 1102 is read out in parallel with rows R3 and R4 of sensors S3 1106 and S5 1110, e.g., during a fourth read time which occurs after the third read time and prior to the fifth read time, and row R6 of S1 1102 is read out in parallel with rows R5 and R6 of sensors S3 1106 and S5 1110, e.g., during a sixth read time which occurs after the fifth read time.

From the above it can be appreciated that rows of the different sensors indicated to have the same read sequence number are read in parallel during a given read time period. For example, R3 of S1 1102, R6 of S2 1104, R1 of S3 1106, R6 of S4 1108, R1 of S5 1110 are all have been indicated to have read sequence "1" indicating that these rows are read in parallel, e.g., during a first period of time. In some embodiments the first sensor S1 corresponds to a first camera module having a 35 mm focal length and the second, third, fourth and fifth sensors S2, S3, S4 and S5 respectively correspond to second, third, fourth and fifth camera modules each having a 70 mm focal length.

Figure 13A:
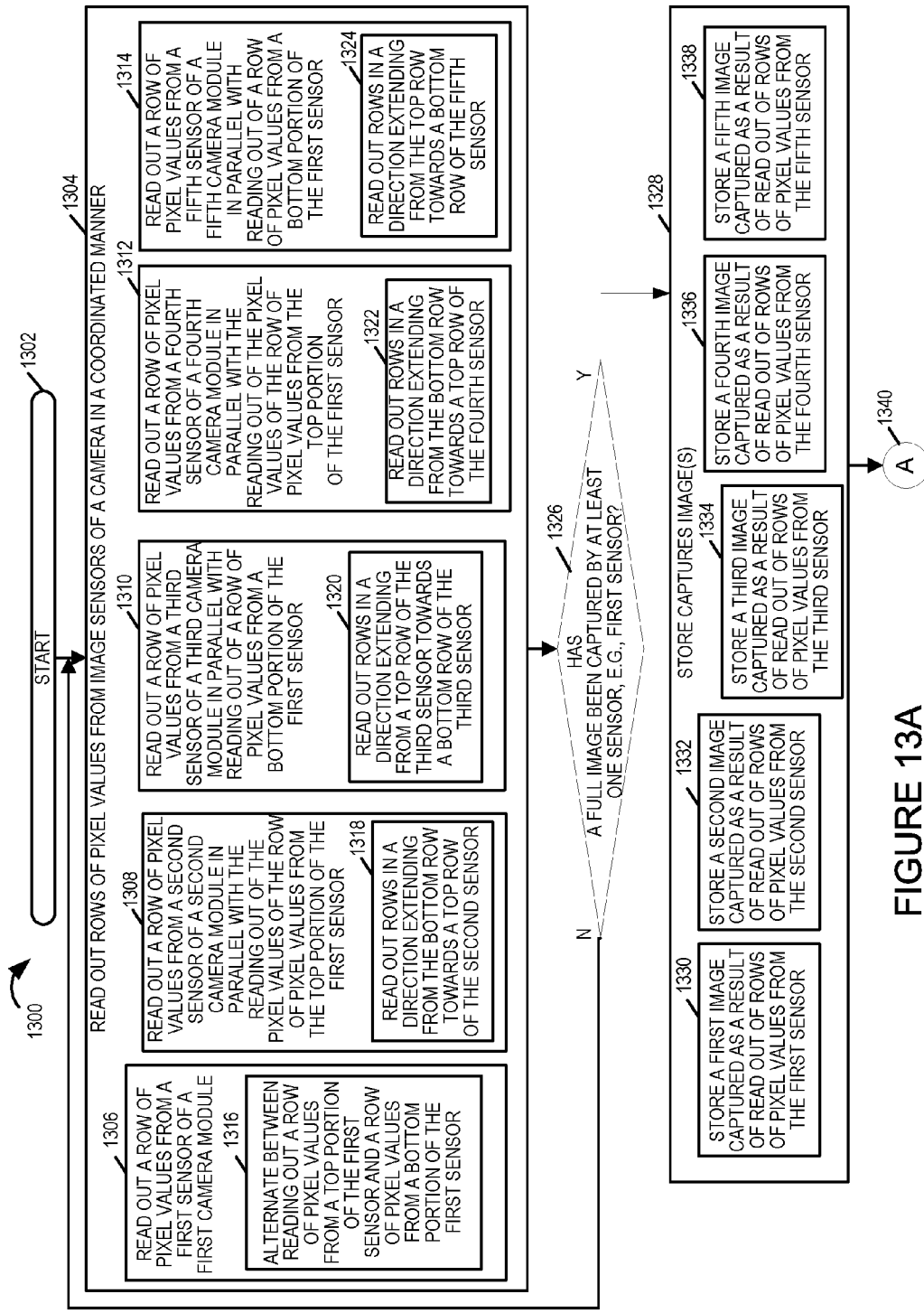
FIG. 13A illustrates a first part of a flowchart showing the steps of an exemplary method of controlling an exemplary camera device to read out rows of pixel values from image sensors in accordance with an exemplary embodiment.

FIG. 13 shows a flowchart 1300 illustrating the steps of an exemplary method of controlling a camera device, e.g., such as camera 600, that includes one or more sensors with a rolling shutter to read out rows of pixel values from image sensors in a coordinated manner in accordance with an exemplary embodiment. The camera device implementing the method of flowchart 1300 can and sometimes does include the same or similar elements as the camera device 100 of FIG. 1 and device 200 of FIG. 4A.

The exemplary method starts in step 1302, e.g., when a user of a camera device, e.g., camera 100, presses a button or takes another action to trigger the capture of an image of a scene area of interest. For the purposes of discussion consider that the camera device includes a plurality of optical chains, e.g., camera modules, which can be operated and controlled independently and/or in a coordinated manner. For purposes of discussion, the coordinated sensor row read operation will be explained by referring to FIGS. 10-11 to facilitate an easier understanding of the method discussed below.

Operation proceeds from step 1302 to step 1304. In step 1304 the camera device is operated to read out rows of pixel values from image sensors corresponding to camera modules in a coordinated manner. In some embodiments step 1304 includes performing one or more of steps 1306, 1308, 1310, 1312 and 1314 which are performed in a coordinated manner in accordance with the invention, e.g., with two or more steps being performed in a synchronized manner to achieve a synchronized read out of sensor rows in accordance with the features of some embodiments. In step 1306 a row of pixel elements is read out from a first sensor, e.g., sensor S1 1102, of a first camera module, e.g., camera module 1228. For example row 3 of S1 1102 ($S_1R_3$) is read during a first read time. In various embodiments a controller, e.g., rolling shutter controller 150, controls the image sensors corresponding to camera modules of the camera device to perform a read out of pixel values, e.g., rows of pixel values, in a coordinated manner, e.g., with rows of pixel values being read out in accordance with operation of a rolling shutter implementation. In some embodiments step 1306 includes substep 1316 which is performed as part of controlled read out of rows from the first sensor S1 1102 in accordance with the invention. In substep 1316 the rolling shutter controller 150 controls the first sensor to alternate between reading out a row of pixel values from an upper portion, e.g., TP 1120, of the first sensor and a row of pixel values from a lower portion of the first sensor. For example during a first time period a row, e.g., $S_1R_3$, of pixel values is read from a top portion 1120 (e.g., upper portion of S1 1102), during a second time period a different row of pixel values is read from a bottom portion 1122 (e.g., lower portion of S1 1102) then during a third period yet another row of pixel values is read from the top portion and the operation continues in this manner till all of the rows of sensor S1 are read. As discussed below, as sensor S1 1102 is controlled to alternate between reading rows of pixel values from top and bottom portions, rows of pixel values from at least some other sensor(s), e.g., second, third fourth and fifth, are read in parallel with rows of pixel values corresponding to top and bottom portions of the first sensor in some embodiments.

In step 1308 the controller controls reads out of a row of pixel values from a second sensor, e.g., S2 1104, of a second camera module in parallel with the reading out of the pixel values of the row of pixel values from the top portion of the first sensor S1 1102, e.g., during first read (READ1) time period. In some embodiments step 1308 includes performing substep 1318 where the sensor S2 1104 is controlled to read out rows of pixel values in a direction extending from the bottom row of sensor S2 towards a top row of the second sensor S2, e.g., from Nth row to 1st row in FIG. 10 example. Consider an example where the total number of row (N) in each sensor is 6, e.g., N=6 as discussed with regard to FIG. 11, in such an embodiment the sixth row of pixel elements $S_2R_6$ of sensor S2 1104 is read out in parallel with read out of a row $S_1R_3$ (e.g., row 3) in the upper portion of sensor S1 1102. In some embodiments the row of pixel values read out from the first sensor 1102 during the first read out time period corresponds to a scene area which overlaps a scene area to which the row of pixel values read out from the second sensor 1104 corresponds.

In step 1310 the controller controls reading out of a row of pixel values from a third sensor, e.g., S3 1106, in parallel with reading out of a row of pixel values from a bottom portion, e.g., BP 1122, of the first sensor. In some embodiments step 1310 includes performing substep 1320 where the third sensor is controlled to read out rows of pixel values in a direction extending from a top row of the third sensor 1106 with row read out of the third sensor progressing towards a bottom row of the third sensor. For example as discussed with regard to FIG. 11 example, in one embodiment during READ2 (during a second time period) the row of pixel elements $S_3R_2$ is read out in parallel with read out of $S_1R_4$ (row 4 in the lower portion 1122 of S1 1102) of the first sensor. The row of pixel values from the bottom portion of the first sensor (e.g., $S_1R_4$ of S1 1102) corresponds to a scene area which overlaps the scene area captured by the row ($S_3R_2$ of S3 1106) of pixel values from the third sensor read during READ2. The row read out of the third sensor, e.g., S3 1106, progresses from top row towards a bottom row of S3 1106 can also be appreciated from FIG. 11 example which shows the direction in which row read out extends as indicated by arrow 1136. In some embodiments prior to the second read time period (READ2) a row of pixel values is read from the third sensor 1106 during the first read out time period (READ1) capturing a scene area below the scene area to which the row of pixel values read out from the second sensor 1104 during the first read out time period corresponds.

In some embodiments the first sensor is part of a first camera module, the second sensor is part of a second camera module, and the third sensor is part of a third camera module, the first camera module having a shorter focal length than the second and third camera modules.

In step 1312 the controller controls reading out of a row of pixel values from a fourth sensor, e.g., S4 1108, in parallel with reading out of a row of pixel values from the upper portion, e.g., TP 1120, of the first sensor S1 1102. In some embodiments step 1312 includes performing substep 1322 where the sensor S4 1108 is controlled to read out rows of pixel values in a direction extending from a bottom row of the fourth sensor S4 1108 towards a top row of the fourth sensor. For example as discussed with regard to FIG. 11 example, in one embodiment the rows of pixel elements $S_4R_6$ is read out in parallel with read out of $S_1R_3$ (row 3 in the upper portion 1120 of S1 1102) of sensor S1, e.g., during READ 1 time period. As the read out operation proceeds, during another time period, e.g., READ 3, $S_4R_4$ is read out in parallel with read out of S1 R2 which is row 2 in the upper portion 1120 of S1 1102. Thus the read out for sensor S4 1108 (like sensor S2 1104) proceeds from bottom row towards a top row of S4 1108, e.g., as indicated by arrow 1134 in FIG. 11 example.

In step 1314 the controller controls reading out of a row of pixel values from a fifth sensor, e.g., S5 1110, in parallel with reading out of a row of pixel values from the lower portion, e.g., BP 1122, of the first sensor. In some embodiments step 1314 includes performing substep 1324 where the sensor S5 1110 is controlled to read out rows of pixel values in a direction (e.g., as indicated by arrow 1136) extending from a top row of the fifth sensor towards a bottom row of the fifth sensor. For example as discussed with regard to FIG. 11 example, in one embodiment the row of pixel elements $S_5R_2$ of S5 1110 is read out in parallel with read out of row $S_1R_4$ (row 4) in the lower portion 1122 of S1 1102. In some embodiments row $S_3R_2$, of the third sensor S3 1106 is also read in parallel with $S_5R_2$ of S5 1110. In some embodiments the second, third, fourth and fifth sensors correspond to second, third, fourth and fifth camera modules, respectively, each of the second, third, fourth and fifth camera modules having the same focal length, e.g., f2. In some such embodiments the first sensor corresponds to a first camera module which has a shorter focal length, e.g., f1, than the second camera module. In some such embodiments the focal length f2 of the second camera module is at least twice the focal length f1 of the first camera module. In various embodiments step 1304 including the various steps in repeated until a full image has been captured by at least one sensor.

Operation proceeds from step 1304 (which includes one or more of steps 1306, 1308, 1310, 1312 and 1314) to step 1326. In step 1326 it is determined if a full image has been captured by at least one sensor, e.g., all rows of at least one sensor (e.g., first sensor S1) have been read. If it is determined that the full image has not been captured by at least one sensor, the operation proceeds back to step 1304 wherein one or more of the substeps are repeated until an image is captured by at least one sensor, e.g., until read out of pixel element rows has been complete for at least one sensor. For example in some embodiments until an image is captured by the first sensor, the controller controls repeat of the following steps: i) alternating between reading out a row of pixel values from a top portion of the first sensor and a row of pixel values from a bottom portion of the first sensor, ii) reading out a row of pixel values from the second sensor in parallel with the reading out of the row of pixel values from the top portion of the first sensor, iii) reading out a row of pixel values from the third sensor in parallel with reading out of a row of pixel values from the bottom portion of the first sensor, and optionally iv) reading out a row of pixel values from a fourth sensor in parallel with reading out of a row of pixel values from the top portion of the first sensor, and v) reading out a row of pixel values from the fifth sensor in parallel with reading out of a row of pixel values from the bottom portion of the first sensor. Since the read out operation for the various sensors S1 1102, S2 1104, S3 1106, S4 1108 and S5 1110 is synchronized in accordance with the invention, in some embodiments by the time the first sensor captures a full image the other sensors are also done with the read out of pixel rows thereby completing image captures by these sensors.

If in step 1326 it is determined that the full image has been captured by at least one sensor, e.g., S1 1102, the operation proceeds to step 1328. In some embodiments step 1328 is performed after at least one image is captured by each one of the first, second (or fourth) and third (or fifth) sensors. In step 1328 the captured image(s) are stored in camera device, e.g., in memory 108/213. As part of step 1328 a one or more of the storing steps 1330, 1132, 1334, 1336 and 1338 are performed in some embodiments. For discussion purposes consider that an image is captured by each of the sensors, e.g., as a result of sensor read out operation of sensors S1 1102, S2 1104, S3 1106, S4 1108 and S5 1110. Thus in such a case as part step 1328, steps 1330, 1132, 1334, 1336 and 1338 are performed. In step 1330 a first image captured as a result of read out of rows of pixel values from the first sensor is stored. In step 1332 a second image captured as a result of read out of rows of pixel values from the second sensor is stored. In step 1334 a third image captured as a result of read out of rows of pixel values from the third sensor is stored. In step 1336 a fourth image captured as a result of read out of rows of pixel values from the fourth sensor is stored. In step 1338 a fifth image captured as a result of read out of rows of pixel values from the fifth sensor is stored.

Operation proceeds from step 1328 to step 1341 via connecting node A 1340. In step 1341 the captured image(s), e.g., the pixel values read out of from the sensors, are communicated to an image processing apparatus, e.g., a computer or processor of the camera device implementing the method, e.g., processor 110/211, or an external image processing system for additional processing, e.g., in generating a composite image. The captured image(s) may be communicated via local network/bus 116 in the case where images are supplied to camera device processor, or via an interface such as interface 114 of camera 100 in the case where images are supplied to an external system. Operation proceeds from step 1341 to step 1342 which may be performed by the processor of the camera device or an external processing system. In step 1342 a composite image is generated from images captured by reading out pixel values from the second, third, fourth and fifth sensors (corresponding to second, third, fourth and fifth camera modules), e.g., using the second, third, fourth and fifth images. For example, images captured by reading out pixel values from the second, third, fourth and fifth camera sensors may correspond to scene areas 902, 904, 906 and 908 and a composite image may be generated, e.g., by processor 110/211 by stitching together the at least two or more of the second, third, fourth and fifth images. In some embodiments the composite image generation further includes using the image captured by reading out pixel values from the first sensor (e.g., first image corresponding to scene area 802). Thus in some embodiments step 1342 of generating the composite image includes step 1344 where an image captured by the first camera module (e.g., the first image) is used in aligning portions of the images captured by reading out pixel values from the second, third, fourth and fifth sensors as part of generating the composite image. In some embodiments the composite image generation operation is performed by a processing device e.g., by processor 110.

Operation proceeds from step 1342 to step 1346 where the generated composite image is stored and/or output, e.g., transmitted and/or displayed.

In some exemplary embodiments an imaging device such as e.g., the camera device 100/200, is used to implement the method of flowchart 1300. In one such embodiment the plurality of optical chains 130 of the camera device 100 include optical chains, e.g., camera modules, arranged in the manner as illustrated in FIG. 7A with more detailed arrangements and elements (e.g., sensors, filters) of the optical chains further shown in FIG. 7B. Thus in some such embodiments the plurality of optical chains 130 includes a first camera module, a second camera module, and a third camera module. In some embodiments the camera further includes a fourth camera module and a fifth camera module. In some embodiments the controller 150 (including the sensor read out controller 289) is configured to control a plurality of image sensors, corresponding to the plurality of camera modules 130, to perform read out of sensor rows in a coordinated manner as discussed with regard to flowchart 1300. In one such embodiment the controller 150 (including the sensor read out controller 289) is configured to control a first image sensor (e.g., S1 1102 corresponding to the first camera module) to alternate between reading out a row of pixel values from a top portion of the first image sensor and a row of pixel values from a bottom portion of the first image sensor; and control a second image sensor (e.g., S2 1104 corresponding to the second camera module) to read out a row of pixel values from a second image sensor in parallel with the reading out of the row of pixel values from the top portion of the first image sensor. In some embodiments the controller 150 is further configured to control a third image sensor (e.g., S3 1106 corresponding to the third camera module) to read out a row of pixel values from the third image sensor in parallel with read out of a row of pixel values from the bottom portion of the first image sensor. In some embodiments the controller 150 is further configured to control the second image sensor to read out of rows of pixel values from said second image sensor in a direction extending from a bottom row towards a top row of said second image sensor. In some embodiments the controller 150 is further configured to control the third image sensor to read out of rows of pixel values from said third image sensor in a direction extending from a top row of said third image sensor with row read out of said third image sensor progressing towards a bottom row of said third image sensor.

In some embodiments the controller 150 is configured to determine if an image is captured by at least one image sensor, e.g., first image sensor. In some embodiments the controller 150 is further configured to repeat the following operations until an image is captured by said first image sensor: i) control the first sensor to alternate between reading out a row of pixel values from a top portion of the first sensor and a row of pixel values from a bottom portion of the first sensor, ii) control the second sensor to read out a row of pixel values from the second sensor in parallel with the reading out of the row of pixel values from the top portion of the first sensor, and iii) control the third sensor to read out a row of pixel values from a third sensor in parallel with reading out of a row of pixel values from a bottom portion of the first sensor. In some embodiments the first image sensor is part of a first camera module, the second image sensor is part of a second camera module, and the third image sensor is part of a third camera module, the first camera module having a shorter focal length than the second and third camera modules.

In some embodiments the controller 150 is further configured to control a fourth image sensor (e.g., S4 1108 corresponding to the fourth camera module) to read out rows of pixel values from the fourth image sensor in parallel with read out of a row of pixel values from the top portion of the first image sensor. In some such embodiments the controller 150 is further configured to control the fourth image sensor to read out of rows of pixel values from said fourth sensor in a direction extending from a bottom row towards a top row of said fourth image sensor.

In some embodiments the controller 150 is further configured to control a fifth image sensor (e.g., S5 1110 corresponding to the fifth camera module) to read out rows of pixel values from the fifth image sensor in parallel with read out of pixel values from the bottom portion of the first image sensor. In some such embodiments the controller 150 is further configured to control the fifth image sensor to read out of rows of pixel values from said fifth image sensor in a direction extending from a top row towards a bottom row of said fifth image sensor.

In some embodiments the second, third, fourth and fifth image sensors correspond to second, third, fourth and fifth camera modules, respectively, each of the second, third, fourth and fifth camera modules having the same focal length. In some embodiments the first image sensor corresponds to a first camera module which has a shorter focal length than said second camera module.

In some embodiments the camera further includes a processor, e.g., processor 110/211. In some embodiments the processor 110/211 is configured to store an image(s) captured by each of the sensors, e.g., as a result of sensor read out operation of sensors S1 1102, S2 1104, S3 1106, S4 1108 and S5 1110, in memory 108/213. In some embodiments the processor 110/211 is further configured to generate a composite image from images captured by reading out pixel values from the second, third, fourth and fifth image sensors. In some embodiments the processor 110/211 is further configured, as part of being configured to generate a composite image, to use an image captured by said first camera module in aligning portions of said images captured by reading out pixel values from the second, third, fourth and fifth image sensors. In some embodiments the processor 110/211 is further configured to control the camera device to store, e.g., in memory 108, and/or output the composite image. In some embodiments controlling the camera to output the composite image includes controlling the camera to transmit, e.g., via a transmission interface 114, to an external device and/or display the composite image, e.g., on display 102.

Figure 14:
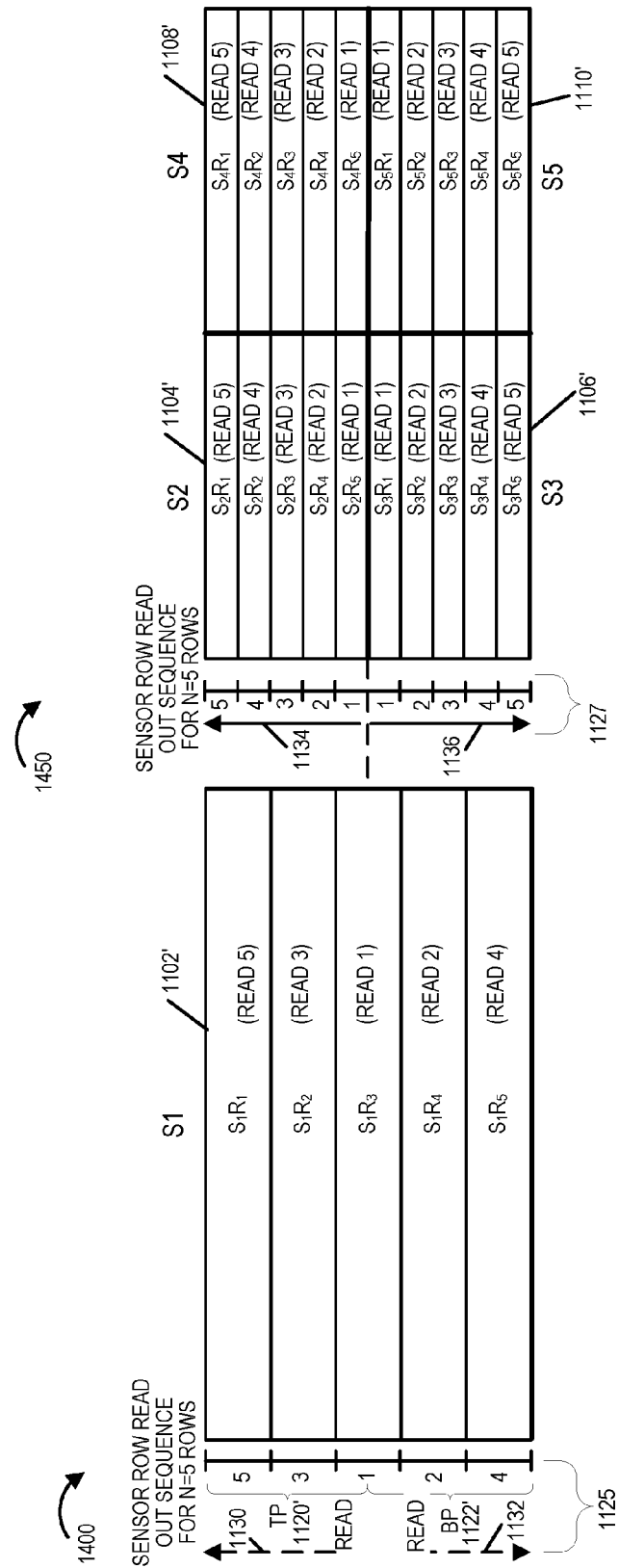
FIG. 14 illustrates another example that shows how different image sensors corresponding different optical chains are controlled to perform a coordinated read out as part of an image capture operation in the case where the total number (N) of pixel element rows in each sensor is odd, e.g., N=5.

FIG. 14 includes drawings 1400 and 1450 which in combination illustrates another example that shows how exemplary image sensors corresponding different optical chains are controlled to perform a coordinated read out as part of an image capture operation in accordance with one exemplary embodiment, with each sensor in the example including the same number (N) of pixel element rows, N being an odd number. For the purposes of discussion of FIG. 14 consider that each of the sensors S1 1102', S2 1104', S3 1106', S4 1108' and S5 1110' includes N=5 rows. Sensor S1 1102' corresponds to a camera module having short focal length (f1) used to capture larger scene area, e.g., 802, while sensors S2 1104', S3 1106', S4 1108' and S5 1110' correspond to camera modules having larger focal length (f2).

Sensor S1 1102' is shown as being conceptually divided into a top portion 1120' and bottom portion 1122' with row 3 ($S_1R_3$) being in the middle. The sensor read operation of sensors S2 1104' and S4 1108' proceeds from the bottom row toward the top row while sensor read operation of sensors S3 1106' and S5 1110' proceeds from the top row to the bottom row in a similar manner as discussed with regard to sensors of FIG. 11 example and with the read out from sensor S1 1102' being controlled to alternate between reading out a row from the top and bottom portions of sensor S1 1102'.

As discussed earlier the rows of pixel values corresponding to a sensor are read out one at a time. The read out from the sensors S2 1104', S3 1106', S4 1108', S5 1110' shown in drawing 1450 is synchronized with readout of rows of pixel elements of sensor S1 1102' shown in drawing 1400 and the read out operation is controlled to proceed in an exemplary sequence in accordance with the invention as discussed below.

In the illustrated example read out operation starts with $S_1R_3$ (row 3) of S1 1102' being read in parallel with rows of pixel elements $S_2R_5$, and $S_4R_5$ of sensors S2 1104' and S4 1108' and rows $S_3R_1$, and $S_5R_1$ of sensors S3 1106' and S5 1110', e.g., during a first period of time. After the read out from S1 1102' during the first time period during which the middle row (row 3) is read in parallel with a row from sensors S2 1104', S3 1106', S4 1108', S5 1110' as discussed above, in accordance with one aspect additional rows from S1 1102' are read out in a sequence that alternates between reading out an additional row corresponding to the top portion 1120' and the bottom portion 1122' of S1 1102' in parallel with additional rows corresponding to sensors S2 1104', S3 1106', S4 1108' and S5 1110'. Thus next $S_1R_4$ (row 4) of sensor S1 1102' is read from the bottom portion 1122', e.g., during a second period of time, in parallel with rows of pixel elements $S_3R_2$, and $S_5R_2$ of sensors S3 1106' and S5 1110' and rows $S_2R_4$, and $S_4R_4$ of sensors S2 1104' and S4 1108'.

Next $S_1R_2$ (row 2) is read from the top portion of sensor S1 1102' in parallel with rows of pixel elements $S_2R_3$, and $S_4R_3$ of sensors S2 1104' and S4 1108' and rows $S_3R_3$, and $S_5R_3$ of sensors S3 1106' and S5 1110', e.g., during a third period of time. As the sensor scan for various sensors proceeds, next $S_1R_5$ (row 5) of sensor S1 1102' is read from the bottom portion 1122' (e.g., during a fourth period of time) in parallel with rows of pixel elements $S_3R_4$, and $S_5R_4$ of sensors S3 1106' and S5 1110' and rows $S_2R_2$, and $S_4R_2$ of sensors S2 1104' and S4 1108'. Finally the last remaining row of pixel elements $S_1R_1$ (row 1) is read from the top portion 1120' of S1 1102' in parallel with rows of pixel elements $S_2R_1$, and $S_4R_1$ of sensors S2 1104' and S4 1108' and rows $S_3R_5$, and $S_5R_5$ of sensors S3 1106' and S5 1110', e.g., during a fifth period of time.

FIGS. 15-19 illustrate an exemplary sequence of coordinated read out of pixel element rows from multiple different exemplary sensors of FIG. 14, with each of the FIGS. 15-19 showing the synchronized read out from the sensors during a single read out time period. When considered in sequence, FIGS. 15-20 allow for a better understanding of coordinated pixel row read out operation from different sensors and how rows from sensor S1 1102' are read out in a sequence that alternates between reading out a row corresponding to the top portion 1120' and the bottom portion 1122' of S1 1102' in parallel with rows corresponding to sensors S2 1104', S3 1106', S4 1108' and S5 1110'.

Figure 15:
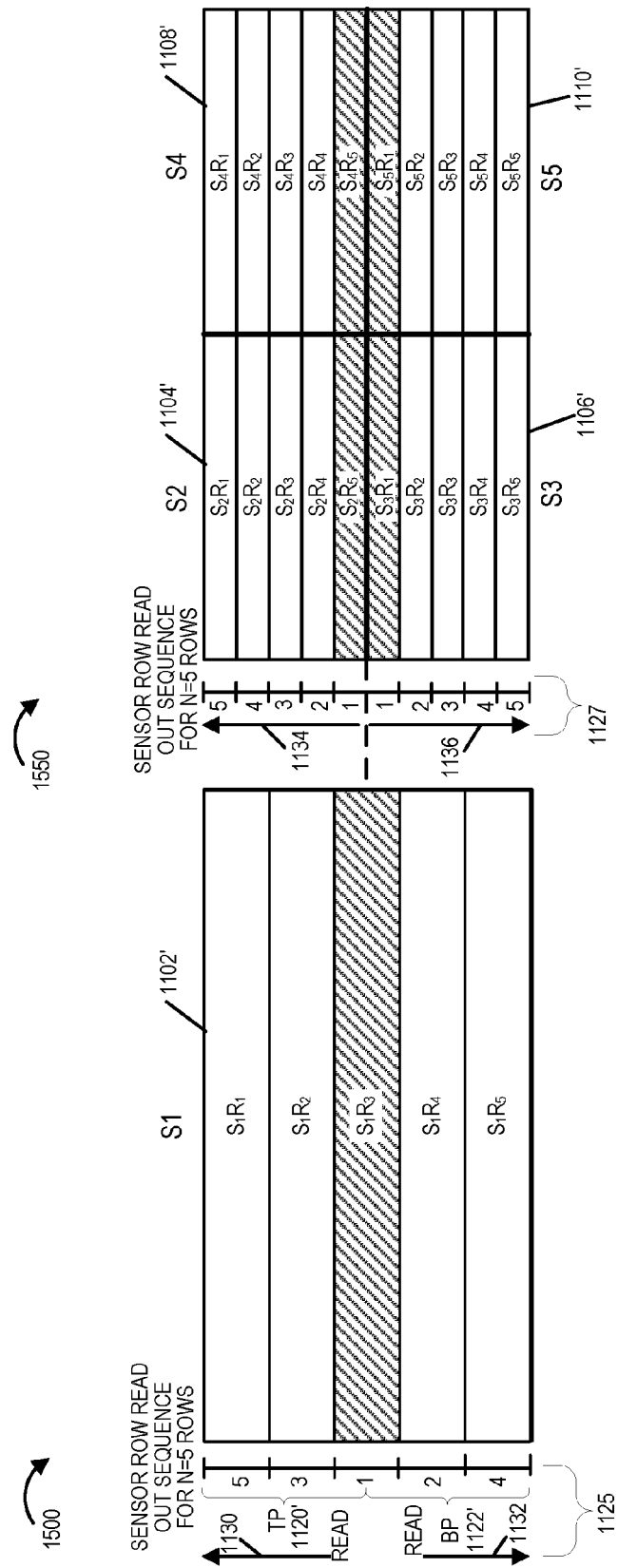
FIG. 15 illustrates coordinated read out of pixel element rows from multiple exemplary sensors of FIG. 14 during a first read out time period in accordance with an exemplary embodiment.

FIG. 15 includes drawings 1500 and 1550 which in combination illustrates coordinated read out of pixel element rows from sensors S1 1102', S2 1104', S3 1106', S4 1108' and S5 1110' during a first read out time period during which a single row of pixel elements is read from each of the five sensors in a coordinated manner in accordance with some embodiments. The rows of pixel elements that are read out in parallel during the first read out time period are shown with a first diagonal line shading pattern. As can be seen during the first read out time period $S_1R_3$ (row 3) of S1 1102' is read in parallel with rows $S_2R_5$, and $S_4R_5$ of sensors S2 1104' and S4 1108' and rows $S_3R_1$, and $S_5R_1$ of sensors S3 1106' and S5 1110'.

Figure 16:
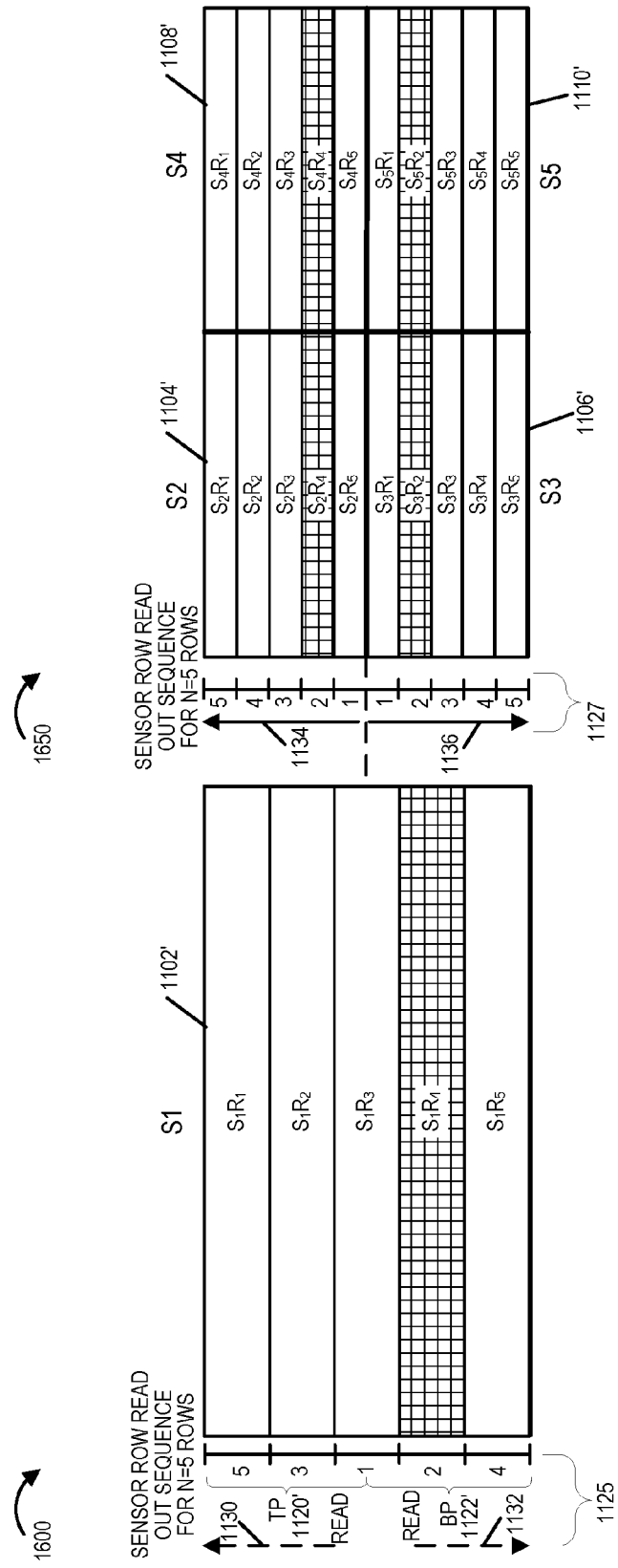
FIG. 16 illustrates coordinated read out of pixel element rows from the multiple exemplary sensors of FIG. 14 during a second read out time period in accordance with some embodiments.

FIG. 16 includes drawings 1600 and 1650 which in combination illustrates coordinated read out of pixel element rows from sensors S1 1102', S2 1104', S3 1106', S4 1108' and S5 1110' during a second read out time period in accordance with some embodiments. The rows of pixel elements that are read out in parallel during the second read out time period are shown with a large grid shading pattern. As can be appreciated from FIG. 16, during the second read out time period $S_1R_4$ (row 4) is read from the bottom portion of S1 1102' in parallel with rows $S_3R_2$, and $S_5R_2$ of sensors S3 1106' and S5 1110' and rows $S_2R_4$, and $S_4R_4$ of sensors S2 1104' and S4 1108'.

Figure 17:
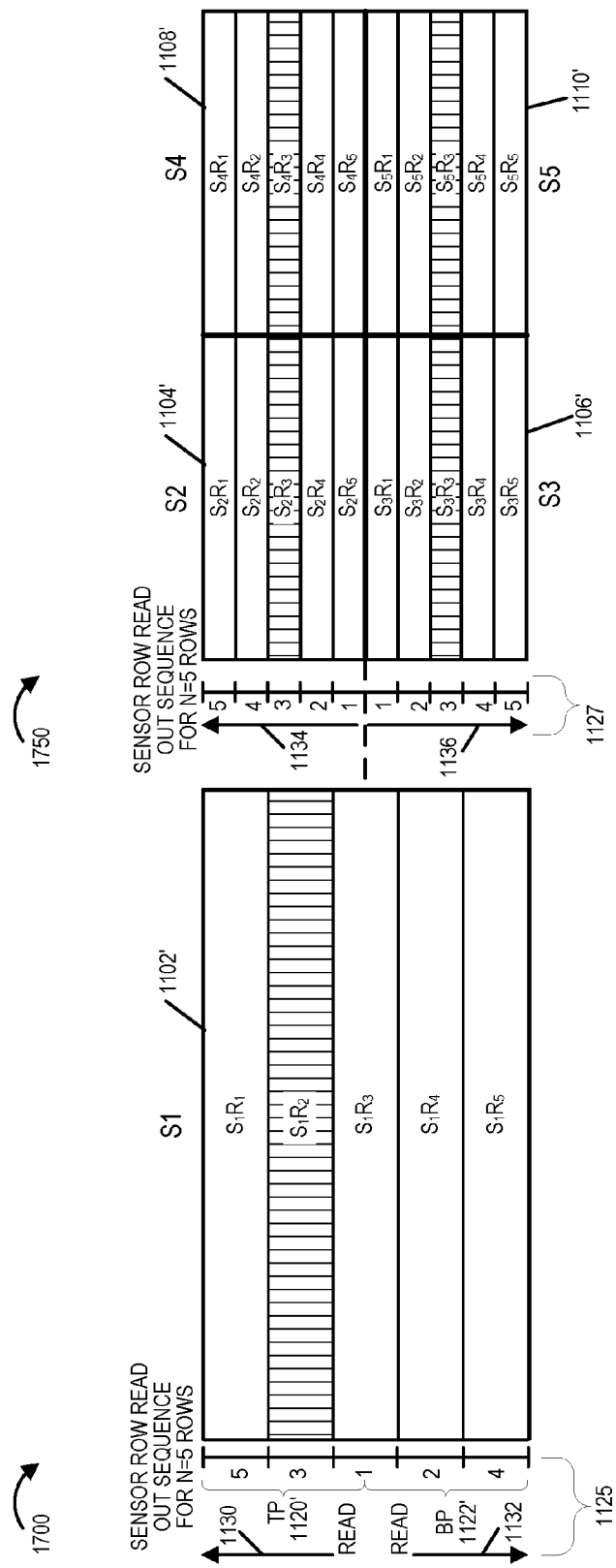
FIG. 17 illustrates coordinated read out of pixel element rows from the multiple exemplary sensors of FIG. 14 during a third read out time period in accordance with some embodiments.

FIG. 17 includes drawings 1700 and 1750 which in combination illustrates coordinated read out of pixel element rows from sensors S1 1102', S2 1104', S3 1106', S4 1108' and S5 1110' during a third read out time period. The rows of pixel elements that are read out in parallel during the third read out time period are shown with a vertical line shading pattern. As can be appreciated from FIG. 17, during the third read out time period $S_1R_2$ (row 2) is read from the top portion of S1 1102' in parallel with rows $S_2R_3$, and $S_4R_3$ of sensors S2 1104' and S4 1108' and rows $S_3R_3$, and $S_5R_3$ of sensors S3 1106' and S5 1110'.

Figure 18:
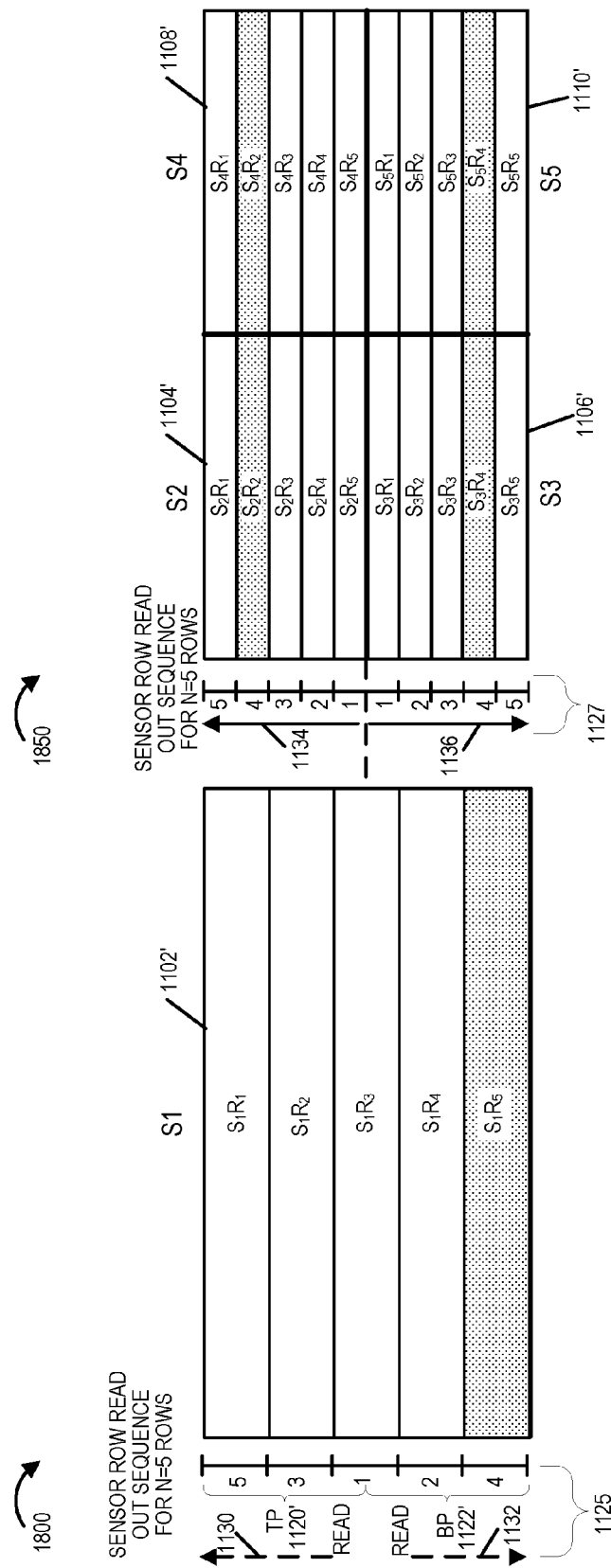
FIG. 18 illustrates coordinated read out of pixel element rows from the multiple exemplary sensors of FIG. 14 during a fourth read out time period in accordance with some embodiments.

FIG. 18 includes drawings 1800 and 1850 which in combination illustrates coordinated read out of pixel element rows from sensors S1 1102', S2 1104', S3 1106', S4 1108' and S5 1110' during a fourth read out time period in accordance with some embodiments. The rows of pixel elements that are read out in parallel during the fourth read out time period are shown with a tiny dots shading pattern. As can be appreciated from the figure, during the fourth read out time period $S_1R_5$ (row 5) is read from the bottom portion of S1 1102' in parallel with rows $S_3R_4$, and $S_5R_4$ of sensors S3 1106' and S5 1110' and rows $S_2R_2$, and $S_4R_2$ of sensors S2 1104' and S4 1108'.

Figure 19:
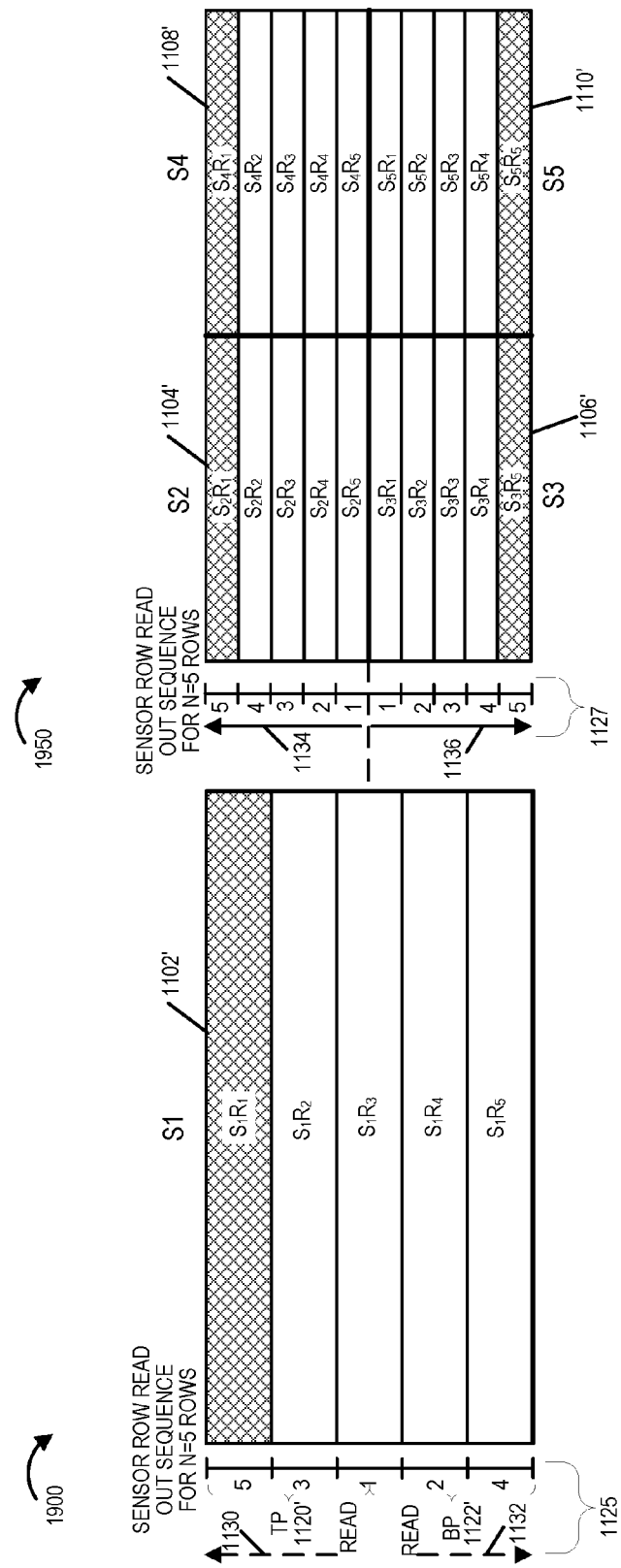
FIG. 19 illustrates coordinated read out of pixel element rows from the multiple exemplary sensors of FIG. 14 during a fifth read out time period in accordance with some embodiments.

FIG. 19 includes drawings 1900 and 1950 which in combination illustrates coordinated read out of pixel element rows from sensors S1 1102', S2 1104', S3 1106', S4 1108' and S5 1110' during a fifth read out time period. The rows of pixel elements that are read out in parallel during the fifth read out time period are shown with a cross hatch pattern. As can be appreciated from FIG. 19, during the fifth read out time period $S_1R_1$ (row 1) is read from the top portion of S1 1102' in parallel with rows $S_2R_1$, and $S_4R_1$ of sensors S2 1104' and S4 1108' and rows $S_3R_5$, and $S_5R_5$ of sensors S3 1106' and S5 1110'.

Figure 20:
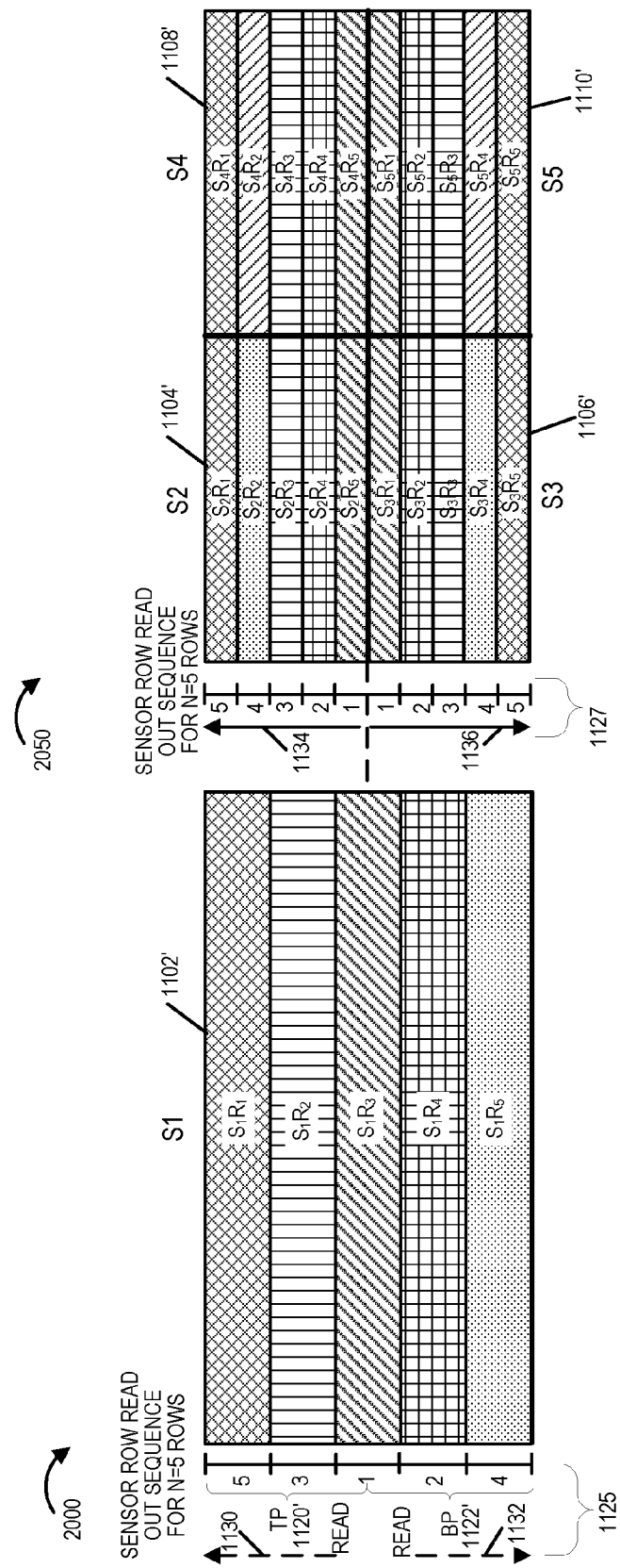
FIG. 20 illustrates a complete sequence of coordinated read out from the different exemplary sensors, with the rows from the different sensors that are read out in parallel during a given read out time period being shown with same shading pattern.

FIG. 20 includes drawings 2000 and 2050 which in combination illustrates a complete sequence of coordinated read out from the five different exemplary sensors. In FIG. 20 the rows of pixel elements from the different sensors that are read out in parallel during a given read out time period are shown with same shading pattern as shown and discussed with regard to FIGS. 15-19 to allow for a better appreciation of the coordinated sensor read out in accordance with the invention. Thus it can be appreciated that $S_1R_3$ of S1 1102' is read in parallel with rows $S_2R_5$, and $S_4R_5$ of sensors S2 1104' and S4 1108' and rows $S_3R_1$, and $S_5R_1$ of sensors S3 1106' and S5 1110', e.g., during the first read time period, next $S_1R_4$ of S1 1102' is read in parallel with $S_3R_2$, and $S_5R_2$ of sensors S3 1106' and S5 1110' and rows $S_2R_4$, and $S_4R_4$ of sensors S2 1104' and S4 1108', e.g., during the second read time period, next $S_1R_2$ is read from S1 1102' in parallel with rows $S_2R_3$, and $S_4R_3$ of sensors S2 1104' and S4 1108' and rows $S_3R_3$, and $S_5R_3$ of sensors S3 1106' and S5 1110', e.g., during the third read time period, $S_1R_5$ is read from S1 1102' in parallel with rows $S_3R_4$, and $S_5R_4$ of sensors S3 1106' and S5 1110' and rows $S_2R_2$, and $S_4R_2$ of sensors S2 1104' and S4 1108', e.g., during the fourth read time period, and finally $S_1R_1$ is read from S1 1102' in parallel with rows $S_2R_1$, and $S_4R_1$ of sensors S2 1104' and S4 1108' and rows $S_3R_5$, and $S_5R_5$ of sensors S3 1106' and S5 1110' completing a read out operation of sensors S1 1102', S2 1104', S3 1106', S4 1108' and S5 1110'.

Figure 21A:
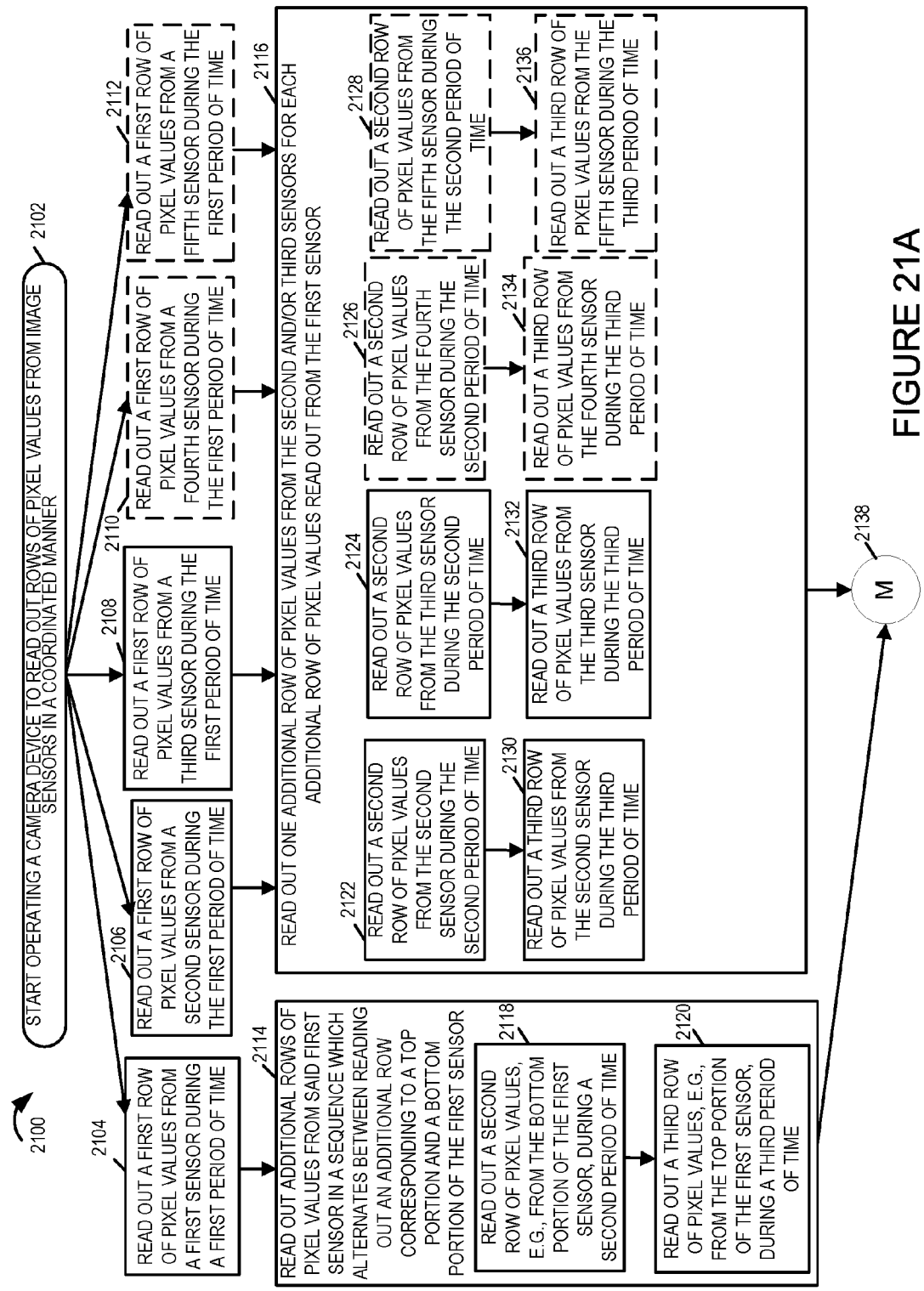
FIG. 21A illustrates a first part of a flowchart showing the steps of an exemplary method of controlling a camera device to read out rows of pixel values from image sensors in a coordinated manner in accordance with an exemplary embodiment.
Figures 21, 21A, 21B:
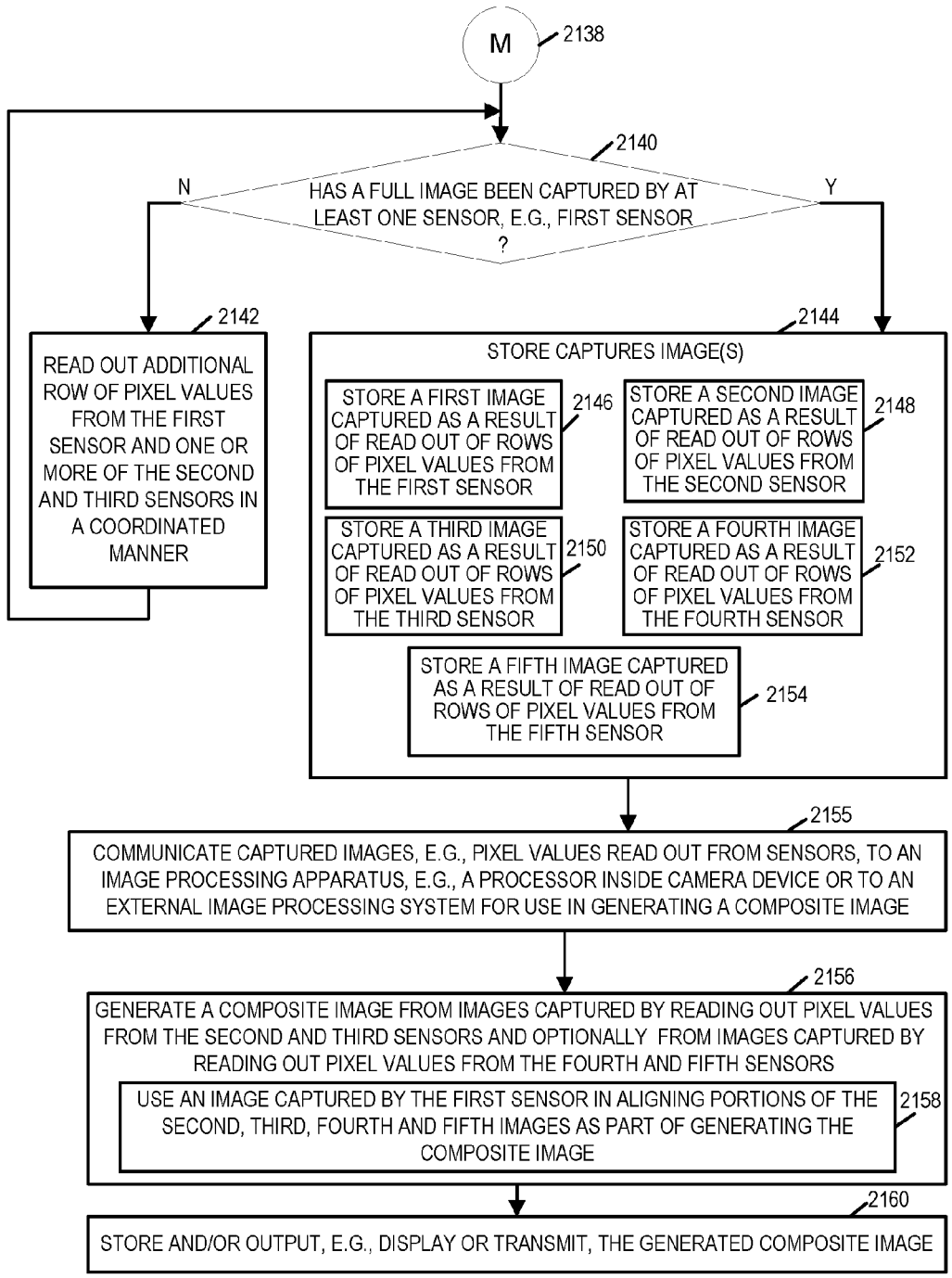
FIG. 21B illustrates a second part of a flowchart showing the steps of an exemplary method of controlling a camera device to read out rows of pixel values from image sensors in a coordinated manner in accordance with an exemplary embodiment.
FIG. 21 comprising the combination of FIGS. 21A and 21B illustrates the steps of the exemplary method of controlling a camera device in accordance with an exemplary embodiment.

FIG. 21, which comprises the combination of FIGS. 21A and 21B, is a flowchart 2100 illustrating the steps of an exemplary method of controlling a camera device, e.g., camera 600, that includes sensors with a rolling shutter to read out rows of pixel values from image sensors in a coordinated manner in accordance with an exemplary embodiment. The camera device implementing the method of flowchart 2100 can and sometimes does include the same or similar elements as the camera device 100 of FIG. 1 and device 200 of FIG. 4A.

The exemplary method starts in step 2102, e.g., when a user of a camera device presses a button or takes another action to trigger the capture of an image of a scene area of interest. For the purposes of discussion consider that the camera device includes a plurality of optical chains, e.g., camera modules, which can be operated and controlled independently and/or in a coordinated manner. For purposes of discussion of the method of flowchart 2100, consider that the image sensors being read in the coordinated manner are the sensors shown in FIGS. 14-20 and thus the coordinated sensor row read operation will be explained by referring to FIGS. 14-20 to facilitate an easier understanding of the method discussed below.

Operation proceeds from step 2102 to steps 2104, 2106 and 2108 which are performed in a coordinated manner in accordance with the invention, e.g., with two or more steps being performed in a synchronized manner in accordance with the features of some embodiments. In some embodiments the operation also proceeds from step 2102 to steps 2110 and 2112 which are optional in some embodiments. In step 2104 a sensor readout controller, e.g., controller 150, controls a first image sensor to read out a row of pixel values from a first image sensor, e.g., sensor S1 1102', during a first period of time. For example row 3 of S1 1102' ($S_1R_3$) is read during a first read time, e.g., during READ1. Operation proceeds from step 2104 to step 2114, e.g., after completion of row read out during the first period of time. In various embodiments the controller 150 controls various other image sensors corresponding to different camera modules of the camera device to perform a read out of pixel in synchronization with S1 1102' as discussed with regard to FIG. 14. Thus in step 2106 a row of pixel values is read out from a second sensor, e.g., sensor S2 1104', during the first period of time, e.g., in parallel with read out of the first row of pixel values from S1 1102'. For example row 5 of S2 1104' ($S_2R_5$) is read during a first read time. In step 2108 a row of pixel values is read out from a third sensor, e.g., row 1 ($S_3R_1$) of sensor S3 1106', during the first period of time, e.g., in parallel with read out of the rows of pixel values from S1 1102' and S2 1104'. In some, but not all, embodiments steps 2110 and 2112 are also performed during the first time period. In step 2110 a row of pixel values is read out from a fourth sensor, e.g., row 5 ($S_4R_5$) of sensor S4 1108', during the first period of time. In step 2112 a row of pixel values is read out from a fifth sensor, e.g., row 1 ($S_5R_1$) of sensor S5

1110', during the first period of time. Operation proceeds from steps 2106, 2108, 2110 and 2112 to step 2116, e.g., after completion of row read out from these sensors during the first period of time.

In step 2114 the controller 150 controls the first sensor S1 1102' to read out additional rows from S1 1102' in a sequence that alternates between reading out an additional row of pixel values corresponding to a top portion of the first sensor, e.g., TP 1120', and a bottom portion of the first sensor, e.g., BP 1122'. In accordance with the features of some embodiments additional rows are read from the first sensor S1 1102', after the read out of a row during the first time period, by alternating between reading a row from an upper half portion of S1 1102', e.g., during one time period, and reading a row from a lower half portion of S1 1102', e.g., during another subsequent time period, with the reading out of additional rows from the first sensor continuing in this alternating fashion until the read out of the first sensor is complete. In some embodiments as part of step 2114, steps 2118 and 2120 are performed. Step 2118 is performed in some embodiments during a second time period (e.g., which occurs after the first period during which a first row of the first sensor was read). In step 2118 a second row of pixel values is read out from a bottom portion 1122' of the first sensor. For example row 4 of S1 1102' ($S_1R_4$) is read during the second time period, e.g., during READ2. Next in step 2120, which is performed during a third time period, e.g., which occurs after the second period, a third row of pixel values is read out from a top portion 1120' of the first sensor. For example row 2 of S1 1102' ($S_1R_2$) is read during the third time period, e.g., during READ3. Operation proceeds from step 2114 to step 2140 via connecting node M 2138.

Returning to step 2116 which is performed in parallel with step 2114 and following the read out of sensor row from S2 1104', S3 1106' (and optionally from S4 1108' and S5 1110'). In step 2116 the controller controls read out of one additional row from the second and/or third sensors S2 1104', S3 1106' for each additional row of pixel values read out from the first sensor S1 1102'. In some embodiments in addition to read out of one additional row from S2 1104', S3 1106', the controller further controls read out of one additional row from the fourth and/or fifth sensors S4 1108', S5 1110' for each additional row of pixel values read out from the first sensor S1 1102'. In some embodiments as part of step 2116 steps 2122, 2124 and optionally steps 2126 and 2128 are performed during the second period of time, e.g., in parallel with step 2118 performed during the second period of time. In step 2122 a second row of pixel values is read out from the second sensor S2 1104' during the second period of time, e.g., row 4 of S2 1104' ($S_2R_4$) is read during the second period of time in parallel with $S_1R_4$ from S1 1102'. In step 2124 a second row of pixel values is read out from the third sensor during the second time period, e.g., row 2 ($S_3R_2$) of sensor S3 1106'. In step 2126 a second row of pixel values is read out from the fourth sensor S4 1108' during the second period of time, e.g., row 4 of S4 1108' ($S_4R_4$) is read during the second period of time. In step 2128 a second row of pixel values is read out from the fifth sensor during the second time period, e.g., row 2 ($S_5R_2$) of sensor S5 1110'.

Furthermore in some embodiments as part of step 2116 steps 2130, 2132 and optionally steps 2134 and 2136 are performed during the third period of time, e.g., in parallel with step 2120 performed during the third period of time. In step 2130 a third row of pixel values is read out from the second sensor S2 1104' during the third period of time, e.g., row 3 of S2 1104' ($S_2R_3$) is read during the third period of time, in parallel with read out of $S_1R_2$ from S1 1102'. In step 2132 a third row of pixel values is read out from the third sensor during the third time period, e.g., row 3 ($S_3R_3$) of sensor S3 1106'. In step 2134 a third row of pixel values is read out from the fourth sensor S4 1108' during the third period of time, e.g., row 3 of S4 1108' ($S_4R_3$) is read during the third period of time. In step 2136 a third row of pixel values is read out from the fifth sensor during the third time period, e.g., row 3 ($S_5R_3$) of sensor S5 1110'. Operation proceeds from steps 2116 to step 2140 via connecting node M 2138.

Referring now to step 2140. In step 2140 it is determined if a full image has been captured by at least one sensor, e.g., first sensor S1 1102', to determine if sensor rows of at least one sensor have been read. If it is determined that the full image has not been captured by at least one sensor, the operation proceeds from step 2140 to step 2142 where the controller 150 controls the first sensor S1 1102' and the second and third sensors S2 1104', S3 1106' (and optionally sensors S4 1108' and S5 1110') to read out additional rows of pixel values in a coordinated manner, e.g., by repeating steps 2114 and 2116 to read out additional rows from these sensors in the manner discussed in steps 2114, 2116. Thus in some embodiments until an image is captured by the first sensor S1 1102', the controller controls sensors S1 1102', S2 1104' and S3 1106' (and optionally S4 1108' and S5 1110') to repeat row read out of additional rows in the manner discussed in steps 2114 and 2116 (and sub-steps therein). The steps are repeated in some embodiments to read out additional rows from the sensors until a full image has been captured by at least one sensor.

If in step 2140 it is determined that the full image has been captured by at least one sensor, the operation proceeds from step 2140 to step 2144. In some embodiments step 2144 is performed after at least one image is captured by each one of the first sensor S1 1102', second S2 1104' (and/or fourth S4 1108') and third sensor S3 1106' (and/or fifth sensor S5 1110'). In step 2144 the captured image(s) are stored in camera device, e.g., in memory 108/213. As part of step 2144 a one or more of the storing steps 2146, 2148, 2150, 2152 and 2154 are performed in some embodiments. For discussion purposes consider that an image is captured by each of the sensors, e.g., as a result of sensor read out operation of sensors S1 1102', S2 1104', S3 1106', S4 1108' and S5 1110'. Thus in such a case as part step 2144 steps 2146, 2148, 2150, 2152 and 2154 are performed. In step 2146 a first image captured as a result of read out of rows of pixel values from the first sensor is stored. In step 2148 a second image captured as a result of read out of rows of pixel values from the second sensor is stored. In step 2150 a third image captured as a result of read out of rows of pixel values from the third sensor is stored. In step 2152 a fourth image captured as a result of read out of rows of pixel values from the fourth sensor is stored. In step 2154 a fifth image captured as a result of read out of rows of pixel values from the fifth sensor is stored.

Operation proceeds from step 2144 to step 2155. In step 2155 the captured image(s), e.g., the pixel values read out of from the sensors, are communicated to an image processing apparatus, e.g., a computer or processor of the camera device implementing the method, e.g., processor 110/211, or an external image processing system for additional processing, e.g., in generating a composite image. The captured image(s) may be communicated via local network/bus 116 in the case where images are supplied to camera device processor, or via an interface such as interface 114 of camera 100 in the case where images are supplied to an external system. Operation proceeds from step 2155 to step 2156 which may be performed by the processor of the camera device or an external processing system. In step 2156 a composite image is generated from images captured by reading out pixel values from the second and third sensors and optionally also from images captured by reading out pixel values from the fourth and fifth sensors, e.g., using the second, third, fourth and fifth images. For example, images captured by reading out pixel values from the second, third, fourth and fifth camera sensors may correspond to scene areas 902, 904, 906 and 908 and a composite image may be generated, e.g., by processor 110/211 by stitching together the at least two or more of the second, third, fourth and fifth images. In some embodiments the composite image generation step 2156 further includes step 2158 where an image captured by reading out pixel values from the first sensor (e.g., first image) is used in aligning portions of the images captured by reading out pixel values from the second, third, fourth and fifth sensors as part of generating the composite image. Operation proceeds from step 2156 to step 2160 where the generated composite image is stored and/or output, e.g., transmitted and/or displayed.

In one exemplary embodiment an imaging device such as e.g., the camera device 100/200, is used to implement the method of flowchart 2100. In one such embodiment the plurality of optical chains 130 of the camera device 100 include optical chains, e.g., camera modules, arranged in the manner as illustrated in FIG. 7A with more detailed arrangements and elements (e.g., sensors, filters, lens etc.) of the optical chains further shown in FIG. 7B. Thus in some such embodiments the plurality of optical chains 130 includes a first camera module, a second camera module, and a third camera module. In some embodiments the camera further includes a fourth camera module and a fifth camera module. In some embodiments the controller 150 (including the sensor read out controller 289) is configured to control a plurality of image sensors, corresponding to the plurality of camera modules 130, to perform read out of sensor rows in a coordinated manner as discussed with regard to flowchart 2100. In one such embodiment the controller 150 (including the sensor read out controller 289) is configured to control a first image sensor (e.g., S1 1102' corresponding to the first camera module) to read out a first row of pixel values, e.g., ($S_1R_3$) of S1 1102' during a first period of time. The controller 150 is further configured to control a second image sensor (e.g., S2 1104') to read out a row of pixel values, e.g., row $S_2R_5$ from the second sensor during the first period of time, e.g., in parallel with read out of the first row of pixel values from S1 1102'. In some embodiments the controller 150 is further configured to control a third sensor, e.g., S3 1106', to read out a row of pixel values, e.g., row 1 ($S_3R_1$), during the first period of time. In some embodiments the controller 150 is further configured to control a fourth sensor, e.g., S4 1108', to read out a row of pixel values, e.g., row 5 ($S_4R_5$), during the first period of time and control a fifth sensor, e.g., S5 1110', to read out a row of pixel values, e.g., row 1 ($S_5R_1$), during the first period of time.

In some embodiments the controller 150 is further configured to control the first sensor S1 1102' to read out additional rows from S1 1102' in a sequence that alternates between reading out an additional row of pixel values corresponding to a top portion of the first sensor, e.g., TP 1120', and a bottom portion of the first sensor, e.g., BP 1122'. Thus controller 150 is further configured to control the first sensor S1 1102' to read out additional rows from the first sensor S1 1102', after the read out of a row during the first time period, by alternating between reading a row from an upper half portion of S1 1102', e.g., during one time period, and reading a row from a lower half portion of S1 1102', e.g., during another subsequent time period, with the reading out of additional rows from the first sensor continuing in this alternating fashion until the read out of the first sensor is complete. In some embodiments as part of controlling the first sensor S1 1102' to read out additional rows the controller 150 controls S1 1102' to read out a second row of pixel values from a bottom portion 1122' of the first sensor S1 1102', e.g., with $S_1R_4$ being read during the second time period. In some embodiments the controller 150 further controls S1 1102' to read out a third row of pixel values, e.g., $S_1R_2$ from a top portion 1120' of the first sensor during a third time period, e.g., which occurs after the second period.

In some embodiments the controller 150 is further configured to control read out of one additional row from the second and/or third sensors S2 1104', S3 1106' and from the S4 1108' and S5 1110' for each additional row of pixel values read out from the first sensor S1 1102'. Thus in some embodiments the controller 150 is further configured to control the second sensor S2 1104' to read out a second row of pixel values from the second sensor S2 1104' during the second period of time, e.g., controlling row 4 of S2 1104' ($S_2R_4$) to be read during the second period of time in parallel with $S_1R_4$ from S1 1102'. The controller 150 is further configured to control the third sensor to read out a second row of pixel values from the third sensor during the second time period, e.g., row 2 ($S_3R_2$) of sensor S3 1106'. The controller 150 in some embodiments is further configured to control the fourth sensor S4 1108' to read out a second row of pixel values during the second period of time, e.g., row 4 of S4 1108' ($S_4R_4$), and control the fifth sensor S5 1110' to read out a second row of pixel values during the second time period, e.g., row 2 ($S_5R_2$) of sensor S5 1110'.

In some embodiments the controller 150 is further configured to control the second sensor to read out a third row of pixel values during the third period of time, e.g., with row 3 of S2 1104' ($S_2R_3$) being read during the third period of time in parallel with read out of $S_1R_2$ from S1 1102'. The controller 150 in some embodiments is further configured to control the third sensor to read out a third row of pixel values during the third time period, e.g., row 3 ($S_3R_3$) of sensor S3 1106'. The controller 150 in some embodiments is further configured to control the fourth sensor to read a third row of pixel values during the third period of time, e.g., row 3 of S4 1108' ($S_4R_3$) and control the fifth sensor to read a third a third row of pixel values during the third time period, e.g., row 3 ($S_5R_3$) of sensor S5 1110'.

In some embodiments the controller is further configured to determine if an image is captured by at least one image sensor, e.g., first image sensor. In some embodiments the controller 150 is further configured to control the first sensor S1 1102' and the second and third sensors S2 1104', S3 1106' (and optionally sensors S4 1108' and S5 1110') to read out additional rows of pixel values in a coordinated manner as discussed with regard to steps 2114 and 2116. In some embodiments the first image sensor is part of a first camera module, the second image sensor is part of a second camera module, and the third image sensor is part of a third camera module, the first camera module having a shorter focal length than the second and third camera modules. In some embodiments the second, third, fourth and fifth image sensors correspond to second, third, fourth and fifth camera modules, respectively, each of the second, third, fourth and fifth camera modules having the same focal length. In some embodiments the first image sensor corresponds to a first camera module which has a shorter focal length than the second camera module.

In some embodiments the camera device further includes a processor, e.g., processor 110/211. In some embodiments the processor 110/211 is configured to store an image(s) captured by each of the sensors, e.g., as a result of sensor read out operation of sensors S1 1102', S2 1104', S3 1106', S4 1108' and S5 1110', in memory 108/213. In some embodiments the processor 110/211 is further configured to generate a composite image from images captured by reading out pixel values from the second, third, fourth and fifth image sensors. In some embodiments the processor 110/211 is further configured, as part of being configured to generate a composite image, to use an image captured by the first camera module (to which the first sensor S1 1102' corresponds) in aligning portions of said images captured by reading out pixel values from the second, third, fourth and fifth image sensors. In some embodiments the processor 110/211 is further configured to control the camera device to store, e.g., in memory 108, and/or output the composite image. In some embodiments controlling the camera to output the composite image includes controlling the camera to transmit, e.g., via a transmission interface 114, to an external device and/or display the composite image, e.g., on display 102.

In various embodiments the read out controller 150 (that includes sensor read out controller 289) alone, or under direction of the processor 110, controls each of the image sensors of the camera device to perform a read out of pixel values, e.g., rows of pixel values, in a synchronized manner as discussed above.

While one or more steps of the method 1300 and 2100 have been discussed as being performed by a processor, e.g., processor 110, 211, it should be appreciated that one or more of the steps may be, and in some embodiments are, implemented by dedicated circuitry, e.g., ASICs, FPGAs and/or other application specific circuits which improve the efficiency, accuracy and/or operational capability of the imaging device performing the method. In some embodiments, dedicated hardware, e.g., circuitry, and/or the combination of dedicated hardware and software are utilized in implementing one or more steps of the method 1300 and 2100 therein providing additional image processing efficiency, accuracy and/or operational capability to the imaging device, e.g., camera, implementing the method. In some embodiments the method and apparatus are implemented fully in hardware.

The camera devices of the present invention supports multiple modes of operation and switching between different modes of operation. Different modes may use different numbers of multiple lenses per area, and/or different exposure times for different optical chains used to capture a scene area in parallel. Different exposure modes and filter modes may also be supported and switched between, e.g., based on user input.

The methods and apparatus allow the readout time to be reduced by half as compared to a case where two sensors are consecutively read out, e.g., to capture the top and bottom portions of a scene area sequentially since the top and bottom portions can be read out in the time to read out a single sensor while maintaining synchronization with another sensor, e.g., with a shorter focal length, that captures the top an bottom portions during the same sensor read out time period. This can have significant benefits in terms of saving power for example, because the amount of time a flash unit needs to be kept on can be reduced as compared to the sequential sensor readout case. This is because the flash often, and in some embodiments does, remain powered on during the exposure and image capture time. As the amount of time to capture an image can be decreased, this can significantly decrease the power consumption during image capture since the overall image capture time is reduced as compared to other systems and embodiments. Since the synchronized sensor readout reduces the read-out time by half as compared to other embodiments which read out multiple sensors sequentially, the flash power consumption is reduced approximately by that amount as well.

Numerous additional variations and combinations are possible while remaining within the scope of the invention.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images may be and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or or routines, for implementing the methods of the present invention and/or for transiting captured images or generated composite images to other devices for storage or display.

Numerous additional embodiments are possible while staying within the scope of the above discussed features.

What is claimed is:

1. A method of operating an apparatus, the method comprising:
   alternating between reading out a row of pixel values from a top portion of a first sensor and a row of pixel values from a bottom portion of the first sensor;
   reading out a row of pixel values from a second sensor in parallel with the reading out of the row of pixel values from the top portion of the first sensor, wherein reading out said row of pixel values from a second sensor in parallel with the reading out of the row of pixel values from the top portion of the first sensor is performed during a first read out time period, said row of pixel values read out from the first sensor during the first read out time period corresponding to a scene area which overlaps a scene area to which said row of pixel values read out from the second sensor corresponds;
   reading out during said first read out time period a row of pixel values from a third sensor capturing a scene area below the scene area to which said row of pixel values read out from the second sensor correspond;
   during a second read out time period reading out an additional row of pixel values from the third sensor in parallel with reading out of a row of pixel values from the bottom portion of the first sensor, said row of pixel values from the bottom portion of the first sensor corresponding to a scene area which overlaps the scene area captured by the additional row of pixel values from the third sensor; and
   during said second read out time period reading out an additional row of pixel values from the second sensor.

2. A method of operating an apparatus, the method comprising:
   alternating between reading out a row of pixel values from a top portion of a first sensor and a row of pixel values from a bottom portion of the first sensor;
   reading out a row of pixel values from a second sensor in parallel with the reading out of the row of pixel values from the top portion of the first sensor;
   reading out a row of pixel values from a third sensor in parallel with reading out of a row of pixel values from the bottom portion of the first sensor; and
   repeating, until an image is captured by said first sensor, said steps of: i) alternating between reading out a row of pixel values from a top portion of the first sensor and a row of pixel values from a bottom portion of the first sensor, ii) reading out a row of pixel values from a second sensor in parallel with the reading out of the row of pixel values from the top portion of the first sensor; and iii) reading out a row of pixel values from a third sensor in parallel with reading out of a row of pixel values from a bottom portion of the first sensor.

3. The method of claim 2, wherein reading out of rows of pixel values from said second sensor is performed by reading out rows of pixel values in a direction extending from a bottom row towards a top row of said second sensor.

4. The method of claim 3, wherein said first sensor is part of a first camera module, said second sensor is part of a second camera module, and said third sensor is part of a third camera module, said first camera module having a shorter focal length than said second and third camera modules.

5. A method of operating an apparatus, the method comprising:
   alternating between reading out a row of pixel values from a top portion of a first sensor and a row of pixel values from a bottom portion of the first sensor;
   reading out a row of pixel values from a second sensor in parallel with the reading out of the row of pixel values from the top portion of the first sensor; and
   reading out a row of pixel values from a third sensor in parallel with reading out of a row of pixel values from the bottom portion of the first sensor, wherein reading out of rows of pixel values from said third sensor is performed by reading out rows of pixel values in a direction extending from a top row of said third sensor with row read out of said third sensor progressing towards a bottom row of said third sensor.

6. A method of operating an apparatus, the method comprising:
   alternating between reading out a row of pixel values from a top portion of a first sensor and a row of pixel values from a bottom portion of the first sensor;
   reading out a row of pixel values from a second sensor in parallel with the reading out of the row of pixel values from the top portion of the first sensor;
   reading out a row of pixel values from a third sensor in parallel with reading out of a row of pixel values from the bottom portion of the first sensor; and
   reading out rows of pixel values from a fourth sensor in parallel with reading out of a row of pixel values from the top portion of the first sensor.

7. The method of claim 6, wherein reading out of rows of pixel values from said fourth sensor is performed by reading out rows of pixel values in a direction extending from a bottom row towards a top row of said fourth sensor.

8. The method of claim 6, further comprising:
reading out rows of pixel values from a fifth sensor in parallel with reading out of pixel values from the bottom portion of the first sensor; and
wherein reading out of rows of pixel values from said fifth sensor is performed by reading out rows of pixel values in a direction extending from a top row towards a bottom row of said fifth sensor.

9. The method of claim 8,
wherein said second, third, fourth and fifth sensors correspond to second, third, fourth and fifth camera modules; and
wherein said first sensor corresponds to a first camera module which has a shorter focal length than said second camera module.

10. The method of claim 9, wherein the focal length of said second camera module is at least twice the focal length of the first camera module.

11. The method of claim 9, further comprising:
generating a composite image from images captured by reading out pixel values from said second, third, fourth and fifth sensors; and
wherein generating a composite image includes using an image captured by said first camera module in aligning portions of said images captured by reading out pixel values from the second, third, fourth and fifth sensors as part of generating the composite image.

12. An apparatus, comprising:
a first image sensor;
a second image sensor; and
a controller configured to control reading out of pixel values from said first image sensor and second image sensor in a coordinated manner, the controller being configured to:
control the first image sensor to alternate between reading out a row of pixel values from a top portion of the first image sensor and a row of pixel values from a bottom portion of the first image sensor;
control the second image sensor to read out a row of pixel values from the second image sensor in parallel with the reading out of the row of pixel values from the top portion of the first image sensor;
control reading out said row of pixel values from the second image sensor in parallel with the reading out of the row of pixel values from the top portion of the first image sensor during a first read out time period, said row of pixel values read out from the first image sensor during the first read out time period corresponding to a scene area which overlaps a scene area to which said row of pixel values read out from the second image sensor corresponds;
control a third image sensor to read out during said first read out time period a row of pixel values from the third image sensor capturing a scene area below the scene area to which said row of pixel values read out from the second image sensor corresponds;
control the third image sensor to read out during a second read out time period an additional row of pixel values from the third image sensor in parallel with read out of a row of pixel values from the bottom portion of the first image sensor, said row of pixel values from the bottom portion of the first image sensor corresponding to a scene area which overlaps the scene area captured by the additional row of pixel values from the third image sensor; and
control the second image sensor to read out during said second read out time period an additional row of pixel values from the second image sensor.

13. The apparatus of claim 12, further comprising:
said third image sensor; and
wherein said controller is further configured to control the third image sensor to read out a row of pixel values from the third image sensor in parallel with read out of a row of pixel values from the bottom portion of the first image sensor.

14. An apparatus, comprising:
a first image sensor;
a second image sensor;
a third image sensor; and
a controller configured to control reading out of pixel values from said first image sensor and said second image sensor in a coordinated manner, the controller being configured to:
control the first image sensor to alternate between reading out a row of pixel values from a top portion of the first image sensor and a row of pixel values from a bottom portion of the first image sensor;
control the second image sensor to read out a row of pixel values from the second image sensor in parallel with the reading out of the row of pixel values from the top portion of the first image sensor; and
control the third image sensor to read out a row of pixel values from the third image sensor in parallel with read out of a row of pixel values from the bottom portion of the first image sensor; and
repeat the following operations until an image is captured by said first image sensor: i) control the first image sensor to alternate between reading out a row of pixel values from a top portion of the first image sensor and a row of pixel values from a bottom portion of the first image sensor, ii) control the second image sensor to read out a row of pixel values from the second image sensor in parallel with the reading out of the row of pixel values from the top portion of the first image sensor, and iii) control the third image sensor to read out a row of pixel values from the third image sensor in parallel with reading out of a row of pixel values from a bottom portion of the first image sensor.

15. The apparatus of claim 14, further comprising:
a fourth image sensor;
wherein said controller is further configured to control the fourth image sensor to read out rows of pixel values from the fourth image sensor in parallel with read out of a row of pixel values from the top portion of the first image sensor;
a fifth image sensor; and
wherein said controller is further configured to control the fifth image sensor to read out rows of pixel values from the fifth image sensor in parallel with read out of pixel values from the bottom portion of the first image sensor.

16. The apparatus of claim 15, further comprising:
a processor configured to generate a composite image from images captured by reading out pixel values from said second, third, fourth and fifth image sensors, said processor being further configured to use an image captured by said first image sensor in aligning portions of said images captured by reading out pixel values from the second, third, fourth and fifth image sensors, as part of being configured to generate a composite image.

17. A non-transitory machine readable medium for use in a camera including a first image sensor and a second image sensor, the non-transitory machine readable medium including processor executable instructions which when executed by a processor control said processor to:
  alternate between reading out a row of pixel values from a top portion of the first image sensor and a row of pixel values from a bottom portion of the first image sensor; and
  read out a row of pixel values from said second image sensor in parallel with the reading out of the row of pixel values from the top portion of the first image sensor, wherein the read out said row of pixel values from said second image sensor in parallel with the reading out of the row of pixel values from the top portion of the first image sensor is performed during a first read out time period, said row of pixel values read out from the first image sensor during the first read out time period corresponding to a scene area which overlaps a scene area to which said row of pixel values read out from the second image sensor corresponds;
  read out during said first read out time period a row of pixel values from a third sensor capturing a scene area below the scene area to which said row of pixel values read out from the second image sensor correspond;
  read out, during a second read out time period, an additional row of pixel values from the third sensor in parallel with reading out of a row of pixel values from the bottom portion of the first image sensor, said row of pixel values from the bottom portion of the first image sensor corresponding to a scene area which overlaps the scene area captured by the additional row of pixel values from the third sensor; and
  reading out, during said second read out time period, an additional row of pixel values from the second image sensor.

* * * * *